US012771047B2

(12) United States Patent
Nabki et al.

(10) Patent No.: US 12,771,047 B2
(45) Date of Patent: Oct. 20, 2026

(54) ULTRA WIDEBAND (UWB) LINK CONFIGURATION METHODS AND SYSTEMS

(71) Applicant: SPARK MICROSYSTEMS INTERNATIONAL INC., Montreal (CA)

(72) Inventors: Frederic Nabki, Montreal (CA); Dominic Deslandes, Montreal (CA); Michiel Soer, Montreal (CA); Gabriel Morin-Laporte, Montreal (CA); Mohammad Taherzadeh-Sani, Montreal (CA); Raphael Guimond, Montreal (CA); Mohammad Hassan Rahmani, Montreal (CA)

( * ) Notice: Subject to any disclaimer, the term of this patent is extended or adjusted under 35 U.S.C. 154(b) by 223 days.

(21) Appl. No.: 18/776,477

(22) Filed: Jul. 18, 2024

(65) Prior Publication Data

US 2024/0372271 A1 Nov. 7, 2024

Related U.S. Application Data

(63) Continuation of application No. 17/593,356, filed as application No. PCT/CA2020/000031 on Mar. 18, 2020, now Pat. No. 12,046,826.

(Continued)

(51) Int. Cl.
*H01Q 21/28* (2006.01)
*H01P 5/10* (2006.01)

(Continued)

(52) U.S. Cl.
CPC ............... *H01Q 21/28* (2013.01); *H01P 5/10* (2013.01); *H01P 5/222* (2013.01); *H01Q 1/38* (2013.01);

(Continued)

(58) Field of Classification Search
CPC .......... H01Q 21/28; H01Q 5/25; H01Q 5/385; H01Q 1/38; H01Q 9/065; H01Q 9/40;

(Continued)

(56) References Cited

U.S. PATENT DOCUMENTS 6,218,989 B1 4/2001 Schneider et al.
2006/0164271 A1 * 7/2006 Hirt ...................... H04B 1/7174 341/143

(Continued)

*Primary Examiner* — Henry Luong
(74) *Attorney, Agent, or Firm* — Rosenberg, Klein & Lee

(57) ABSTRACT

Ultra-Wideband (UWB) technology is a wireless technology for the transmission of large amounts of digital data as modulated coded impulses over a very wide frequency spectrum with very low power over a short distance. However, to support their deployment in a wide range of applications it would be beneficial to provide solutions which:

- exploit multiple directive antennas oriented in different directions to ensure spatial filtering of undesired signals and increase signal strength;
- exploit dynamic configuration of the multi-pulse bundles employed to transmit the bits/symbols within the packets to enhance link quality of service;
- exploit dynamic configuration of the band or bands which the transmitter operates upon; and
- exploit antenna sub-systems providing omnidirectional radiation patterns with implementations offering filtering and balun functions with small footprint and low cost.

16 Claims, 52 Drawing Sheets

Related U.S. Application Data

(60) Provisional application No. 62/819,841, filed on Mar. 18, 2019.

(51) Int. Cl.

| | |
|---|---|
| ***H01P 5/22*** | (2006.01) |
| ***H01Q 1/38*** | (2006.01) |
| ***H01Q 5/25*** | (2015.01) |
| ***H01Q 5/385*** | (2015.01) |
| ***H01Q 9/06*** | (2006.01) |
| ***H01Q 9/40*** | (2006.01) |
| ***H01Q 21/24*** | (2006.01) |
| ***H01Q 25/00*** | (2006.01) |
| ***H04B 1/04*** | (2006.01) |

(52) U.S. Cl.

CPC ............... *H01Q 5/25* (2015.01); *H01Q 5/385* (2015.01); *H01Q 9/065* (2013.01); *H01Q 9/40* (2013.01); *H01Q 21/24* (2013.01); *H01Q 25/001* (2013.01); *H04B 1/0458* (2013.01); *H04B 1/0475* (2013.01); *H04B 2001/0441* (2013.01)

(58) Field of Classification Search

CPC ........ H01Q 21/24; H01Q 25/001; H01P 5/10; H01P 5/222; H04B 1/0458; H04B 1/0475; H04B 2001/0441

See application file for complete search history.

(56) References Cited

U.S. PATENT DOCUMENTS

| | | | | |
|---|---|---|---|---|
| 2010/0321270 | A1 | 12/2010 | Pan et al. | |
| 2014/0354480 | A1 * | 12/2014 | Kainulainen | G01S 5/0226 342/385 |

* cited by examiner dB (Peak Realised Gain)

Radiation Efficiency

| Name | X | Y |
|---|---|---|
| M1 | 6.750 | -1.0324 |
| M2 | 7.500 | -1.0304 |
| M3 | 8.250 | -1.1118 |
| M4 | 8.750 | -2.0521 |
| M5 | 5.750 | -11.7018 |
| M6 | 2.500 | -13.6589 |

| Name | X | Y |
|---|---|---|
| M1 | 5.800 | -9.8538 |
| M4 | 19.400 | -2.5103 |

| Name | X | Y |
|---|---|---|
| M1 | 6.500 | -1.7402 |
| M2 | 7.000 | -1.3374 |
| M3 | 7.500 | -1.3071 |
| M4 | 8.000 | -1.4614 |
| M6 | 8.500 | -1.4995 |
| M7 | 5.800 | -5.5705 |

ULTRA WIDEBAND (UWB) LINK CONFIGURATION METHODS AND SYSTEMS

CROSS-REFERENCE TO RELATED APPLICATIONS

This application claims the benefit of priority as a continuation of U.S. patent application Ser. No. 17/593,356 filed Sep. 16, 2021; which itself claims the benefit of priority as a 371 National Phase entry of PCT/CA2020/000031 filed Mar. 18, 2020; which itself claims the benefit of priority from U.S. Provisional Patent Application 62/819,841 filed Mar. 18, 2019; the entire contents of each being incorporated herein by reference.

FIELD OF THE INVENTION

This invention relates to ultra-wideband wireless communication systems and more particularly to configuring ultra-wideband transmitters and receivers for enhanced ultra-wideband wireless link performance and antennas for said communication systems.

BACKGROUND OF THE INVENTION

Ultra-Wideband (UWB) technology is a wireless technology for the transmission of large amounts of digital data as modulated coded impulses over a very wide frequency spectrum with very low power over a short distance. Such pulse based transmission being an alternative to transmitting using a sinusoidal wave which is then turned on or off, to represent the digital states, as employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

UWB systems are well-suited to short-distance applications in a variety of environments, such as depicted in FIG. 1 including peripheral and device interconnections, as exemplified by first residential environment 110, sensor networks, as exemplified by second residential environment 120, control and communications, as exemplified by industrial environment 130, medical systems, as exemplified by medical imaging 150, and personal area networks (PAN), as exemplified by PAN 140. Due to low emission levels permitted by regulatory agencies such UWB systems tend to be short-range indoor applications but it would be evident that a variety of other applications may be considered where such regulatory restrictions are relaxed and/or not present addressing military and civilian requirements for communications between individuals, electronic devices, control centers, and electronic systems for example.

Accordingly, it would be beneficial for UWB transmitters, UWB receivers and UWB transceivers to exploit multiple directive antennas oriented in different directions to ensure spatial filtering of undesired signals and increase signal strength. It would be further beneficial for the multiple directive antennas for incorporate integrated baluns.

It would be further beneficial for UWB transmitters, UWB receivers and UWB transceivers to exploit dynamic configuration of the multi-pulse bundles employed to transmit the bits/symbols within the packets. Such dynamic configuration being to enhance link quality of service.

It would be further beneficial for UWB transmitters, UWB receivers and UWB transceivers to exploit dynamic configuration of the band or bands which the transmitter operates upon.

It would be further beneficial for UWB transmitters, UWB receivers and UWB transceivers to exploit antenna sub-systems which provide an omnidirectional radiation pattern with printed circuit board implementations offering filtering and balun functions offering small footprints and low cost.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to ultra-wideband wireless communication systems and more particularly to configuring ultra-wideband transmitters and receivers for enhanced ultra-wideband wireless link performance and antennas for said communication systems.

In accordance with an embodiment of the invention there is provided an antenna comprising:

substrate;

a first antenna structure operating over a predetermined frequency range formed upon the substrate, comprising a first pattern upon a first surface of the substrate and a first ground plane formed upon a second surface of the substrate opposite the first surface of the substrate;

a second antenna structure operating over the predetermined frequency range formed upon the substrate, comprising a second pattern upon the first surface of the substrate and a second ground plane formed upon the second surface of the substrate;

a first feed structure electrically coupled to the first antenna structure and a first input feed; and a second feed structure electrically coupled to the second antenna structure and a second input feed, wherein the first antenna structure and the second antenna structure are disposed at 90° relative to each other relative to an axis of the substrate; and the first input feed and the second input feed are aligned and are disposed parallel to either side of an axis of the substrate.

In accordance with an embodiment of the invention there is provided a transmitter for an impulse radio comprising:

a radio frequency (RF) signal generator for transmitting, the RF signal generator receiving a data signal to be transmitted and a clock signal characterised by a clock frequency and coupled to an RF antenna and a control circuit;

the control circuit for controlling the generation of the transmitted data such that each bit being transmitted is comprised of a plurality N pulses generated by the RF signal generator wherein each pulse of the N pulses is at a predetermined frequency of a plurality M frequencies, has a predetermined amplitude, and has a predetermined pulse length; wherein $N \geq 2$ and $M \geq 2$;

M and N are integers;

a pulse repetition rate of the RF signal generator is determined in dependence of the clock frequency;

the integer N depends upon a duration of a bit of the data signal and the pulse repetition rate of the RF signal generator;

the plurality N pulses are transmitted within the duration of the bit of the data signal and comprise pulses at the plurality M frequencies; and the plurality N pulses are within a predetermined frequency band.

In accordance with an embodiment of the invention there is provided an antenna sub-system comprising:

an ultra-wideband radio circuit (UWB) providing a balanced output signal over a predetermined frequency range;

a monopole antenna having a single-ended input for providing an omnidirectional radiation pattern over the predetermined frequency range; and an intermediate circuit comprising a balun and filtering to convert the balanced output signal of the UWB radio circuit to the single-ended input of the monopole antenna.

In accordance with an embodiment of the invention there is provided an antenna sub-system comprising:

an ultra-wideband radio circuit (UWB) providing a balanced output signal over a predetermined frequency range;

a monopole antenna having a differential input for providing an omnidirectional radiation pattern over the predetermined frequency range;

a differential low pass filter having a differential input and a differential output where the differential output of the differential low pass filter is coupled to the differential input of the monopole antenna; and an intermediate circuit comprising a differential feed line to couple the UWB radio circuit to the differential low pass filter incorporating notch filters for attenuating second harmonics of signals applied to the intermediate circuit over the predetermined frequency range.

In accordance with an embodiment of the invention there is provided an antenna sub-system comprising:

an ultra-wideband radio circuit (UWB) providing a balanced output signal over a predetermined frequency range;

a monopole antenna for providing an omnidirectional radiation pattern over the predetermined frequency range;

a differential low pass filter having a differential input and a differential output where a first output of the differential output of the differential low pass filter is coupled to a first side of the monopole antenna and a second output of the differential output of the differential low pass filter is coupled to a second distal side of the monopole antenna; and an intermediate circuit comprising a differential feed line to couple the UWB radio circuit to the differential low pass filter incorporating notch filters for attenuating second harmonics of signals applied to the intermediate circuit over the predetermined frequency range.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
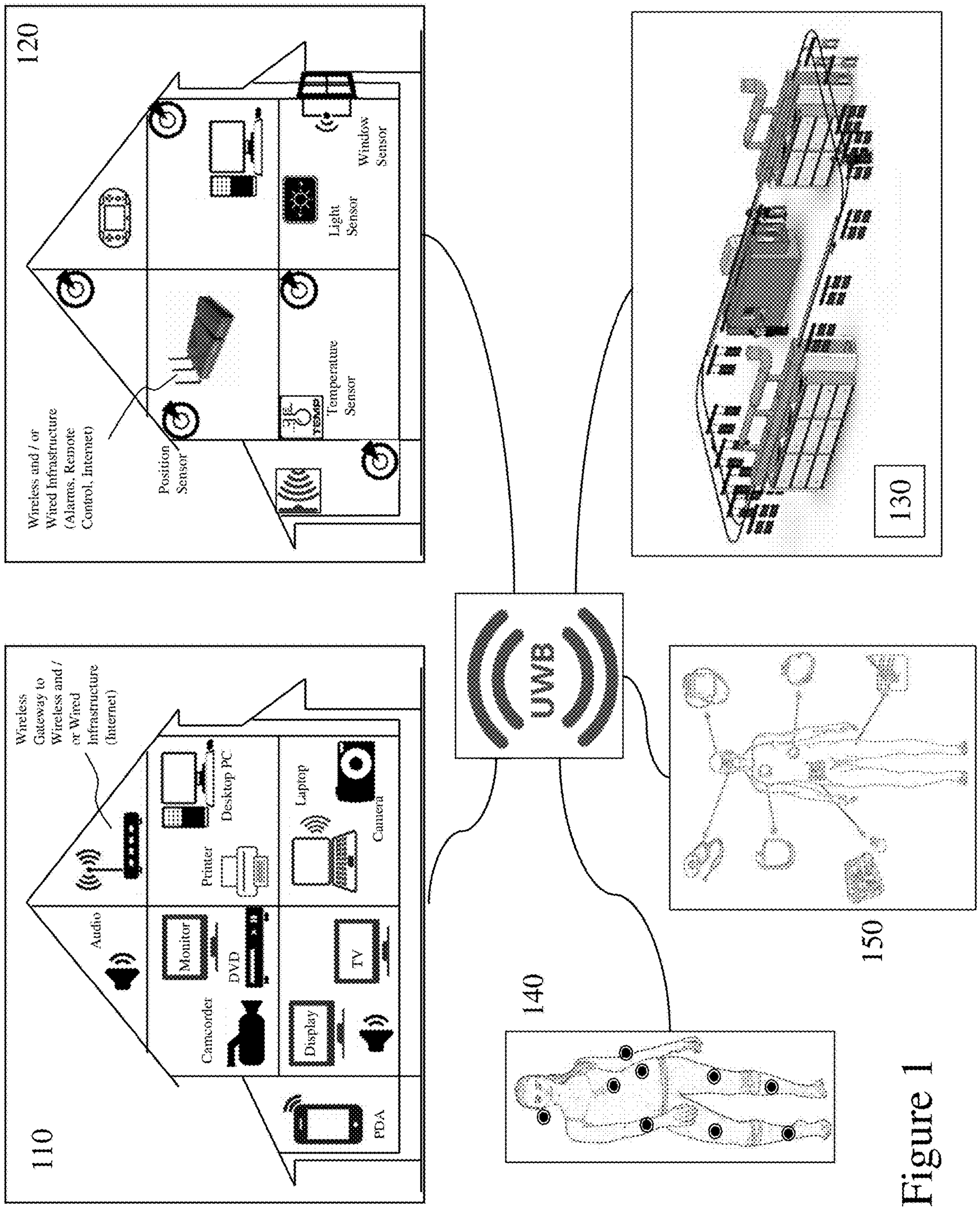
FIG. 1 depicts applications of UWB transmitters, receivers, and systems according to embodiments of the invention.

The present invention is directed to ultra-wideband wireless communication systems and more particularly to configuring ultra-wideband transmitters and receivers for enhanced ultra-wideband wireless link performance and antennas for said communication systems.

The ensuing description provides exemplary embodiment (s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

0. Impulse Radio Ultra Wideband System

As discussed supra UWB offers many potential advantages such as high data rate, low-cost implementation, and low transmit power, ranging, multipath immunity, and low interference. The Federal Communications Commission (FCC) regulations for UWB reserved the unlicensed frequency band between 3.1 GHz and 10.6 GHz for indoor UWB wireless communication system wherein the low regulated transmitted power allows such UWB systems to coexist with other licensed and unlicensed narrowband systems. Therefore, the limited resources of spectrum can be used more efficiently. On the other hand, with its ultra-wide bandwidth, an UWB system has a capacity much higher than the current narrowband systems for short range applications. Two possible techniques for implementing UWB communications are Impulse Radio (IR) UWB and multi-carrier or multi-band (MB) UWB. IR-UWB exploits the transmission of ultra-short (of the order of nanosecond) pulses, although in some instances in order to increase the processing gain more than one pulse represents a symbol. In contrast MB-UWB systems use orthogonal frequency division multiplexing (OFDM) techniques to transmit the information on each of the sub-bands. Whilst OFDM has several good properties, including high spectral efficiency, robustness to RF and multi-path interferences. However, it has several drawbacks such as up and down conversion, requiring mixers and their associated high power consumption, and is very sensitive to inaccuracies in frequency, clock, and phase. Similarly, nonlinear amplification destroys the orthogonality of OFDM. Accordingly, MB-UWB is not suitable for low-power and low cost applications.

In contrast IR-UWB offers several advantages, including unlicensed usage of several gigahertz of spectrum, offers great flexibility of spectrum usage, and adaptive transceiver designs can be used for optimizing system performance as a function of the data rate, operation range, available power, demanded quality of service, and user preference. Further, multi-Gb/s data-rate transmission over very short range is possible and due to the ultra-short pulses within IR-UWB it is very robust against multipath interference, and more multipath components can be resolved at the receiver in some implementations, resulting in higher performance. Further, the ultra-short pulses support sub-centimeter ranging whilst the lack of up and down conversion allows for reduced implementation costs and lower power transceiver implementations. Beneficially, ultra-short pulses and low power transmissions make IR-UWB communications hard to eavesdrop upon.

An IR-UWB transmitter as described below in respect of embodiments of the invention in with reference to FIGS. 2 and 3 respectively exploits an on-demand oscillator following a pulse generator in order to up-convert the pulses from the pulse generated whilst avoiding the requirement of a separate mixer. Implementable in standard CMOS logic both the pulse generator and the on-demand oscillator are digitally tunable in order to provide control over the pulse bandwidth and center frequency. Further, by exploiting a digitally controlled ring oscillator for the on-demand oscillator the IR-UWB transmitter is designed to allow very quick frequency adjustments on the order of the pulse repetition rate (PRR). Beneficially this technique provides the same advantages as MB-OFDM in respect of spectrum configurability, achieved by sequentially changing the transmitted spectrum using a frequency hopping scheme, whilst maintaining the benefits of IR-UWB. Further, by providing advanced duty cycling with fast power up time combined with On-Off Shift Keying (OOK) modulation the IR-UWB according to embodiments of the invention allows significant reductions in power consumption by exploiting the low duty cycle of a UWB symbol and the fact that only half the symbols require sending energy.

In addition to defining the operating frequency range for UWB systems the different regulatory bodies all specify and enforce a specific power spectral density (PSD) mask for UWB communications. A PSD mask as may be employed in respect of embodiments of the invention is the FCC mask for which mask data are summarized in Table 1 below for the 3100 MHZ-10600 MHZ (3.1 GHZ-10.6 GHZ) range.

TABLE 1

FCC Masks for Indoor - Outdoor for Different Frequency Bands

| Frequency Range | Indoor EIRP Limit (dBm/MHz) | Outdoor EIRP Limit (dBm/MHz) |
|---|---|---|
| <960 | —49.2 | –49.2 |
| 960-1610 MHz | –75.3 | –75.3 |
| 1610-1990 MHz | –53.3 | –63.3 |
| 1990-3100 MHz | –51.3 | –61.3 |
| 3100-10600 MHz | –41.3 | –41.3 |
| >10600 MHz | –51.3 | –61.3 |

Accordingly, it would be evident that the upper limit of –41.3 dB/MHz across the 3.1 GHZ-10.6 GHz frequency range is the same limit imposed on unintentional radiation for a given frequency in order not to interfere with other radios. Basically, for a given frequency, the UWB radio operates under the allowed noise level which creates the relationship presented in Equation (1) between $E_p$, the transmitted energy per pulse, the maximum spectral power S, the bandwidth B, the bit rate $R_b$ and the number of pulses per bits $N_{ppb}$.

$$E_p \cdot N_{ppb} \cdot R_b \leq S \cdot B \tag{1}$$

The IEEE has published a few standards for a physical layer (PHY) for UWB radio in Personal Area Networks (IEEE 802.15.4a-2007), Body Area Networks (IEEE 802.15.4a-2007) and Radio-Frequency Identification (IEEE 802.15.4f-2012). These standards use mostly relatively large pulses resulting in relatively narrow bandwidth which is up-converted to a specific center frequency in order to fill predetermined channels. The data is encoded using pulse-position-modulation (PPM) and bi-phasic shift keying (BPSK) is used to encode redundancy data. Every bit consists of one or more pulses scrambled in phase depending on the target data rate. These standards allow considerable flexibility on channel availability and data rates. The standard also defines the preamble, headers for the data packet and ranging protocol.

These IEEE standards are designed with multiple users in mind and use different channels to transmit the data, thereby putting a heavy constraint on pulse bandwidth and limiting the transmitted energy. Prior art on non-standard transmitter attempts to make better use of the available spectrum by using narrow pulses, which therefore have a larger bandwidth thereby increasing the maximum transmitted energy according to Equation (1). Accordingly, these transmitters are non-standard and were also designed for different data rates, frequencies, pulse width, etc. Additionally, they also used various encoding schemes, most notably PPM, OOK or BPSK.

Within the work described below the inventors have established improvements with respect to UWB systems, UWB transmitters and energy based UWB receivers which are capable of generating and adapting to a variety of IR-UWB pulses and bit encoding schemes thereby supporting communications from both IR-UWB transmitters compliant to IEEE standards as well as those that are non-standard. These improvements are made with respect to UWB transmitters, UWB receivers, UWB transceivers and UWB systems such as those described and depicted by the inventors within WO/2019/000,075 "Energy Efficient Ultra-Wideband Impulse Radio Systems and Methods" (PCT/CA2018/000,135 filed Jun. 29, 2018), WO 2016/191,851 "Systems and Methods for Spectrally Efficient and Energy Efficient Ultra-Wideband Impulse Radios with Scalable Data Rates" (PCT/CA2016/000,161 filed May 31, 2016), and WO/2015/103,692 "Systems and Methods Relating to Ultra-Wideband Broadcasting comprising Dynamic Frequency and Bandwidth Hopping" (PCT/CA2015/000,007, filed Jan. 7, 2015).

1. IR-UWB Transmitter Circuit

Figure 2:
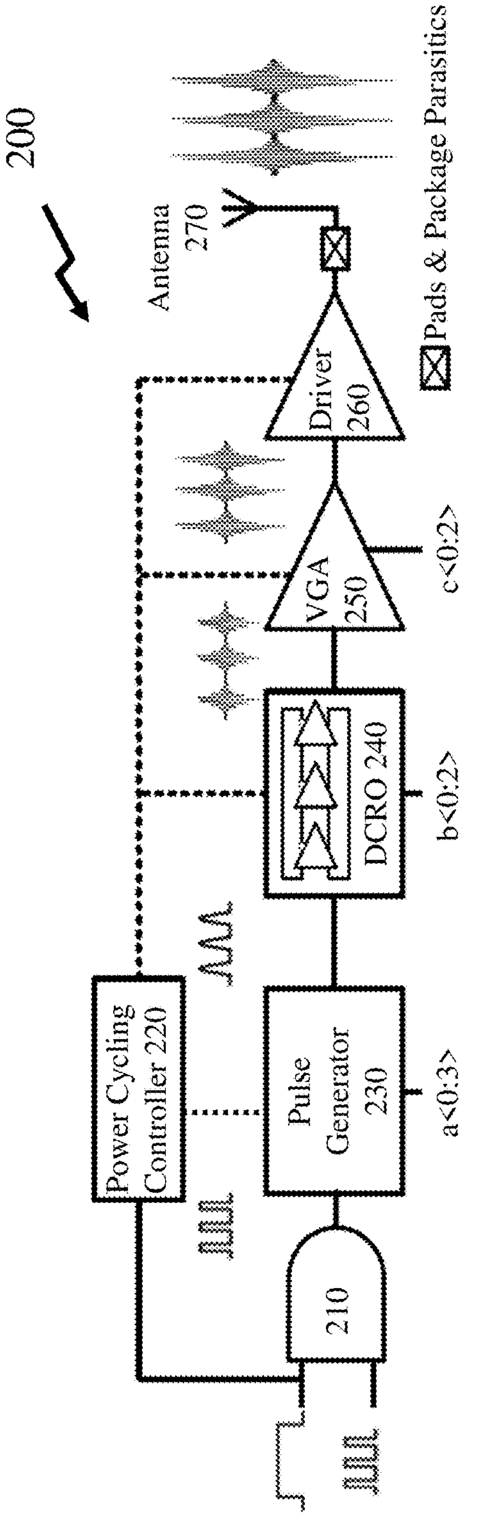
FIG. 2 depicts a block diagram of a UWB transmitter according to an embodiment of the invention.

Referring to FIG. 2 there is depicted schematically an exemplary architecture for an IR-UWB transmitter 200 according to embodiments of the invention which is composed of five main blocks plus the antenna. First a programmable impulse is produced by a pulse generator 230 at clocked intervals when the data signal from AND gate 210 is high based upon control signals presented to the AND gate 210. The pulses from the pulse generator 230 are then up-converted with a programmable multi-loop digitally controlled ring oscillator (DCRO) 240. The output from the DCRO 240 is then coupled to a variable gain amplifier (VGA) 250 in order to compensate for any frequency dependency of the pulse amplitude. Finally, a driver 260 feeds the antenna 270, overcoming typical package parasitics, such as arising from packaging the transceiver within a quad-flat no-leads (QFN) package. In order to further reduce the power consumption of the IR-UWB transmitter (IR-UWB-Tx) 200 according to embodiments of the invention a power cycling controller 220 dynamically switches on or off these functional blocks when the data signal is low.

Figure 3A:
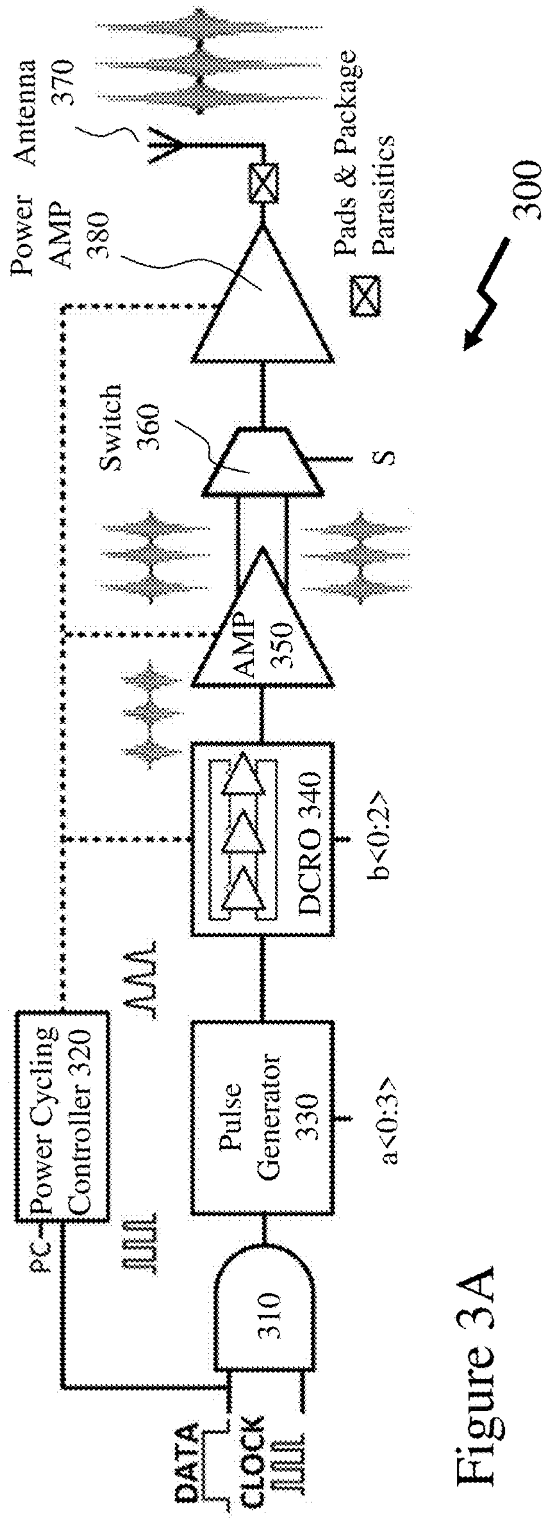
FIG. 3A depicts a block diagram of a UWB transmitter according to an embodiment of the invention supporting biphasic phase scrambling.

Now referring to FIG. 3A there is depicted schematically a block diagram 300 of an exemplary IR-UWB transmitter according to embodiments of the invention supporting biphasic phase scrambling. In comparison to the IR-UWB transmitter 200 in FIG. 2 for an IR-UWB according to embodiments of the invention without biphasic phase shifting rather than being composed of five main blocks plus the antenna the Biphasic Phase Shifting IR-UWB (BPS-IR-UWB) transmitter comprises 6 main blocks. First a programmable impulse is produced by a pulse generator 330 at clocked intervals when the data signal from AND gate 310 is high based upon control signals presented to the AND gate 310. The pulses from the pulse generator 330 are then up-converted with a programmable multi-loop digitally controlled ring oscillator (DCRO) 340. The output from the DCRO 340 is then coupled to a dual-output amplifier (VGA) 350 both in order to compensate for any frequency dependency of the pulse amplitude but also to generate dual phase shifted output signals that are coupled to a switch 360 which selects one of the two signals to couple to the output power amplifier (driver) 380 under the action of the switch control signal "S" applied to the switch 360. Note that a similar phase selection scheme could be implemented by affecting the startup conditions for DCRO 340 in order to provide the two phases. This would preclude the need for switch 360 at the cost of an added control startup condition control signal on DCRO 340.

The output power amplifier 380 feeds the antenna 370, overcoming typical package parasitics, such as arising from packaging the transceiver within a quad-flat no-leads (QFN) package. In order to reduce the power consumption of the BPS-IR-UWB transmitter represented by block diagram 300 according to an embodiment of the invention a power cycling controller 320 dynamically switches on or off these functional blocks when the data signal "PC" is low. Accordingly, a BPS-IR-UWB transmitter according to embodiments of the invention transmits pulses with or without phase shift based upon the control signal "S" applied to switch 360. If this control signal is now fed from a random data generator or a pseudo-random data generator then the resulting pulses coupled to the antenna of the BPS-IR-UWB transmitter will be pseudo-randomly or randomly phase shifted.

Figure 3B:
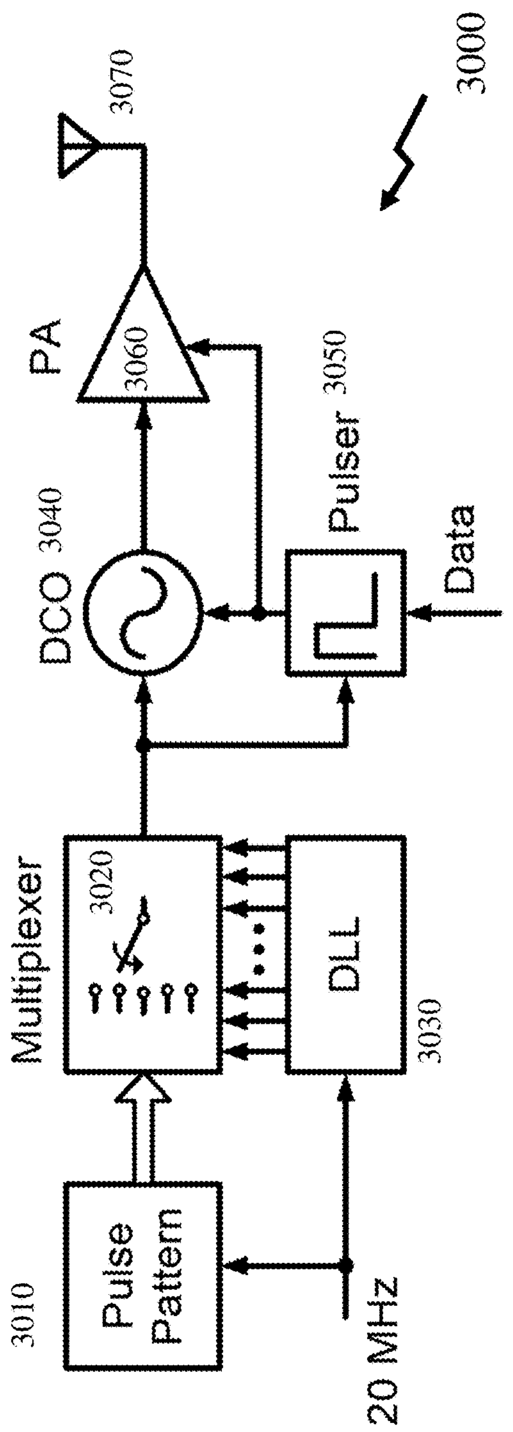
FIG. 3B depicts a block diagram of a UWB transmitter according to an embodiment of the invention employing dynamically configurable and programmable pulse sequences.

Now referring to FIG. 3B there is depicted schematically a block diagram 3000 of an exemplary IR-UWB transmitter according to embodiments of the invention. As depicted a Pulse Pattern block 3010 holds a configuration for the pulses used to represent the current symbol. From the symbol-rate clock (i.e. 20 MHZ), multiple phases are generated by a Delay Locked Loop (DLL) 3030. The rising edge of each clock phase represents the start of one pulse in the symbol pulse bundle. A multiplexer 3020 is triggered by the edges of the clock phases and selects the configuration of the current pulse out of the Pulse Pattern block 3010. A pulse generator (Pulser) 3050 generates pulses with a pulse width set by the multiplexer 3020 and enables the Digitally Controlled Oscillator (DCO) 3040 and Power Amplifier (PA) 3060. When enabled, the DCO 3040 generates a Gaussian shaped pulse with frequency set by the multiplexer 3020, which is then amplified by the PA 3060 and radiated by the antenna 3070.

Accordingly, the Pulse Pattern block 3010 establishes the pulses for a symbol or sequence of symbols. In this manner updating the Pulse Pattern block 3010 adjusts the pulse sequence employed for each symbol and accordingly the Pulse Pattern block 3010 may be dynamically updated based upon one or more factors including, but not limited to, network environment data, predetermined sequence, date, time, geographic location, signal-to-noise ratio (SNR) of received signals, and regulatory mask.

Figure 3C:
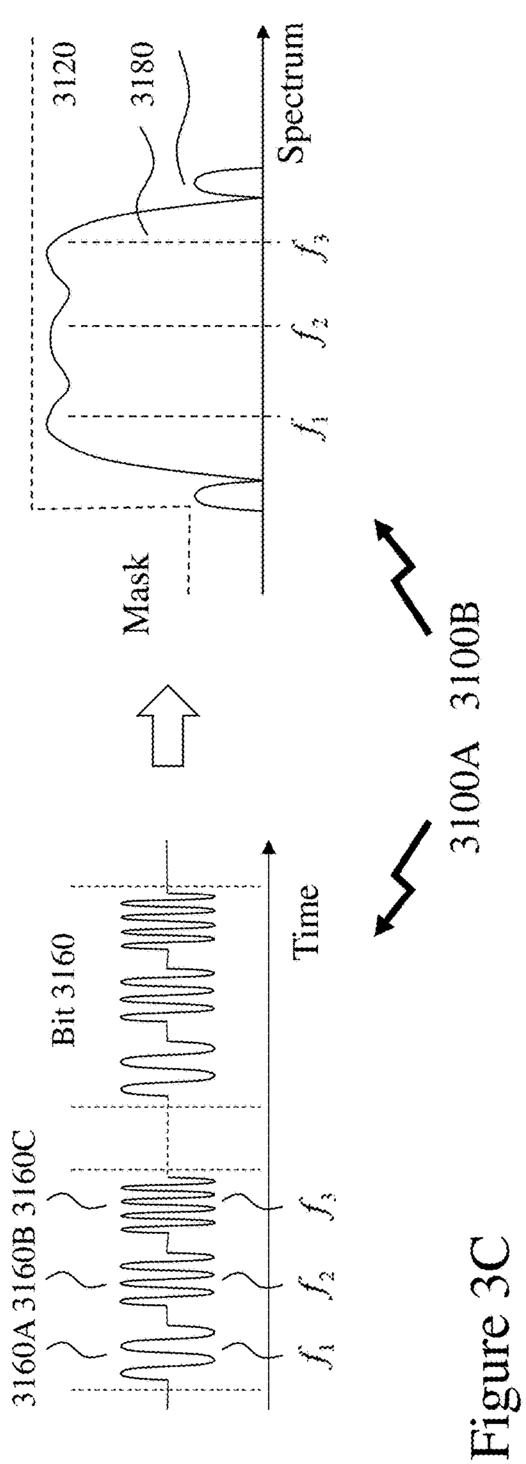
FIG. 3C depicts schematically a multi-pulse symbol UWB protocol according to an embodiment of the invention.

Referring to FIG. 3C there is depicted schematically a multi-pulse symbol UWB protocol according to an embodiment of the invention. Referring to first image 3100A there is depicted a bit 3160 comprising a series of sub-pulses 3160A to 3160C which are each at frequencies $f_1$; $f_2$; $f_3$. Accordingly, the multi-pulse spectrum 3180 of a symbol (bit 3160) is depicted in second image 3100B as obtained conceptually (phase scrambling is omitted for clarity) by summing the individual pulse spectra of the sub-pulses 3160A to 3160C, which increases the bandwidth whilst increasing the total symbol duration, in contrast with single-pulse prior art methods, whilst maintaining the maximum power below the UWB mask 3120. This allows the symbol energy to be maximized while relaxing the timing requirements and level of synchronization required at the receiver. An arbitrary number of pulses with different sets of parameters may be included within a bundle to tailor the pulse spectrum to a given requirement.

Figure 3D:
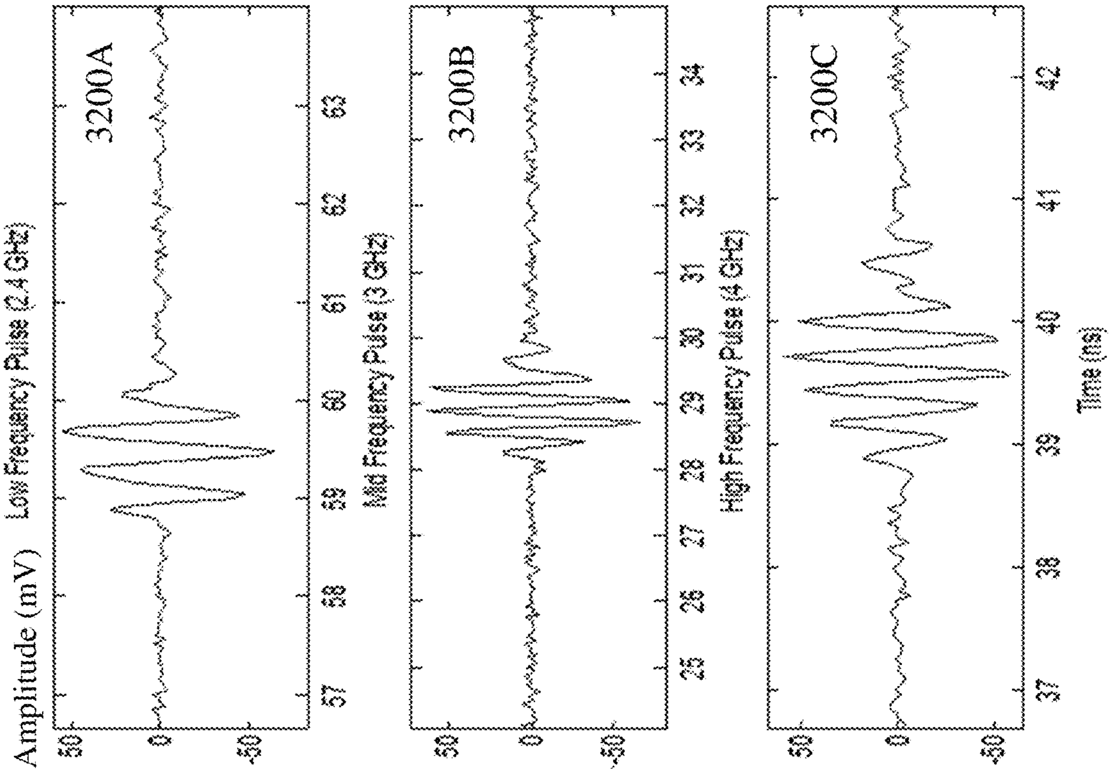
FIG. 3D depicts pulses from a UWB transmitter according to an embodiment of the invention at three different frequencies.

Now referring to FIG. 3D there are depicted the measured pulse shapes for three different frequency setting of a UWB transmitter according to an embodiment of the invention such as described and depicted in FIG. 2 or FIG. 3A without biphasic phase scrambling according to WO/2015/103,692. First to third traces 3200A to 3200C respectively representing single pulses at 2.4 Ghz, 3 GHz, and 4 GHz respectively.

Figure 3E:
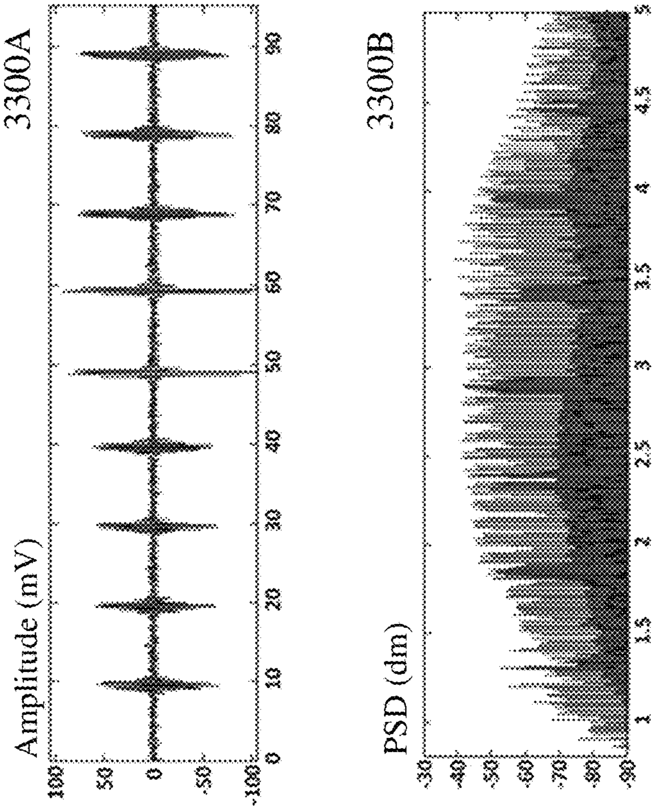
FIG. 3E depicts a pulse sequence for a bit transmitted by a UWB transmitter according to an embodiment of the invention together with its emitted power spectrum.

Referring to FIG. 3E there is depicted in first trace 3300A a pulse bundle representing a bit being transmitted such as described within WO/2015/103,692 is depicted whilst second trace 3300B depicts the resulting power spectrum density (PSD). It is evident that this allows for managing the PSD of the final signal through the parameters for each pulse within the frequency hopping sequence. The pulse sequence depicted comprising 4 pulses at 2.4 GHz, 2 pulses at 3.5 GHz, and 3 pulses at 4.0 GHz. The resulting PSD fills the spectrum at around −58 dBm over the entire band.

Figure 3F:
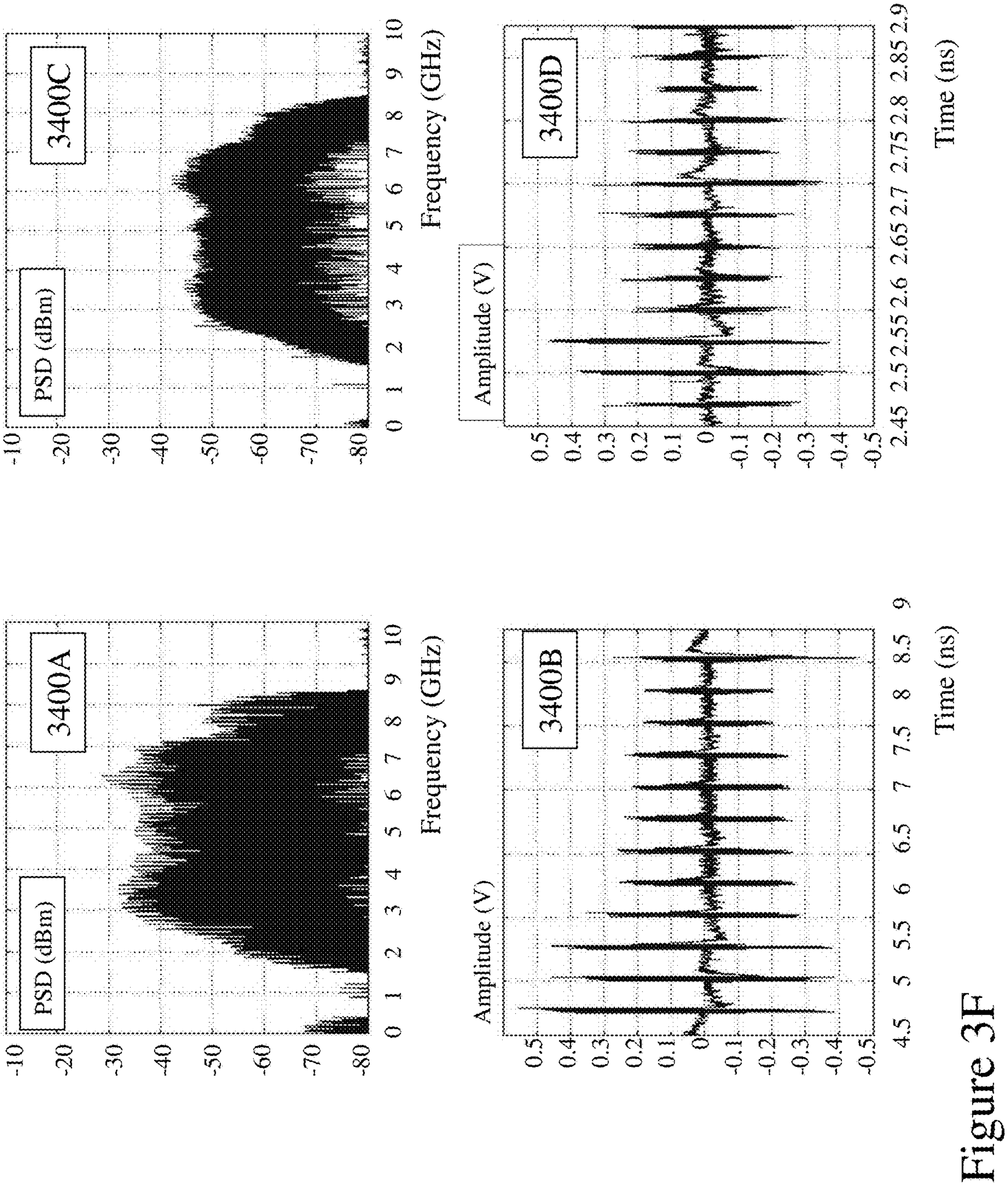
FIG. 3F depicts a pulse sequence for a bit transmitted by a UWB transmitter according to an embodiment of the invention together with its emitted power spectrum with and without biphasic phase scrambling.

Now referring to FIG. 3F there are depicted the power spectrum and pulse train for a pulse bundle according to WO 2016/191,851 and as depicted in FIG. 3A supporting operating over a frequency range from approximately 3 GHz to approximately 7 GHz. First and second images 3400A and 3400B respectively representing the power spectrum and pulse sequence wherein there is no random frequency or phase scrambling during the generation and transmission. Third and fourth images 3400C and 3400D depict the results for random frequency and random phase scrambling of the pulses wherein phase is set per pulse through data established by a pseudo-random data generator. Accordingly, it would be evident that when comparing first and third images 3400A and 3400C that the introduction of random frequency and random phase shifting reduces the spectral lines significantly within the emitted spectrum of a UWB transmitter according to embodiments of the invention.

2. IR-UWB Receiver

Figure 4:
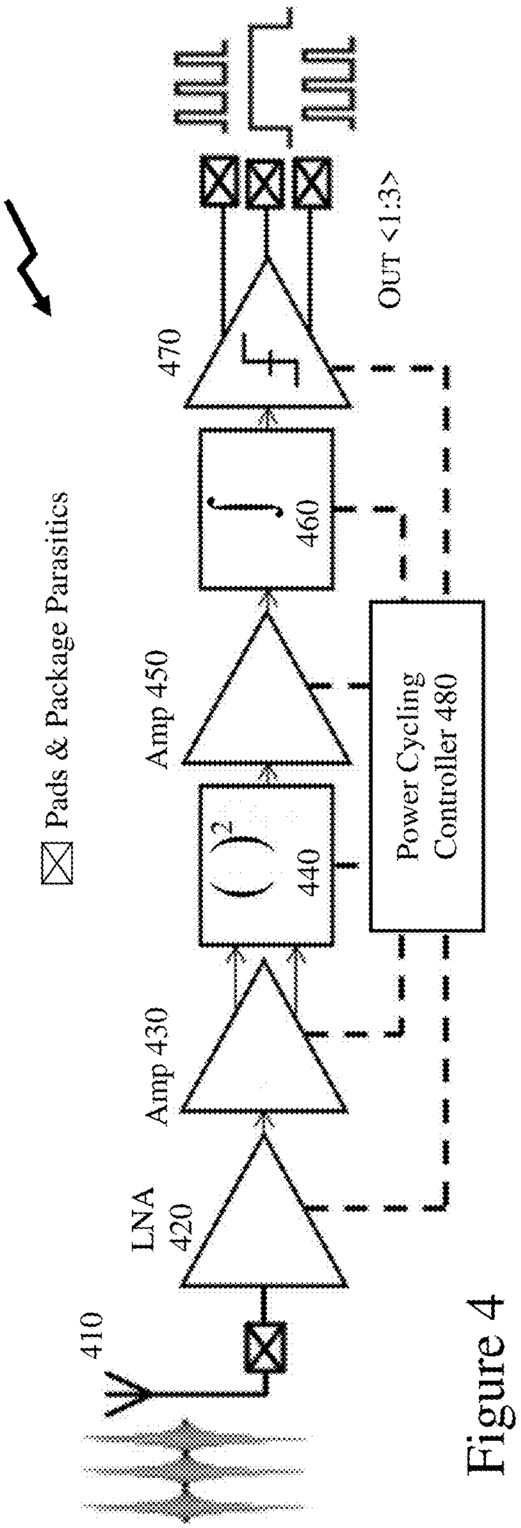
FIG. 4 depicts a block diagram of a UWB receiver according to an embodiment of the invention.

Referring to FIG. 4 there is depicted schematically the architecture of an IR-UWB receiver 400 according to embodiments of the invention. Accordingly, the signal from an IR-UWB transmitter is received via an antenna 410 and coupled to a low noise amplifier (LNA) 420 followed by first amplifier 430 wherein the resulting signal is squared by squaring circuit 440 in order to evaluate the amount of energy in the signal. The output of the squaring circuit 440 is then amplified with second amplifier 450, integrated with integration circuit 460 and evaluated by a flash ADC 470 to generate the output signals. Also depicted is Power Cycling Controller 480 which, in a similar manner to the power cycling controller 220 of IR-UWB transmitter 200 in FIG. 2, dynamically powers up and down the LNA 420, first and second amplifiers 430 and 450 respectively, squaring circuit 440, and flash ADC 470 to further reduce power consumption in dependence of the circuit's requirements.

Figure 5:
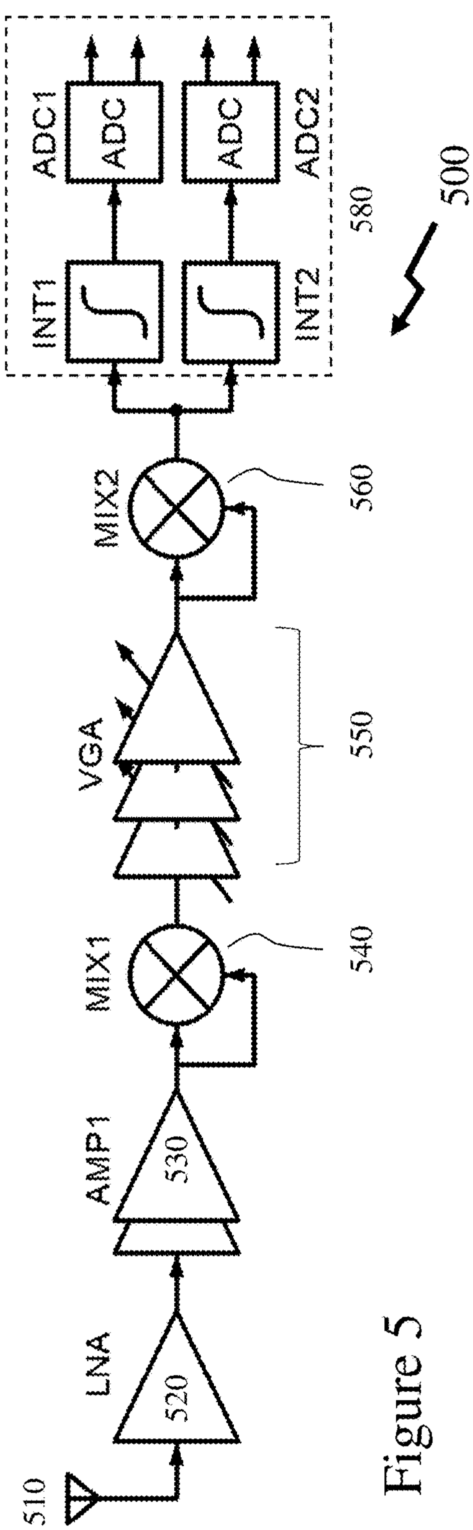
FIG. 5 depicts a receiver circuit schematic for a UWB receiver/transceiver according to an embodiment of the invention.

Referring to FIG. 5 there is depicted a schematic of a receiver 500 according to an embodiment of the invention. The RF signal from the antenna 510 is initially amplified by a Low Noise Amplifier (LNA) 520 before being passed to a two stage RF amplifier (AMP1) 530. A first squaring mixer (MIX1) 540 multiplies the signal with itself to convert to the Intermediate Frequency (IF). A three-stage Variable Gain Amplifier (VGA) 550 amplifies the signal further and implements a bandpass filter function. The VGA 550 output is then coupled to a second squaring mixer (MIX2) 560 which down-converts the signal to the baseband frequency. A parallel integrator (INT1 and INT2) sums the signal energy, which is digitized by the Analog-to-Digital Converters (ADC1 and ADC2) and sent to a digital processor (not depicted for clarity).

3. IR-UWB Receiver

As described within WO/2019/000,075 and WO 2016/191,851 the inventors have established design parameters of millisecond range start-up time from sleep mode and microsecond range start-up time from idle mode by establishing a custom integrated DC/DC converter and duty cycled transceiver circuitry that enables fast circuit start-up/shut-down for optimal power consumption under low (1 kbps) and moderate data rates (10 Mbps).

Figure 6:
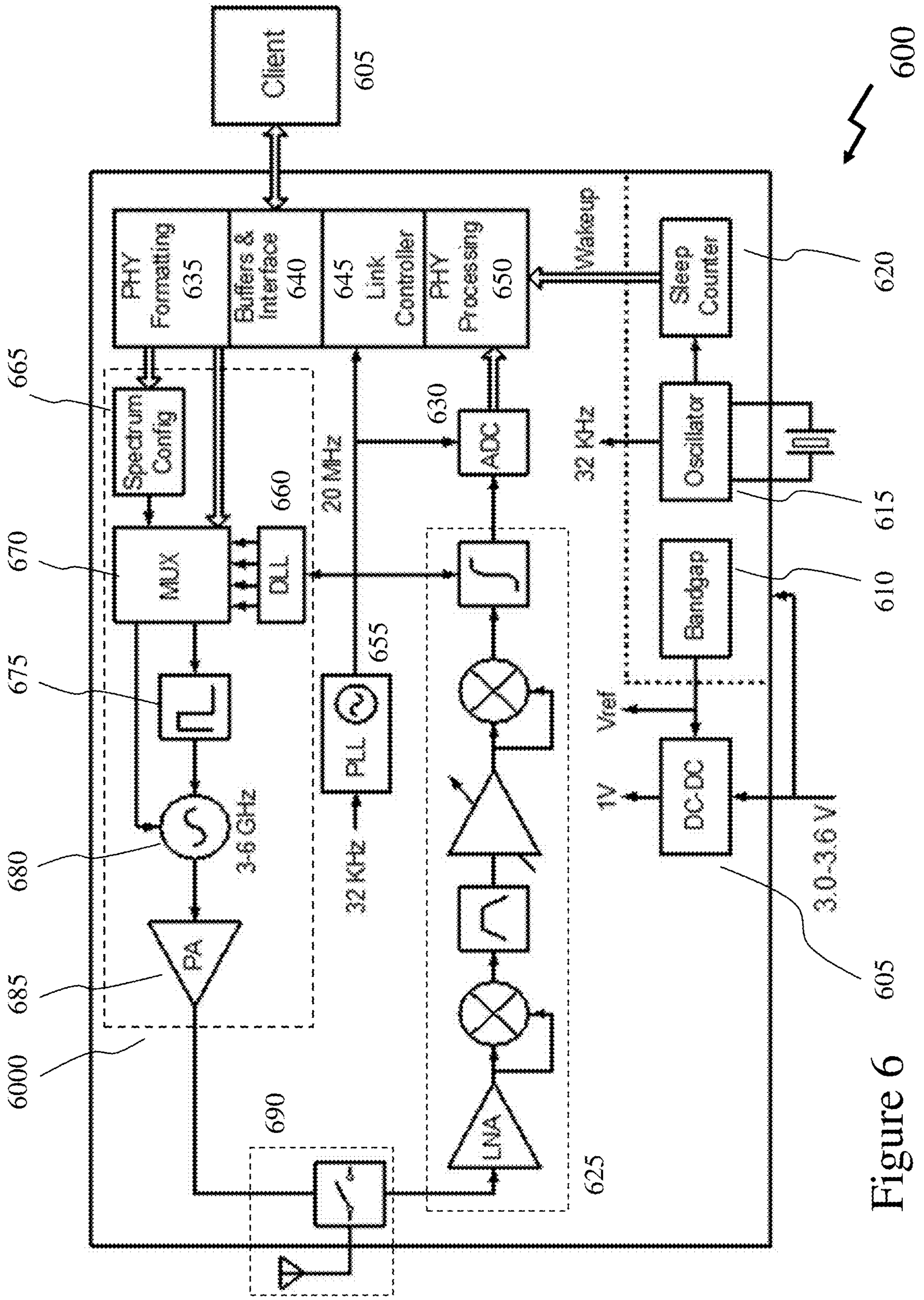
FIG. 6 depicts a circuit schematic for a UWB transceiver according to an embodiment of the invention.

In order to sustain good energy efficiency, the elements of a total UWB transceiver, such as depicted with transceiver 600 in FIG. 6 according to embodiments of the invention, has been designed for low static sleep current and fast startup/sleep times. Referring to FIG. 6, a battery ($3.0V \leq V_{BATT} \leq 3.6V$) (not depicted for clarity) powers a low-frequency crystal oscillator 615, sleep counter 620 and bandgap reference 610, all of which are typically always operational although the bandgap reference 610 could be duty cycled within other embodiments of the invention without altering the scope of the claimed invention). Their power consumption limits the minimum power consumption of the system to sub-microwatt level. An integrated buck DC-DC converter 605 is powered by the battery when the system is not in sleep mode, and this provides the supply voltage to the rest of the system with high conversion efficiency. The startup time of the DC-DC converter 605 is on the order of several symbol periods in order to minimize wasted energy. Between sleep periods, the PLL 655 is active to provide the base clock for the system. The receiver 625 and DLL 660 have dedicated power down controls and are only activated during frame transmission/reception. Further, the transmitter is also power cycled through its all-digital architecture which is not depicted as having a separate control. The power consumption of the digital synthesized blocks is low due to the low base clock (e.g. 20 MHZ).

In principle, a power-cycled transceiver achieves linear scaling of power consumption with data rate, thus achieving constant energy efficiency. With a fixed frame size, multiple data rates are obtained by adjusting the length of the sleep period, with the maximum attainable data rate determined by the symbol rate in the frame itself. In order to preserve energy efficiency, the power consumption during sleep must be lower than the average power consumption. For high data rates, powering down the PLL is not required when its consumption does not significantly degrade the overall efficiency. For low data rates, the whole system except the bandgap reference, crystal oscillator, and sleep counter can be shut down during sleep mode. In this case, the millisecond range startup time of the PLL can be insignificant compared to the sleep period, and overall efficiency is also not significantly degraded.

As depicted the UWB transceiver 600 also comprises a receive/transmit switch 690 coupled to the antenna to selectively couple the transmitter 6000 or receiver 625 to the antenna during transmission and reception respectively. The UWB transceiver 600 also comprises a spectrum configuration circuit 665 (equivalent to Pulse Pattern 3010 in transmitter 3000 in FIG. 3B), PHY Processing circuit 650, Link Controller 645, Buffer and Interface circuit 640, and PHY Formatting circuit 635. The UWB transceiver 600 communicates via Link Controller 645 to the Client 605. As such, Link Controller 645 may communicate using a wired protocol (e.g., serial peripheral interface (SPI)) to Client 605, for example.

4. Compact Dipole Antenna Diversity for UWB Systems

4A. Overview

Indoor wireless communication is often affected by various propagation phenomena that can mitigate the signal quality if not properly addressed. Multipath interference is an important source of fading that can seriously degrade the link quality in an indoor environment. When radio waves are transmitted in the air, they will be received at the receiver from different paths. Based on their travelling path, obstacles, and reflecting media, these received signals will have various amplitudes and time delays (phase difference). When combined at the receiver, these signals from different paths might partially or, in some cases, completely cancel each other resulting in a significant drop of the signal quality. In dynamic environments where there are moving objects in the room, this fading effect is accentuated. Therefore, it is crucial to address this problem in system level as well as radio and antenna level.

Antenna diversity techniques are often used to mitigate this problem. In this method more than one antenna is used to transmit and receive the wireless signal. Usually in order to have the maximum possible diversity, the antennas are oriented orthogonally to provide polarization diversity. Moreover, placing the antennas at about a quarter wavelength distance between adjacent antennas ensures a spatial diversity which enhances the efficiency of the system. In this structure, the signal will be received from both antennas and compared with each other and the stronger signal will be selected between the two. This technique has been proven to be efficient in mitigating multipath fading in dynamic and static environments.

Many structures have been presented for Ultra-Wide Band (UWB) antenna diversity in the literature. However, most of these structures are based on monopole antennas with a relatively omnidirectional radiation pattern. Using omnidirectional antennas for diversity reduces the efficiency of this technique since the radiation patterns of the antennas will overlap and the signal will still be reaching both antennas from various paths. Accordingly, it is preferred to use multiple directive antennas oriented in different directions to ensure spatial filtering of the undesired signals.

Accordingly, the inventors have established a new type of compact antenna diversity structure to employ with UWB transmitters, UWB receivers and UWB transceivers exploiting techniques according to embodiments of the invention, those described and depicted within WO/2019/000,075, WO 2016/191,851, and WO/2015/103,692, together with other aspects of these UWB devices not described here or elsewhere. The inventive antenna system is composed of two UWB planar microstrip dipole antennas that provide spatial and polarization diversity by having a directive radiation pattern. A compact structure, wideband impedance matching, stable gain over the bandwidth, and perfect envelope correlation between antennas are the main features of this structure making it a strong candidate for high data rate applications.

4B. Antenna Structure

Figure 7:
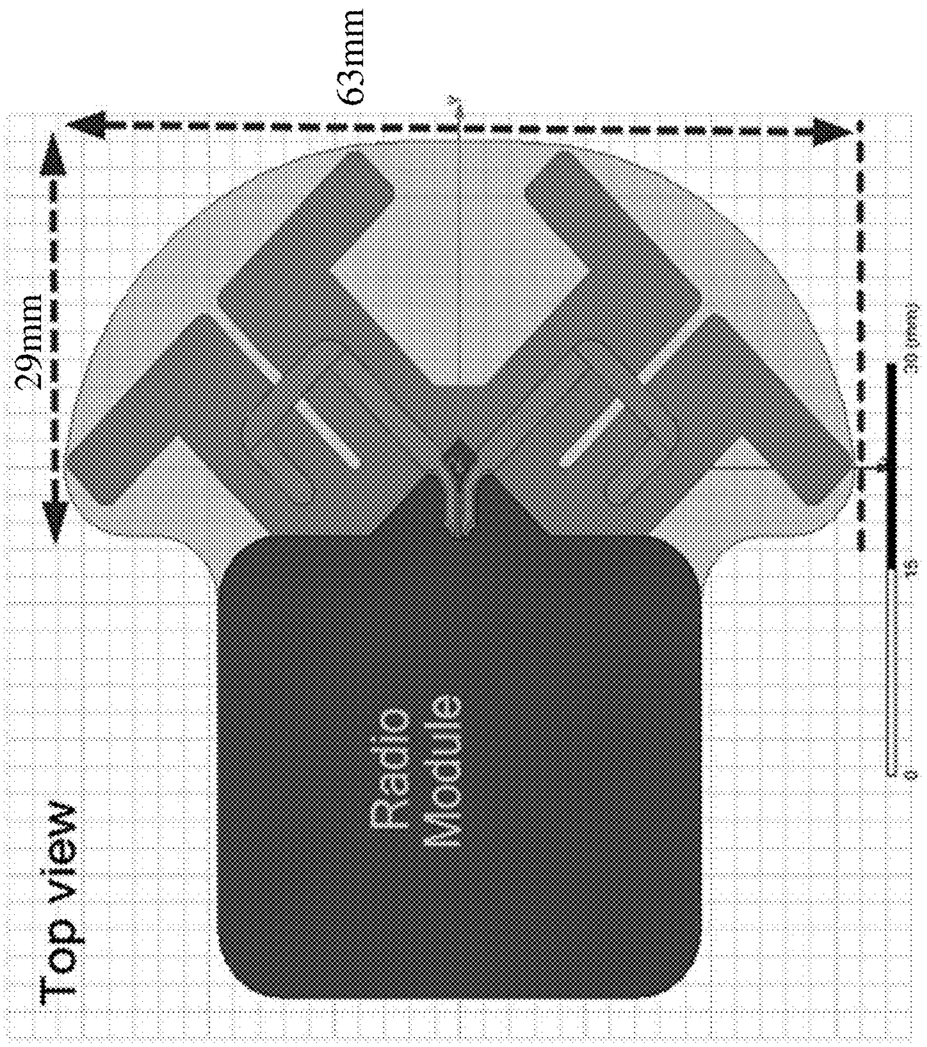
FIG. 7 depicts a compact diverse dipole antenna according to an embodiment of the invention.

The structure of the antenna is depicted in FIG. 7. It is composed of two wideband dipole antennas with integrated baluns. The two dipoles are placed with 90° angle relative to each other to ensure maximum polarization diversity. As can be observed in FIG. 7, the whole structure is compact, low profile, and low cost making it suitable for various high data rate indoor applications.

4C. Simulation Results

Figure 8A:
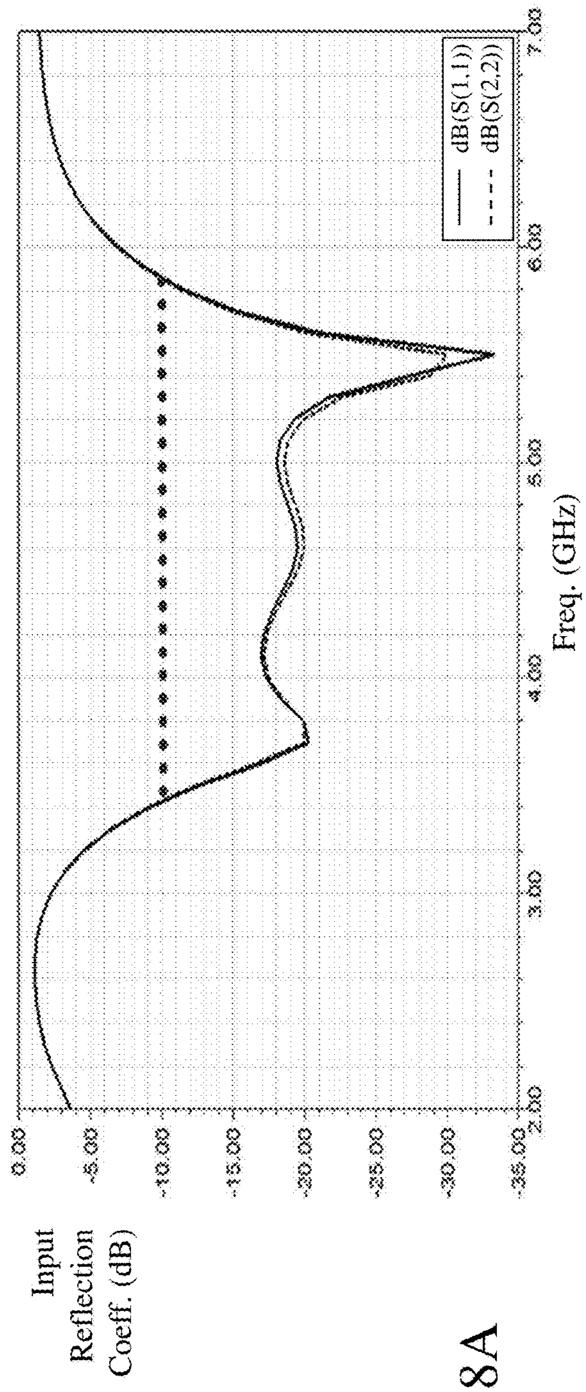
FIGS. 8A and 8B depicts experimental results for a diverse dipole antenna according to the design of FIG. 7 designed for 3.5 GHz-5.5 GHz.
Figure 8B:
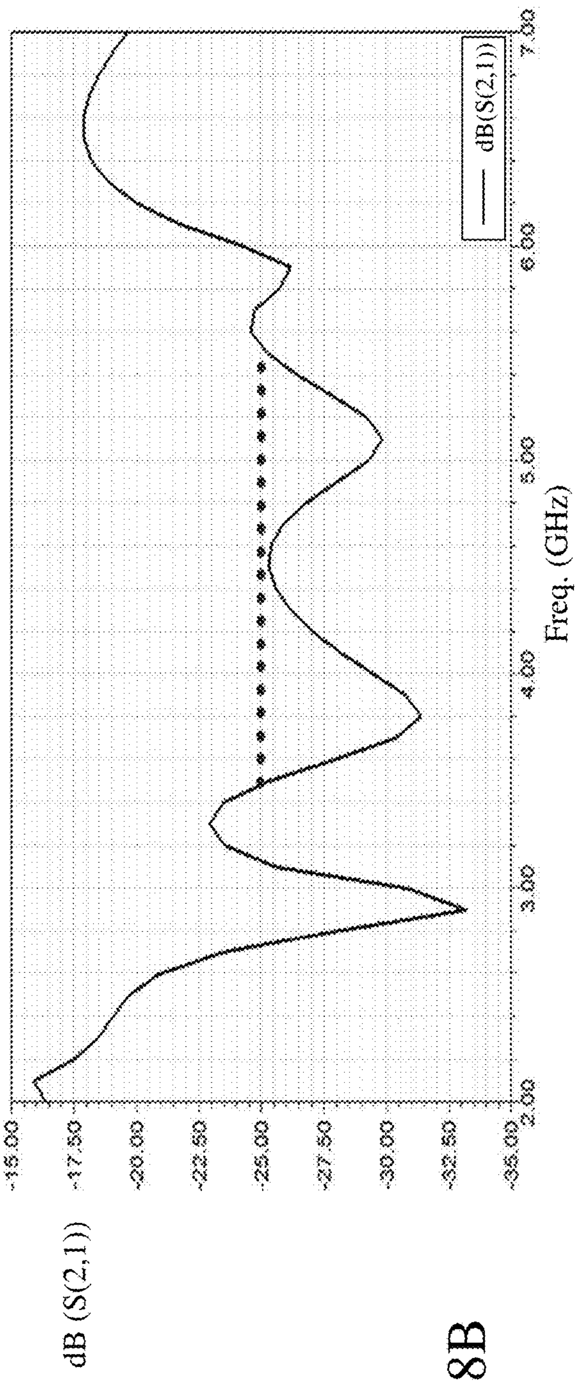

The antenna has been simulated using full wave FEM method in ANSYS HFSS, a 3D electromagnetic field simulator for RF and wireless design. The |S11| (dB) results are depicted in FIG. 8A showing that both antennas are perfectly matched from 3.4 GHz to 5.8 GHz covering a desired frequency band of interest of UWB wireless radios developed by Spark Microsystems of Montreal, Canada. The antennas are perfectly isolated with a S21 value below −25 dB from 3.5 GHz to 5.5 GHz as evident from FIG. 8B. This is mainly due to the directive nature of the antennas that radiate in two distinct directions. A good isolation between antennas will ensure a low envelope correlation and therefore higher diversity gain.

Figure 9B:
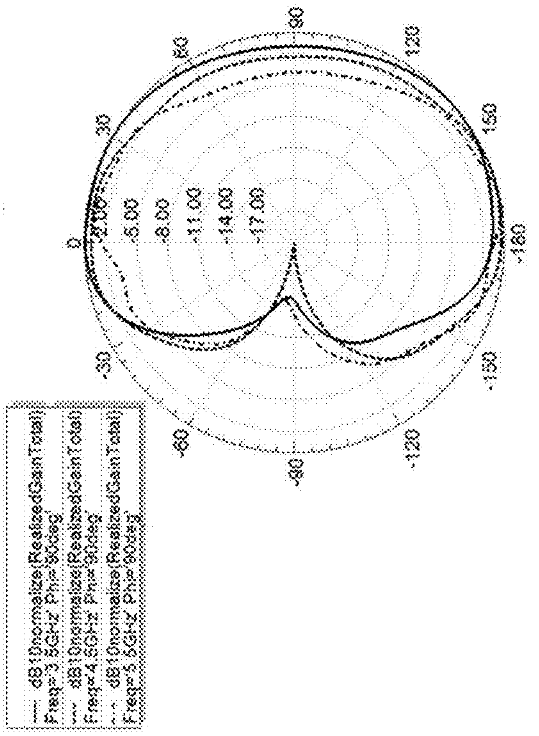
FIGS. 9A to 9C depict antenna radiation patterns for a diverse dipole antenna according an embodiment of the invention as depicted in FIG. 7 designed for 3.5 GHz-5.5 GHz for three different planes.
Figure 9A:
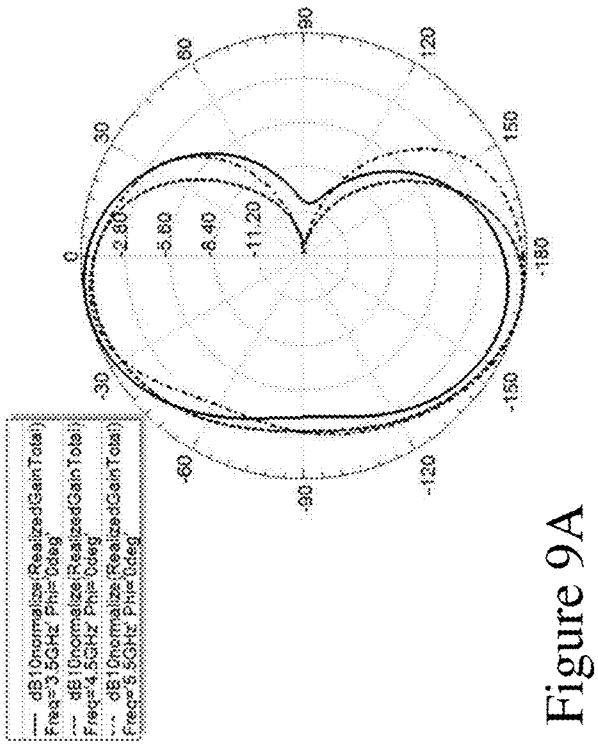
Figure 9C:
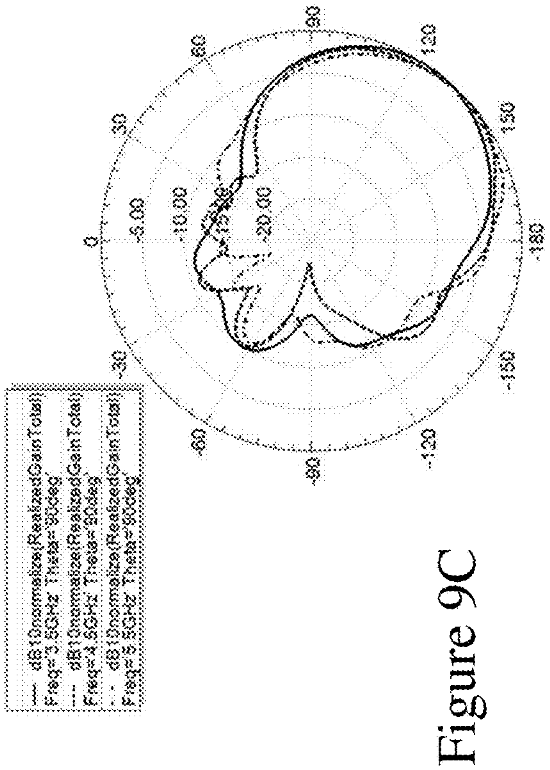

The radiation patterns of the antenna are presented in FIGS. 9A to 9C respectively for different frequencies and three different planes: φ=0°, θ=90°, 0=90° respectively. As it can be observed from these FIGS. 9A to 9C respectively the radiation pattern is completely directional and only one side of the UWB radio is illuminated at once. This allows for the attenuation of the multipath signals that are being received from the other direction. When the antenna is switched, the other side of the radio will be active. Therefore, a complete spatial diversity is achieved while the combination of the two antennas cover the whole space around the wireless radio module.

In addition to the above-mentioned features, the antenna has a uniform radiation pattern in various frequencies which ensures a stable link quality all over the desired frequency band.

Figure 10A:
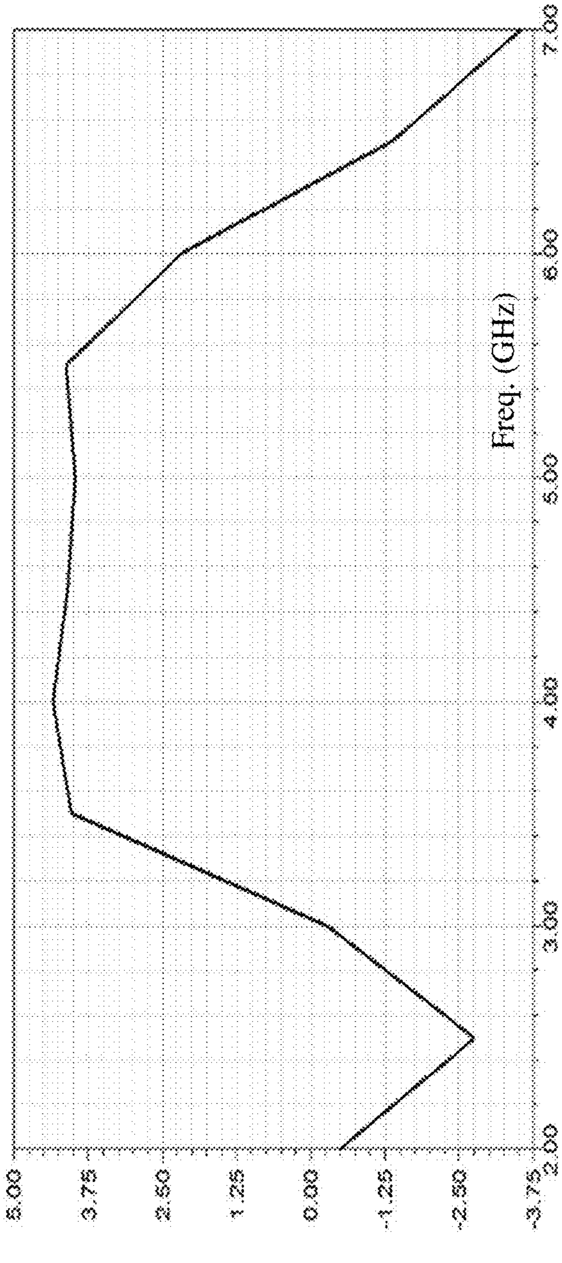
FIGS. 10A and 10B depict the antenna gain and radiation efficiency of a diverse dipole antenna according an embodiment of the invention as depicted in FIG. 7 designed for 3.5 GHz-5.5 GHz for three difference planes.
Figure 10B:
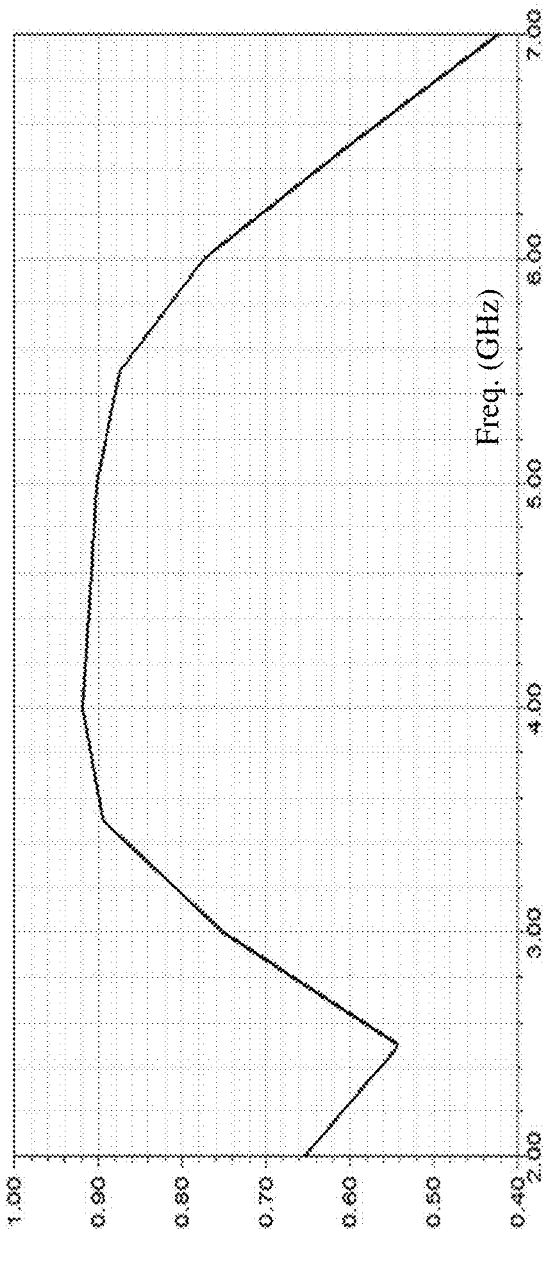

The peak realized gain of the antenna is depicted in FIG. 10A where it is evident that the peak realized gain remains around 4 dB from 3.5 to 5.5 GHZ. Therefore, by using this antenna the wireless radio will be able to use a single output power profile over the bandwidth. Moreover, the antenna will attenuate the signal outside of the desired bandwidth. Due to the high realized gain of the antenna, the coverage range of the wireless radio is enhanced in indoor as well as outdoor environments. The radiation efficiency of the antenna is also depicted in FIG. 10B with more than 90% over the desired range of frequency.

The antenna diversity performance can be analyzed using a metric called the Envelope Correlation Coefficient (ECC). It is a measurement that shows how correlated the antennas are. Since the antennas have completely distinct polarizations and are well isolated, the ECC is expected to be very low for this configuration. ECC can be calculated using the S-parameters of the two antennas using Equation (1).

$$ECC = \frac{|S_{11}^{*}S_{12} + S_{21}^{*}S_{22}|^2}{(1 - |S_{11}|^2 - |S_{21}|^2)(1 - |S_{22}|^2 - |S_{12}|^2)} \quad (1)$$

Figure 11:
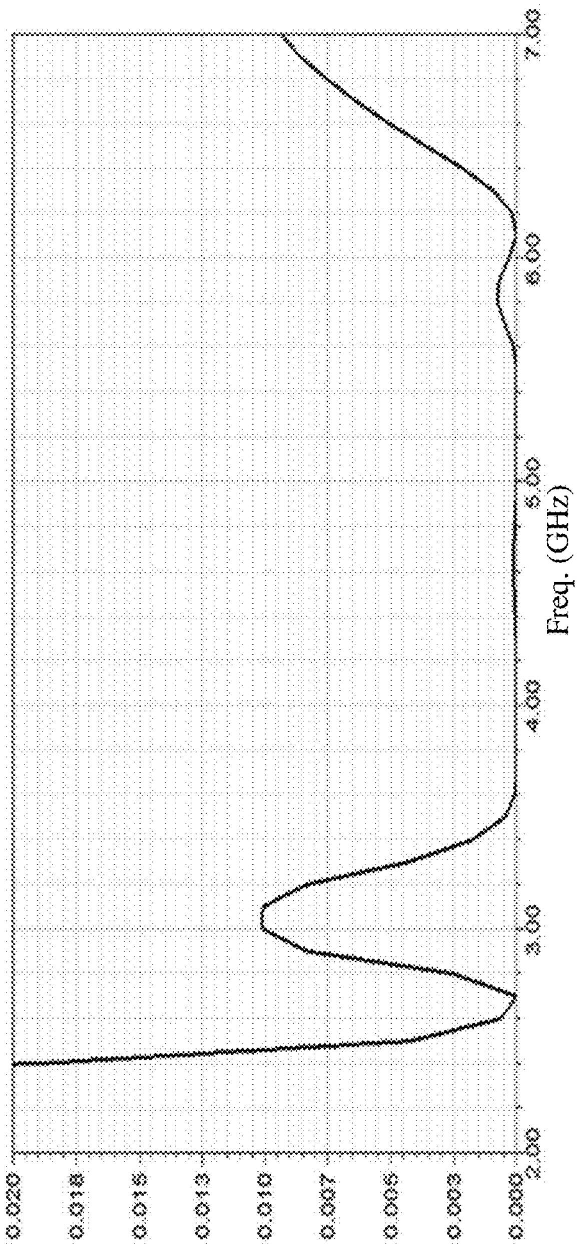
FIG. 11 depicts the Envelope Correlation Coefficient for a diverse dipole antenna for an embodiment of the invention.

The resulting ECC is depicted in FIG. 11. As expected, very low values of ECC are achieved over the operating bandwidth resulting in a very good diversity efficiency of the antenna.

5. UWB Loop Antenna with Parasitic Elements

5A. Overview

Figure 12:
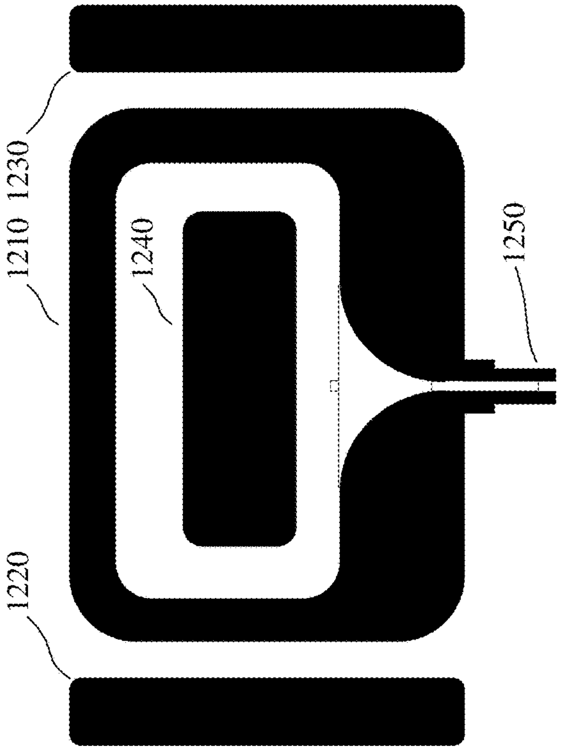
FIG. 12 depicts a loop antenna with parasitic elements according to an embodiment of the invention.

This inventive antenna uses a loop element driven differentially. As depicted in FIG. 12 the loop element 1210 is coupled to a differential feed 1250. Disposed either side of the loop are first and second parasitic (non-driven) elements 1220 and 1230 respectively together with a third parasitic element in the center of the loop. The first and second parasitic elements 1220 and 1230 are coupled to the ground plane underneath and are used to tune the lower frequency cutoff. The center third parasitic element 1240 employed to tune the higher cutoff frequency. Further the first to third parasitic elements 1220 to 1240 respectively allow for a reduction in the overall size of the antenna.

5B. Performance

Figure 13A:
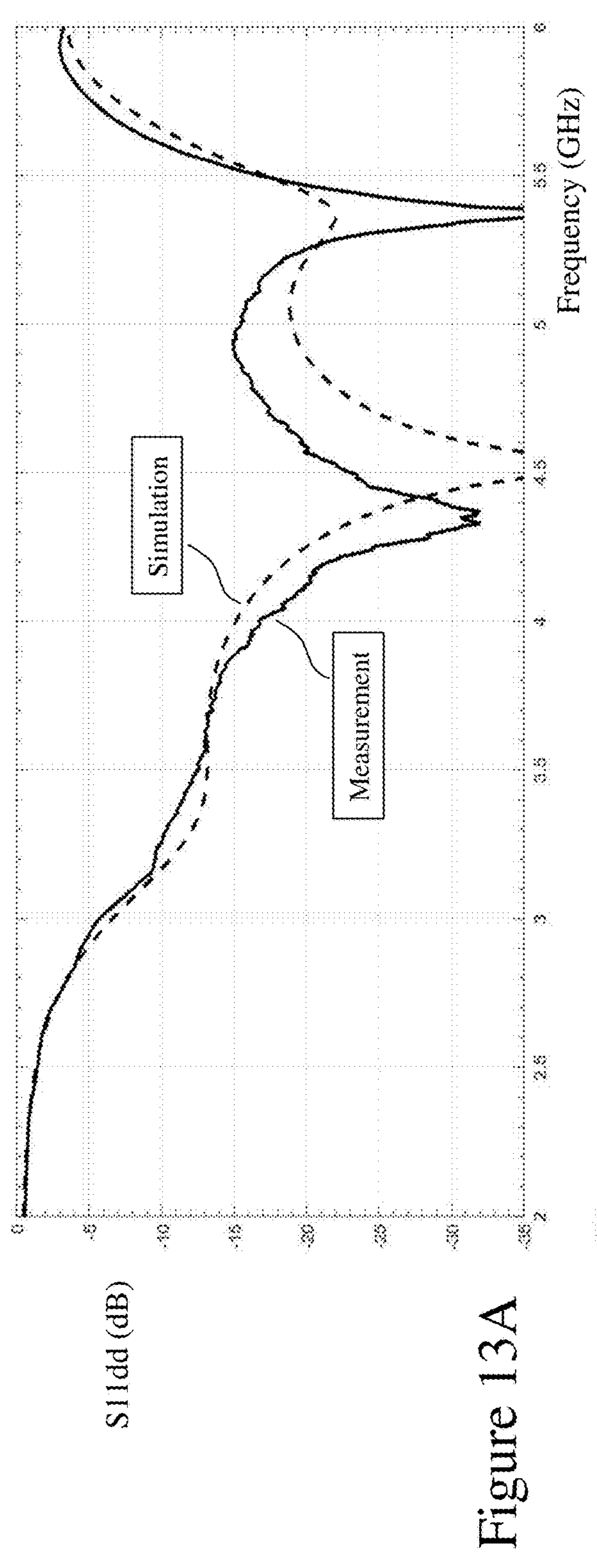
FIGS. 13A to 13D depict the influence of the central and side parasitic elements within a loop antenna according to an exemplary embodiment of the invention as depicted in FIG. 12.
Figure 13B:
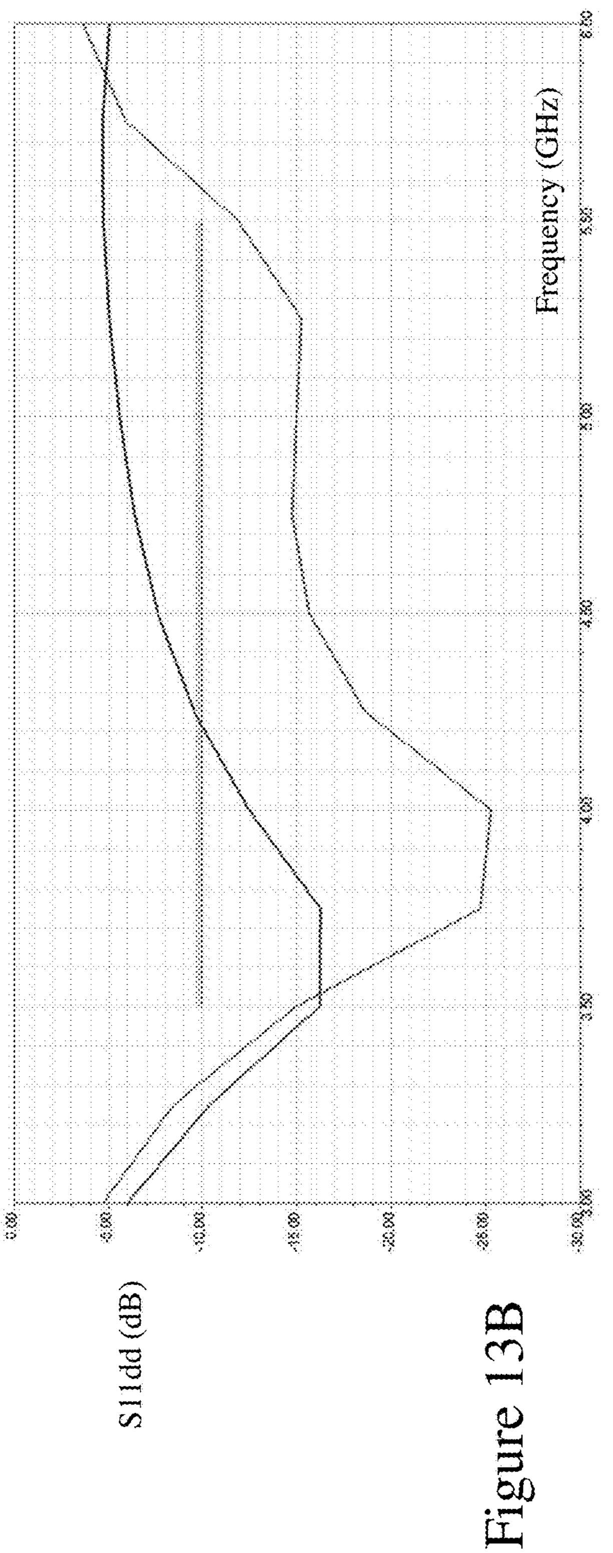
Figure 13C:
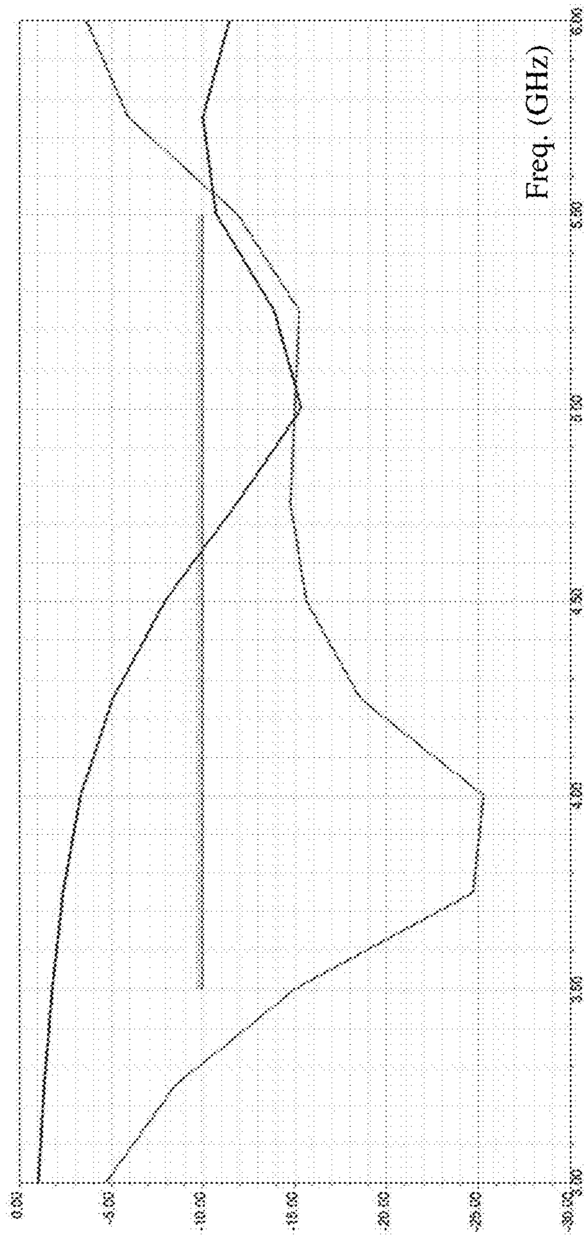
Figure 13D:
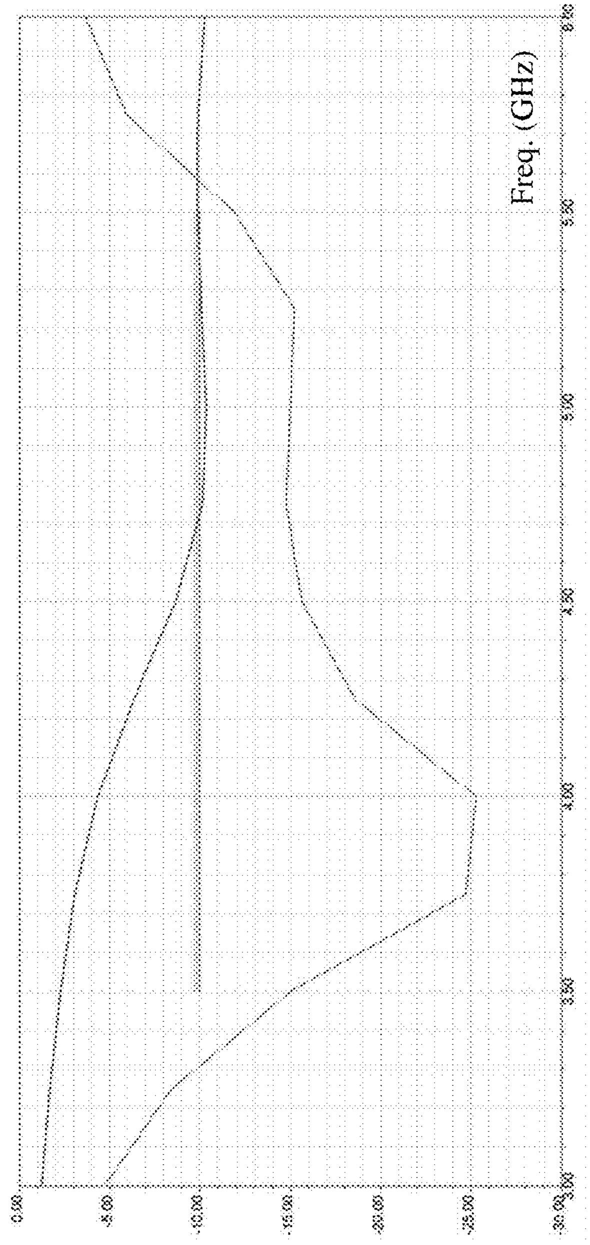

FIG. 13A depicts the |S11dd| (dB) results for UWB loop antenna with parasitic elements over the frequency range 2 GHz-6 GHz as measured and simulated. Referring to FIG. 13B the influence of the central resonator on the nominal |S11dd| is depicted whereas FIG. 13C depicts the influence of the side resonators on the nominal |S11dd|. Accordingly, FIG. 13D depicts the performance of the antenna with and without all resonators.

Figure 14A:
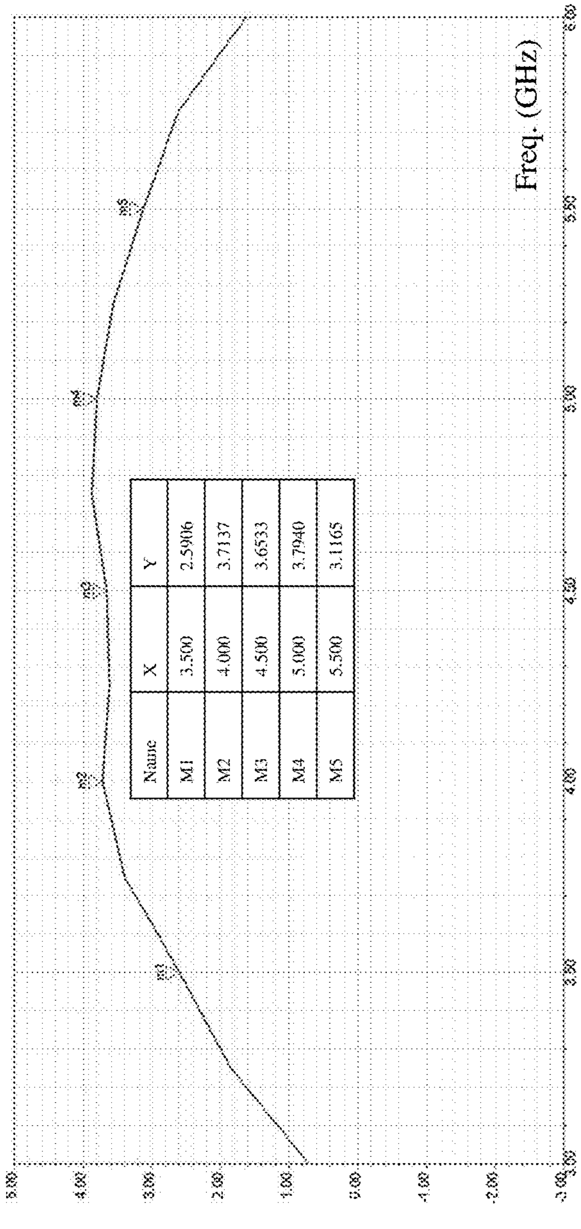
FIG. 14A depicts the gain pattern variation from changing the length and position of the parasitic elements within a loop antenna according to an embodiment of the invention as depicted in FIG. 12.
Figure 14B:
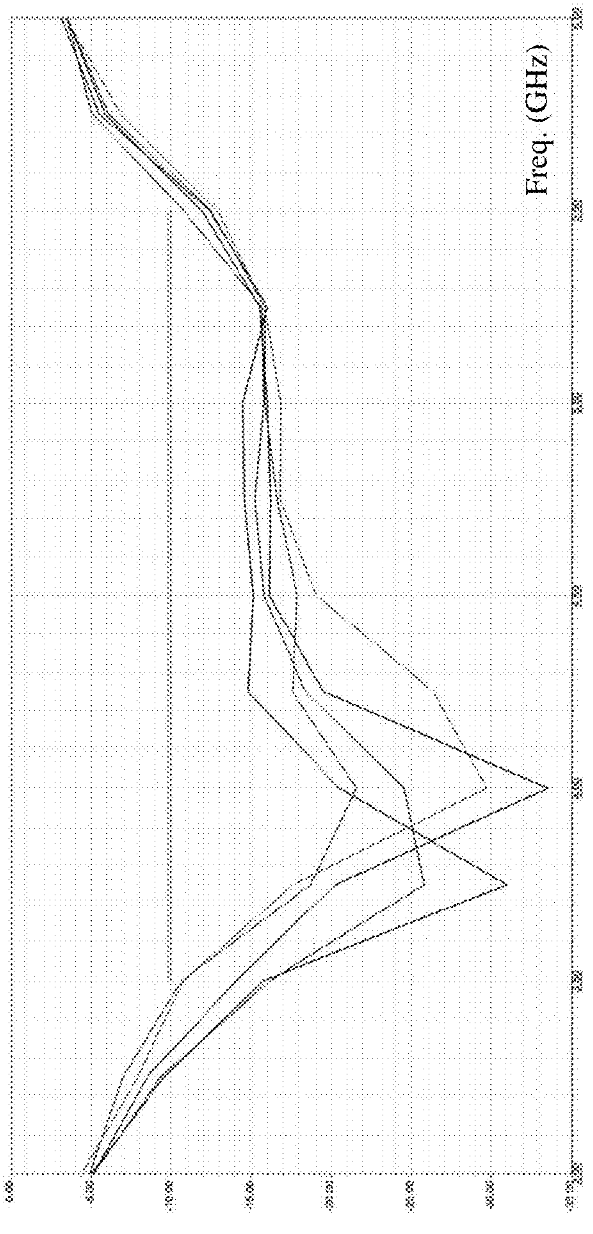
FIG. 14B depicts the minimal influence on ground plane with for a loop antenna according to an embodiment of the invention as depicted in FIG. 12.

The antenna is omnidirectional and has a low gain that is stable in frequency. It is possible to tune the gain pattern by changing the position and length of the resonators. FIG. 14A depicts the gain of the antenna with respect to frequency. Referring to FIG. 14B it is evident that the antenna matching is minimally affected by the width of the ground plane wherein |S11dd| (dB) results over the frequency range 2 GHz-6 GHz are depicted for different ground plane sizes, from 35 mm to 200 mm. FIGS. 13A-13D and 14A-14B depict |S11dd| which is a mixed-mode S-parameter relating to the power reflected in the differential mode.

Figure 14C:
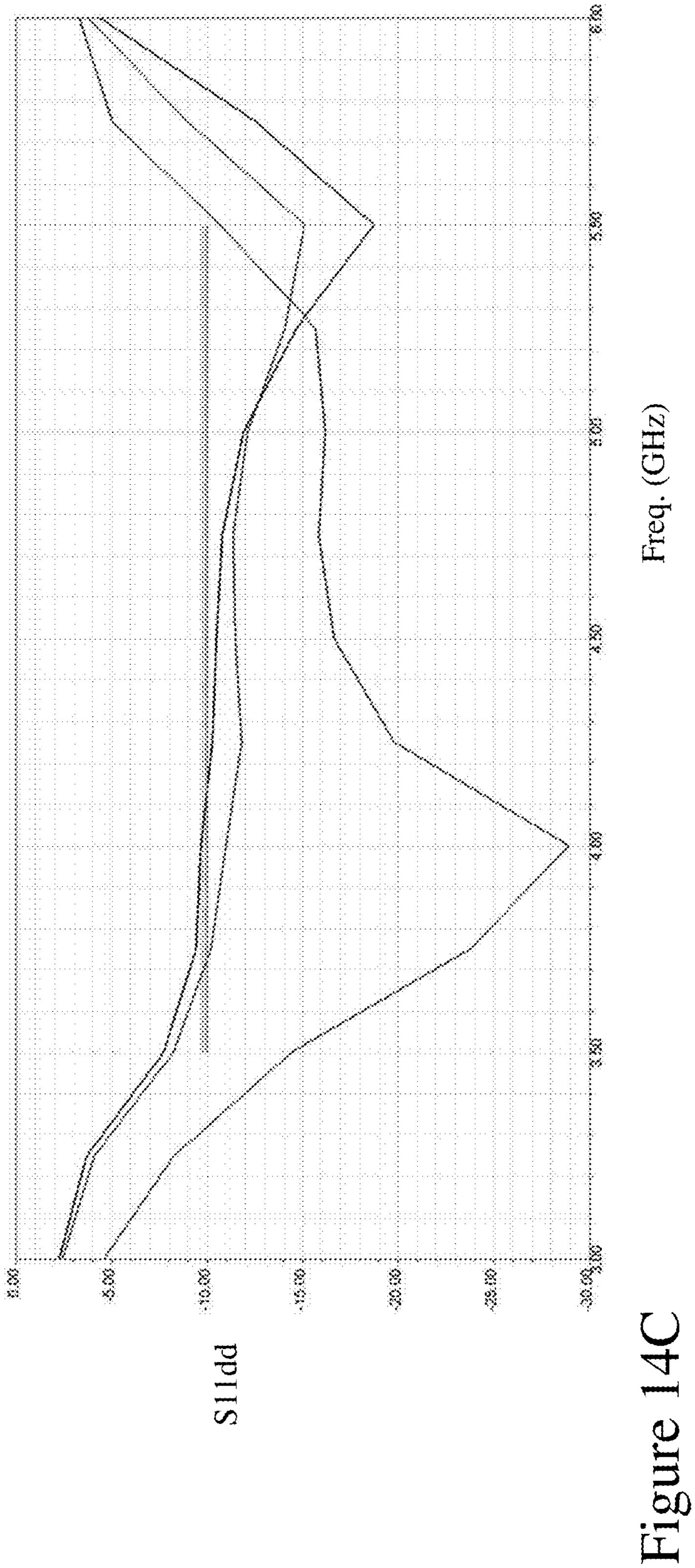
FIG. 14C depicts the influence of flesh like substance upon a loop antenna according to an embodiment of the invention as depicted in FIG. 12.
Figure 15A:
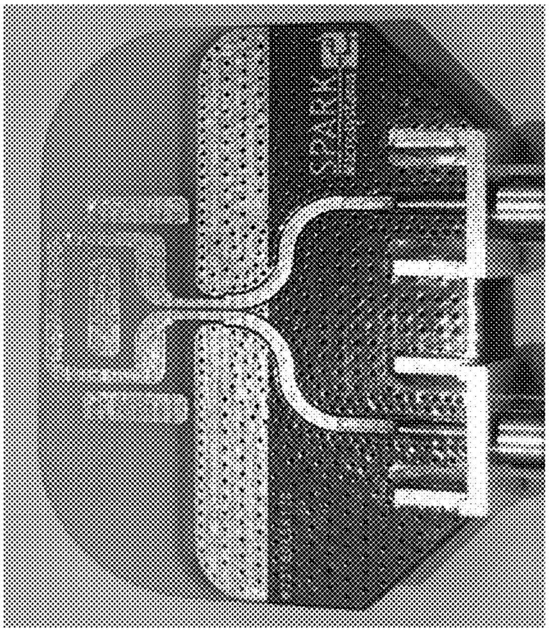
FIGS. 15A and 15B depict fabricated antennas according to embodiments of the invention for operation at 3.5-5.5 GHz and 6-9 GHz respectively.
Figure 15B:
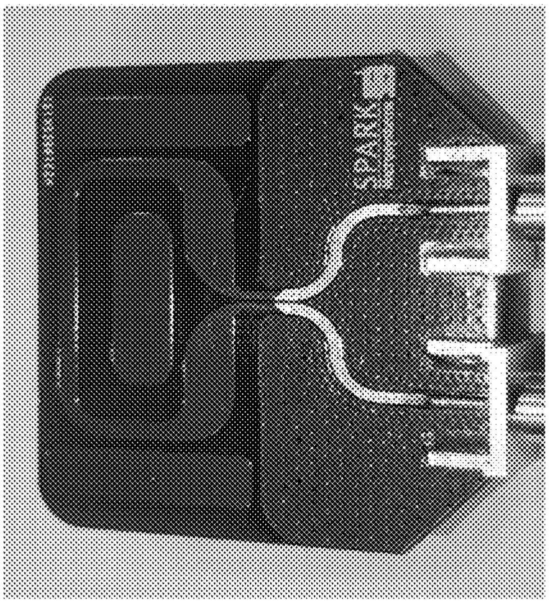
Figure 15C:
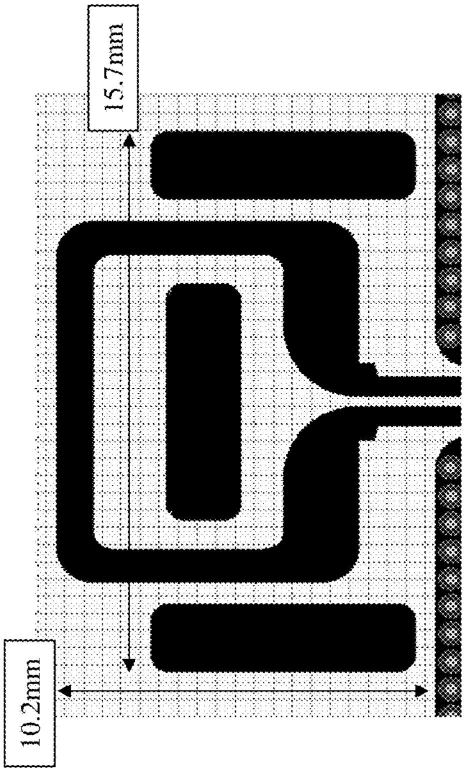
FIGS. 15C and 15D depict schematics of the antennas according to embodiments of the invention for operation at 3.5-5.5 GHz and 6-9 GHz respectively depicted in FIGS. 15A and 15B respectively.
Figure 15D:
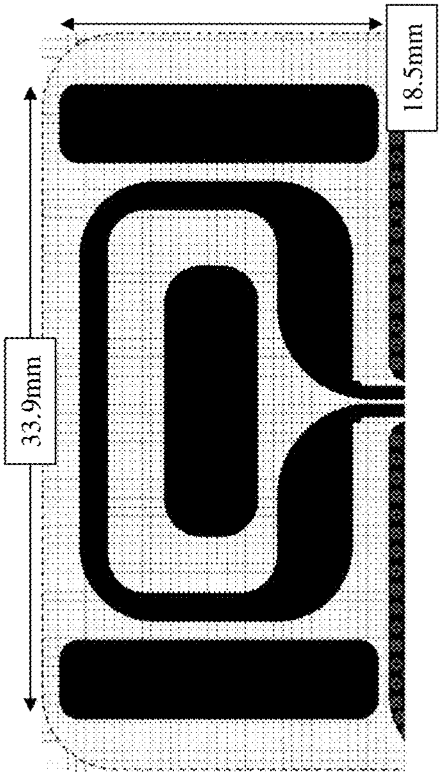

Similar results were obtained when flesh like substances were near the antenna indicating the antenna can be used in proximity of body parts without being detuned. These results being depicted in FIG. 14C Referring to FIGS. 15A and 15B there are depicted two antenna designs employing the same design methodology. In both cases, the substrate has a width of 40 mm (1.6 inches). The antenna in FIG. 15A is designed for operation over a frequency range of 6 GHz-9 GHz and measures 10 mm×16 mm (~0.4 inch×0.65 inch) whilst that in FIG. 15B is designed for operation over 3.5 GHz-5.5 GHz and measures 19 mm by 34 mm (~0.75 inch×1.4 inch). Schematics of the two antennas being depicted in FIGS. 15C and 15D respectively.

5C. Filtering

Figure 16A:
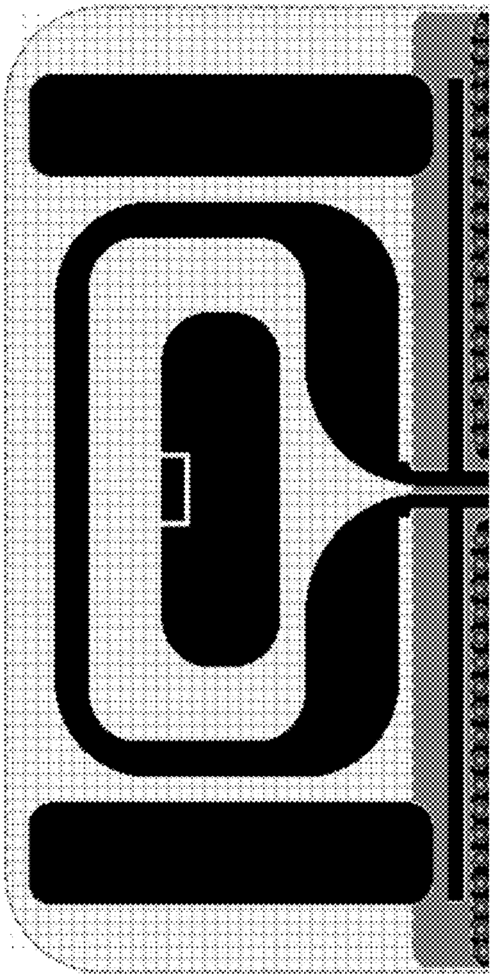
FIG. 16A depicts a stub-line filter implemented within a loop filter according to an embodiment of the invention.
Figure 16B:
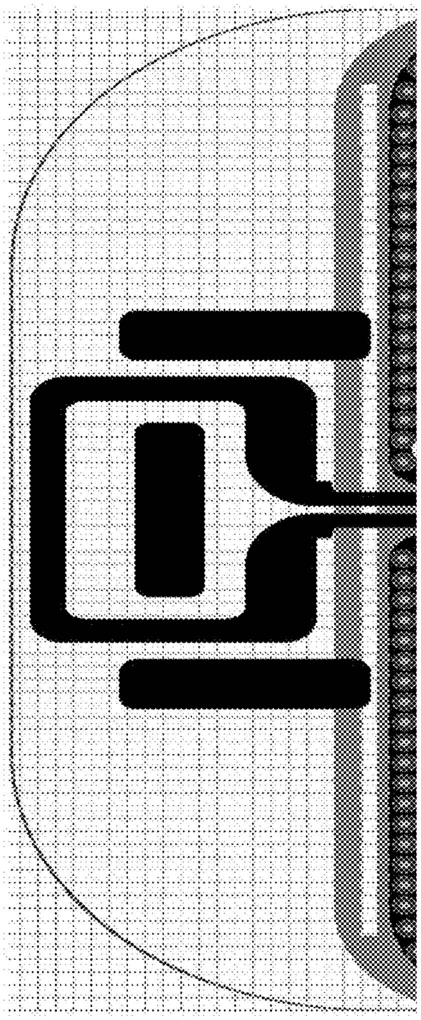
FIG. 16B depicts a slot-line filter implemented within a loop filter according to an embodiment of the invention.

The inventors have further modified the loop antenna to add band-stop filtering as well as allowing for lower frequency cutoff tuning and high frequency cutoff tuning through the parasitic elements, such as first to third parasitic elements 1220 to 1240 respectively in FIG. 12. Accordingly, the inventors have employed a stub-line filter as depicted in FIG. 16A and a slot-line filter as depicted in FIG. 16B. As evident in FIG. 16A the stub-line filter is implemented as a notched region within the central third parasitic element whilst the slot-line filter is implemented within the edge portion of the ground plane beneath the differential feed to the loop antenna. Accordingly, the band stop filter increase the height of the antenna by 1 mm (~0.05 inch) whilst the common mode rejection slotline does not change the dimensions.

Figure 16C:
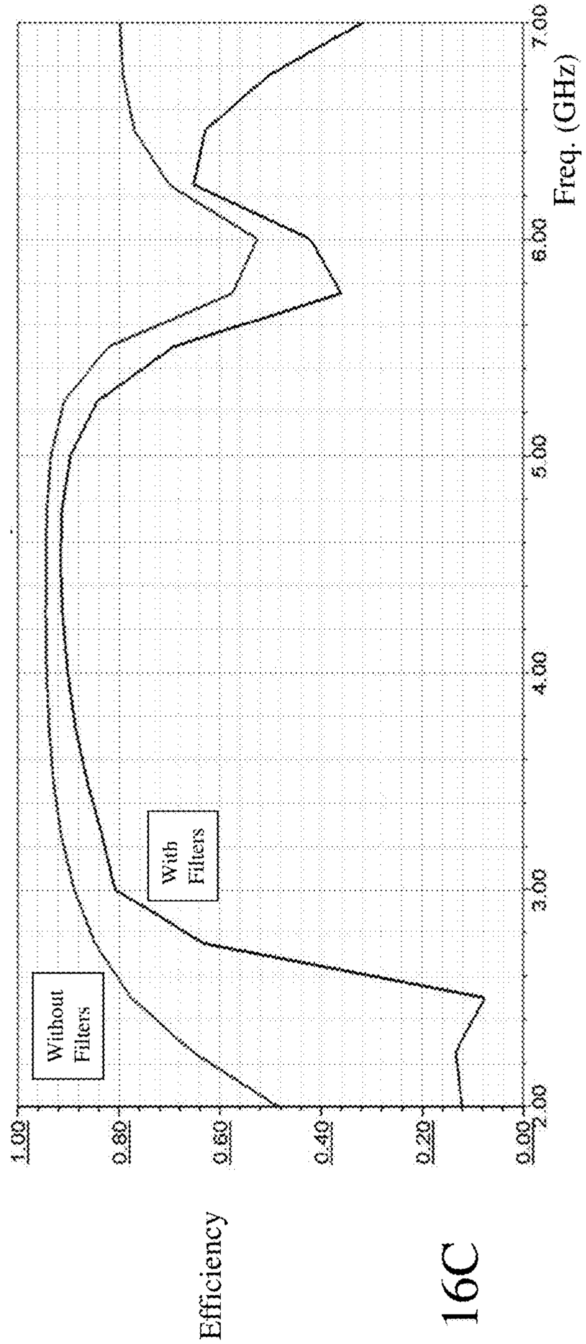
FIG. 16C depicts the results for a stub-line filter implemented within a loop filter according to an embodiment of the invention.
Figure 16D:
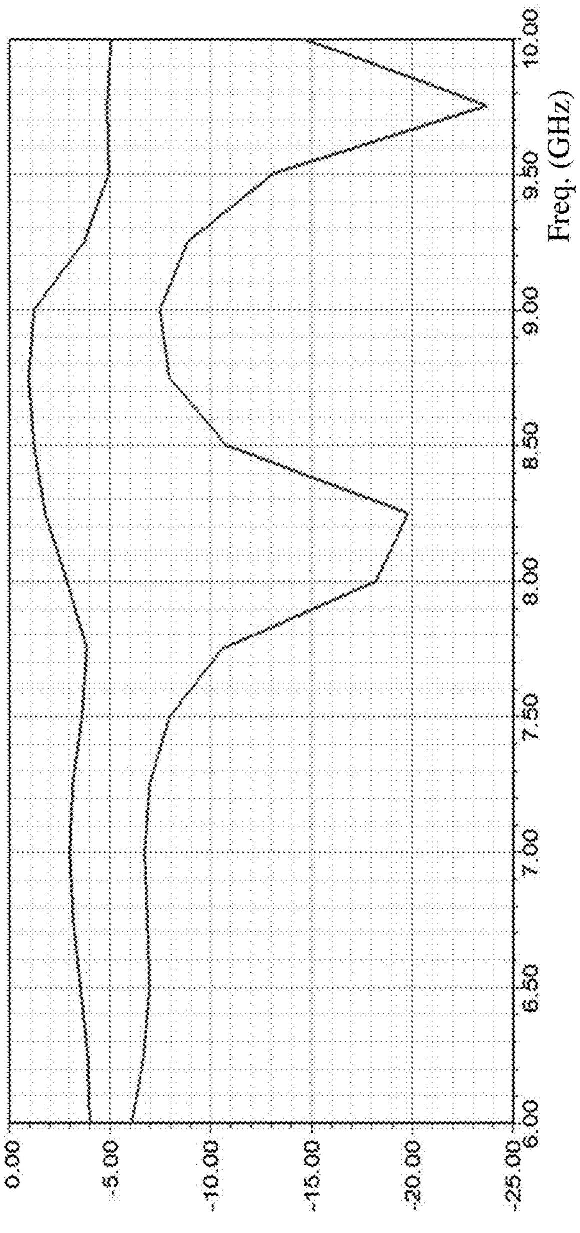
FIG. 16D depicts the results for a slot-line filter implemented within a loop filter according to an embodiment of the invention.

The band stop filters can reduce the efficiency near the 2.5 GHZ and 5.75 GHz ISM bands as evident from FIG. 16C. The slotline filter reflects the common mode resulting in the performance depicted in FIG. 16D.

6. Wideband Rat-Race Balun with Common Mode Absorption and Harmonic Rejection

6A. Overview

As noted above in Section 5 a loop antenna forming part of a diversity antenna according to embodiments of the invention has a single feed. Accordingly, a wireless radio exploiting such antennas may require a BALUN (BALanced to UNbalanced) to couple differential circuit of the wireless radio electronics to the single ended feed of the loop antenna. This being, for example, differential outputs of a RF signal generator may be coupled to a single ended transmit antenna or a single ended receive antenna is coupled to differential inputs of a RF receiver front end. A balun is a reciprocal device meaning that it can be used in both directions and accordingly in embodiments of the invention a wireless radio may employ a single diversity antenna for both transmit and receive or within other embodiments of the invention different antennas may be employed for transmit and receiver functionality whilst in other embodiments of the invention a single antenna may be used in conjunction with a receive only wireless radio or a transmit only wireless radio.

If the balanced ports of the balun are excited with two similar signals with the same phase, they will be either rejected or absorbed. This is called the common mode rejection feature of the balun. In some situations, it is desired to absorb the common mode signal and guide it to the ground plane. There are several approaches to design a balun in microwave frequencies. In most of these methods, the balun is usually designed with three ports and the common mode is usually reflected. However, where it is desired to absorb the common mode signal then it is necessary to have a four-port structure from which both the differential and common mode signals can be extracted.

Within this section the inventors describe an innovative compact folded planar balun design based upon a microstrip 180° rat-race hybrid with low loss and wideband performance. The 180° hybrid junction is a four-port network that can be designed in several forms. The rat-race hybrid junction can be designed in planar form using microstrip or coplanar transmission lines and has the benefits of being low profile and compact.

6B. Folded Balun and Simulation Results

The main feature of a rat-race hybrid is that if it is excited on ports 2 and 3, the sum of the signals will be at port 1 whereas port 4 will output their difference. These ports being depicted in FIG. 17A which depicts a plan view of the rat-race hybrid balun. Accordingly, this feature can be used to design a balun from a rat-race hybrid. If the ports 2 and 3 are excited with a differential signal, then the unbalanced signal will be seen at port 4 and the common mode signal can be absorbed by a load connected to at port 1 as also depicted in FIG. 17A with a resistor, R_absorb, coupled between port 1 and ground. If the hybrid is completely matched, there will be no reflection of the common mode and signal integrity problems can be avoided.

Figure 17B:
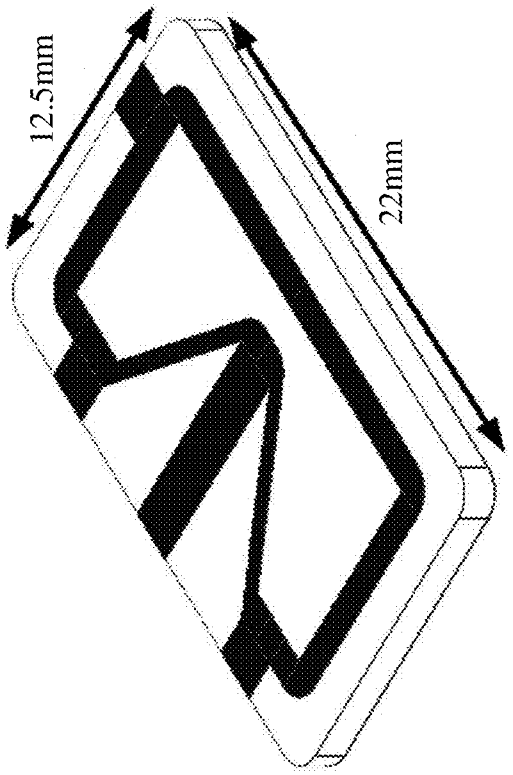
FIG. 17B depicts a perspective view of a rat-race hybrid balun according to an embodiment of the invention.
Figure 17A:
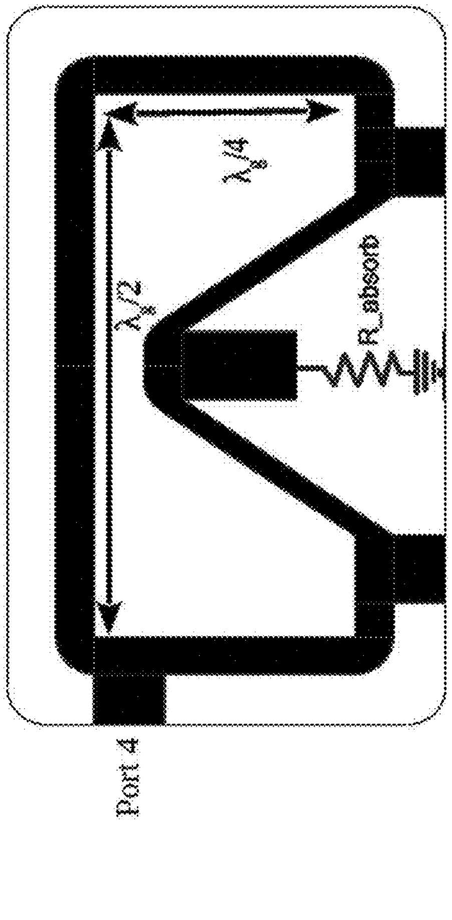
FIG. 17A depicts a plan view of a rat-race hybrid balun according to an embodiment of the invention.
Figure 18A:
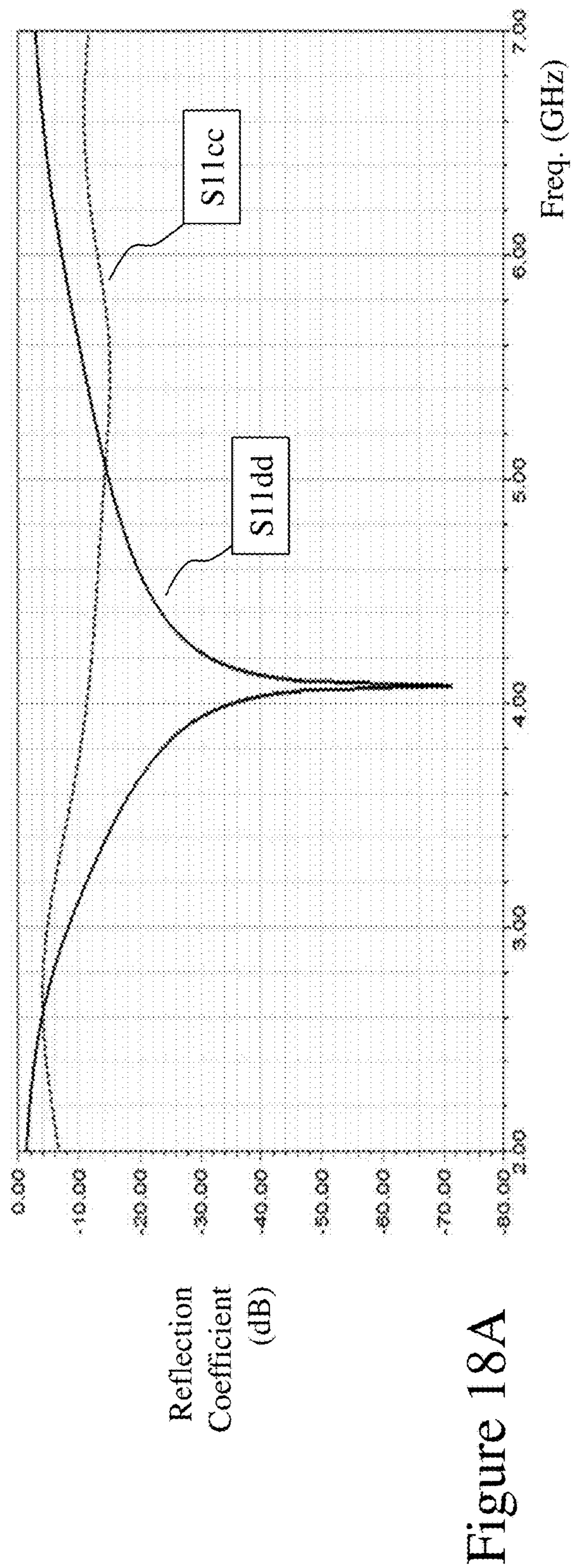
FIG. 18A depicts the return loss for a rat-race hybrid balun according to an embodiment of the invention.
Figure 18B:
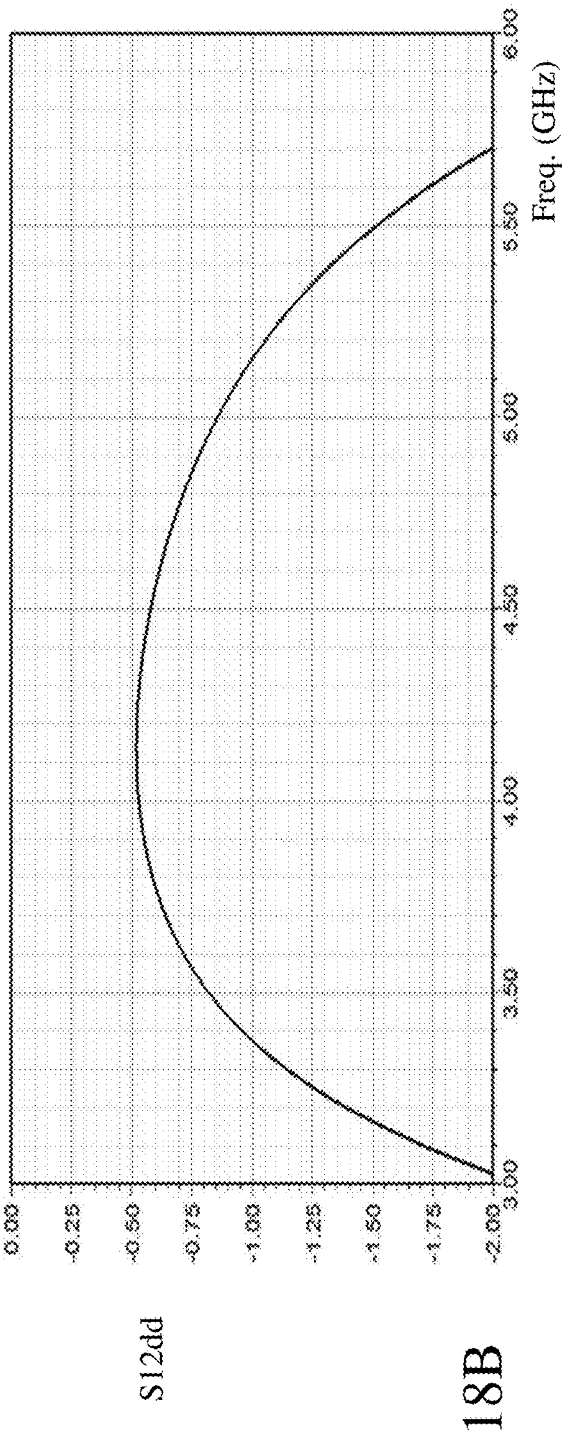
FIG. 18B depicts the insertion loss for a rat-race hybrid balun according to an embodiment of the invention.

FIG. 17B depicts a three dimensional depiction of the structure of the rat-race balun which can be seen to employ a folded structure in a rectangular shape thereby allowing the overall dimensions of the structure to be reduced. The dimensions shown in FIG. 17B of 22 mm×12.5 mm (0.85 inch×0.5 inch) representing a folded rat-race balun designed for operation over 3.6 GHz to 5.1 GHz. The simulated differential and common mode reflection coefficients are depicted in FIG. 18A whilst FIG. 18B depicts the insertion loss of the rat-race balun.

As evident from FIG. 18A a good differential S11 of below −10 dB from 3.1 GHZ to 5.6 GHz and a common mode matching of below −10 dB from 3.7 GHZ and above are achieved using this structure. This means that the reflection of the common mode is avoided and, as explained before, can be absorbed from port 1. Moreover, as can be observed in FIG. 18B, this structure has a very low insertion loss with a maximum of −1.5 dB at 5.5 GHZ. This ensures the efficiency of the system when the balun is integrated with other circuit elements such as filters and antenna.

Figure 19A:
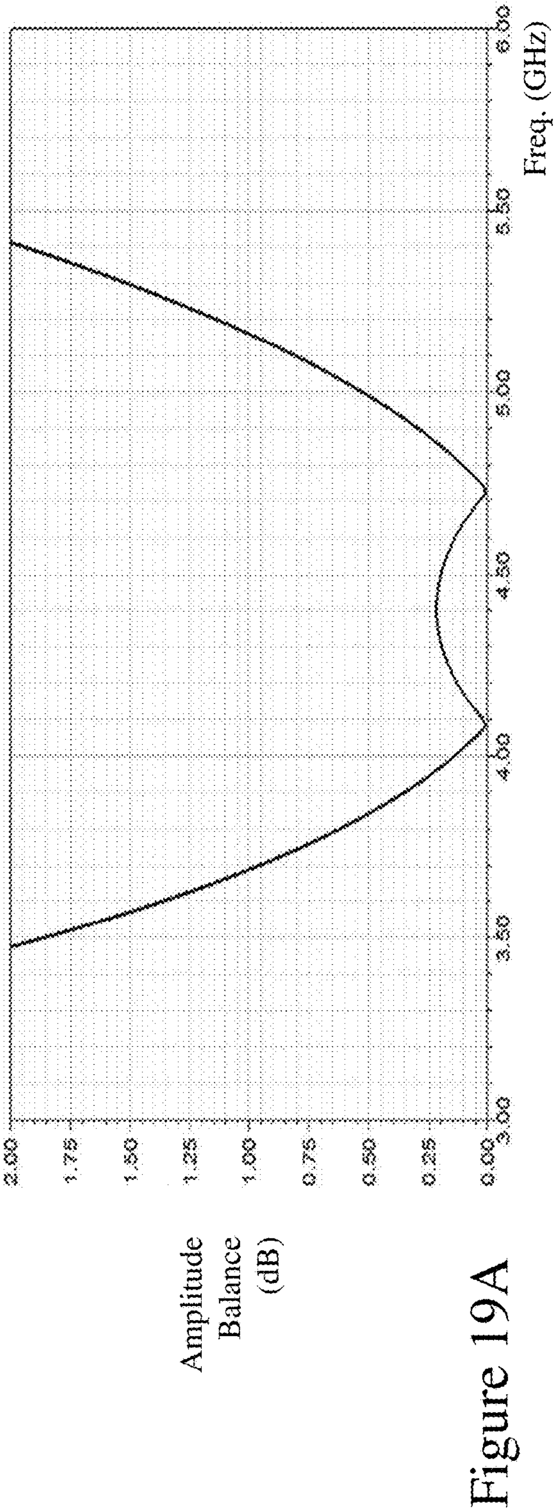
FIGS. 19A and 19B depict the amplitude and phase balance of a rat-race hybrid balun according to an embodiment of the invention.
Figure 19B:
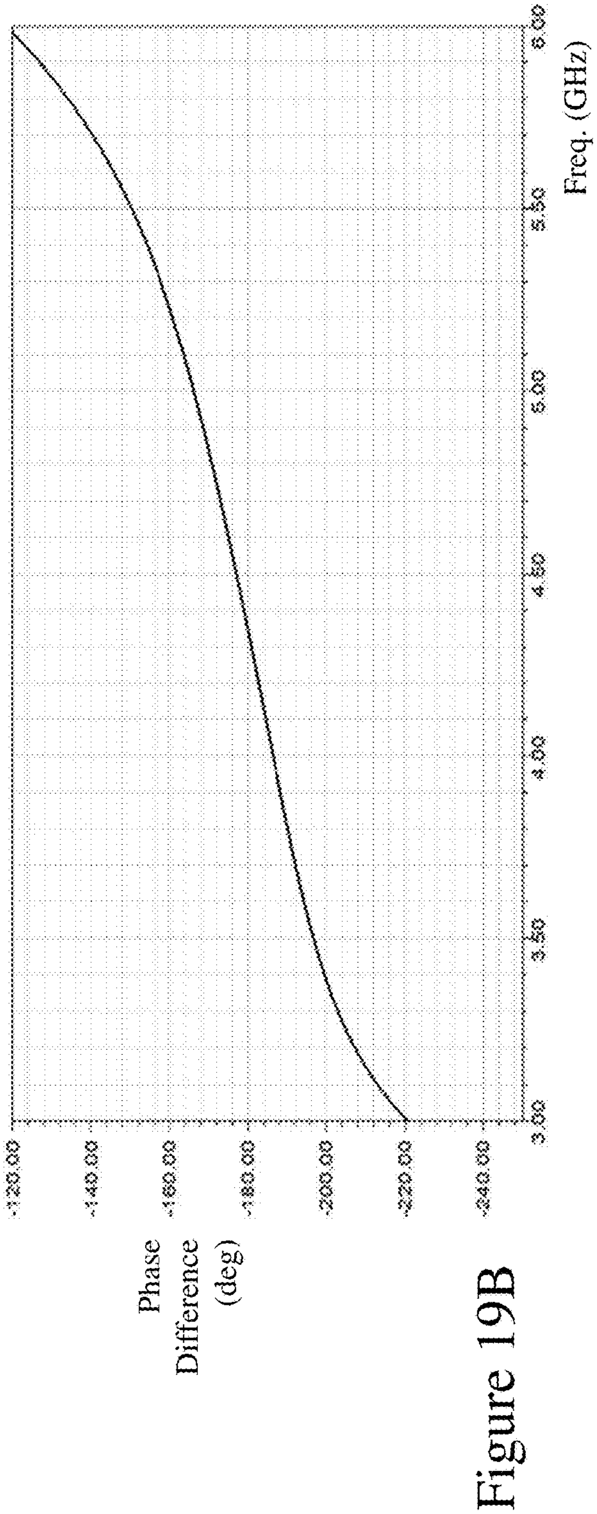

Another two important features of a balun to be analyzed are the amplitude and phase balance with simulated values being depicted in FIGS. 19A and 19B respectively. The amplitude balance indicates the difference in the amplitude of the received signal at port 4 when excited from ports 2 and 3. Ideally this value should be 0 dB over the entire frequency band of interest but typically a maximum difference of about 1.5 dB is acceptable in most applications. This value is respected in the proposed design from 3.6 GHz to 5.3 GHZ which is considered a wideband performance.

The phase difference at the output port should be exactly 180° at the center frequency and close to this value for the rest of the desired band. This balun presents a phase difference value of 180° at 4.3 GHz whilst at the lower and upper frequencies of interest at 3.5 GHZ and 5.5 GHZ respectively the phase difference is 196° and 150° degrees respectively. Accordingly, the phase variation is acceptable over the desired bandwidth.

Beneficially the inventive folded rat-race balun according to embodiments of the invention whilst demonstrating good performance over a wideband frequency range of interest, from 3.5 GHz to 5.5 GHz, provides significant benefits over current commercial baluns in that the structure is low cost, it can be printed onto a PCB, has low loss, and does not suffer from a common mode reflection.

7. Multi-Path/Cross Fading Mitigation Through Multi-Frequency Pulse Banding

As described above in respect of Sections 0 to 3 the inventors have established innovative wireless radios exploiting multi-frequency pulse bundles per transmitted bit allowing the PSD of each bit to be established through the cumulative spectral properties of the multiple pulses within each multi-pulse bundle. These concepts also being described within WO/2019/000,075, WO 2016/191,851, and WO/2015/103,692.

Figure 20:
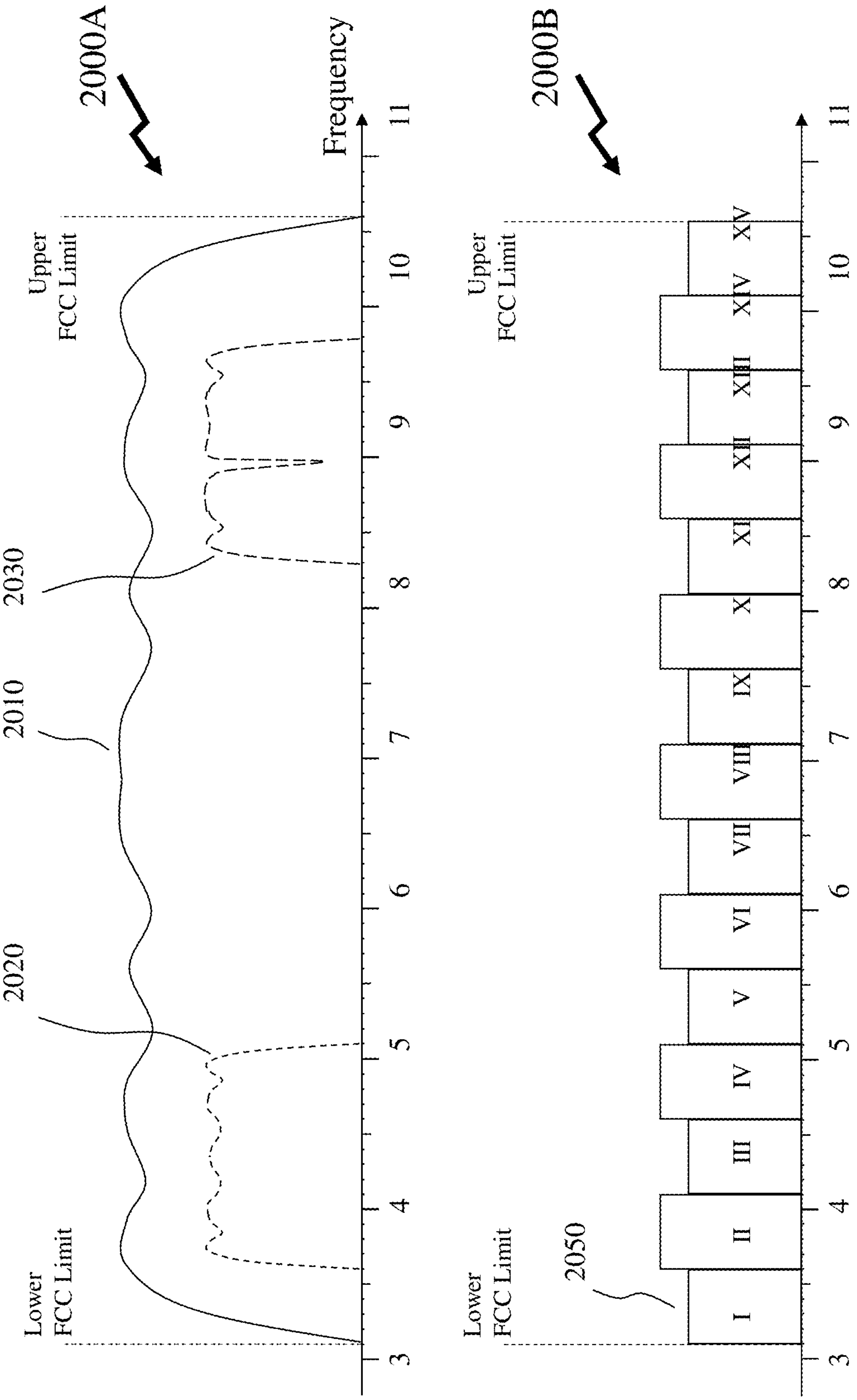
FIG. 20 depicts an exemplary segmentation of a frequency band into a plurality of sub-bands together with simulated output power spectra for UWB transmitters operating over the full band, a sub-band, and a sub-band with a notch.

Referring to FIG. 20 in first image 2000A there is depicted a frequency band from 3 GHz to 11 GHz together with the FCC regulated lower and upper frequency limits for the unreserved frequency band within which wireless radio emission spectra (WRES) are depicted. First WRES 2010 representing a wireless radio operating such that the pulse bundles substantially fill the FCC unregulated spectrum from 3.1 GHz to 10.6 GHz. In contrast, second WRES 2020 and third WRES 2030 represent wireless radios operating upon smaller portions of this FCC unregulated spectrum, these being 3.6 GHz-5.1 GHZ and 8.3 GHZ-9.8 GHz respectively. Third WRES 2030 also depicting the scenario where the wireless radio has established a notch in its PSD at 9 GHz. It would be evident to one of skill in the art that the WRES for a wireless radio would be established by local emission regulations for wireless devices. It would be evident to one skilled in the art that wireless radios exploiting embodiments of the invention may operate over different total frequency ranges that that regulated by the FCC according to their deployment scenario such as defined by factors such as interoperability standards, application, environment, and jurisdiction for example. Further, it would be evident to one skilled in the art that wireless radios exploiting embodiments of the invention may operate over different frequency ranges which are portions of the total frequency ranges within those regulated or unregulated according to factors such as interoperability standards, application, environment, and jurisdiction for example. Accordingly, wireless radios according to embodiments of the invention may operate bandwidths such as 3.1 GHz-10.6 GHz, 3.6 GHz-5.6 GHz, and 5.25 GHz-5.75 GHz for example within the environments covered by FCC regulations.

Referring to second image 2000B the frequency range from 3.1 GHz to 10.6 GHz is depicted as being divided into 15 bands, I, II, . . . , XIV, XV. Each band being 500 MHz wide. It would be evident to one skilled in the art that the number of bands may be changed such that either a defined number of bands exist of a width defined by total frequency range divided by the number of bands, or that the bands are specified at a defined frequency range (e.g. 500 MHZ, 400 MHZ, 1 GHz, 250 MHz, etc.) and that the number of bands are therefore defined by the total frequency range divided by this defined frequency range. Whilst the descriptions in respect of FIGS. 20 to 25 are described with respect to bands that are all of equal bandwidth it would be evident that within other embodiments of the invention the bands may be unequally defined in bandwidth upon a regular grid or an irregular grid. For example, each band may be consecutive even if equally or unequally defined in bandwidth or they may be non-consecutive with equal or unequal bandwidths on a regular grid or irregular grid.

Figure 21:
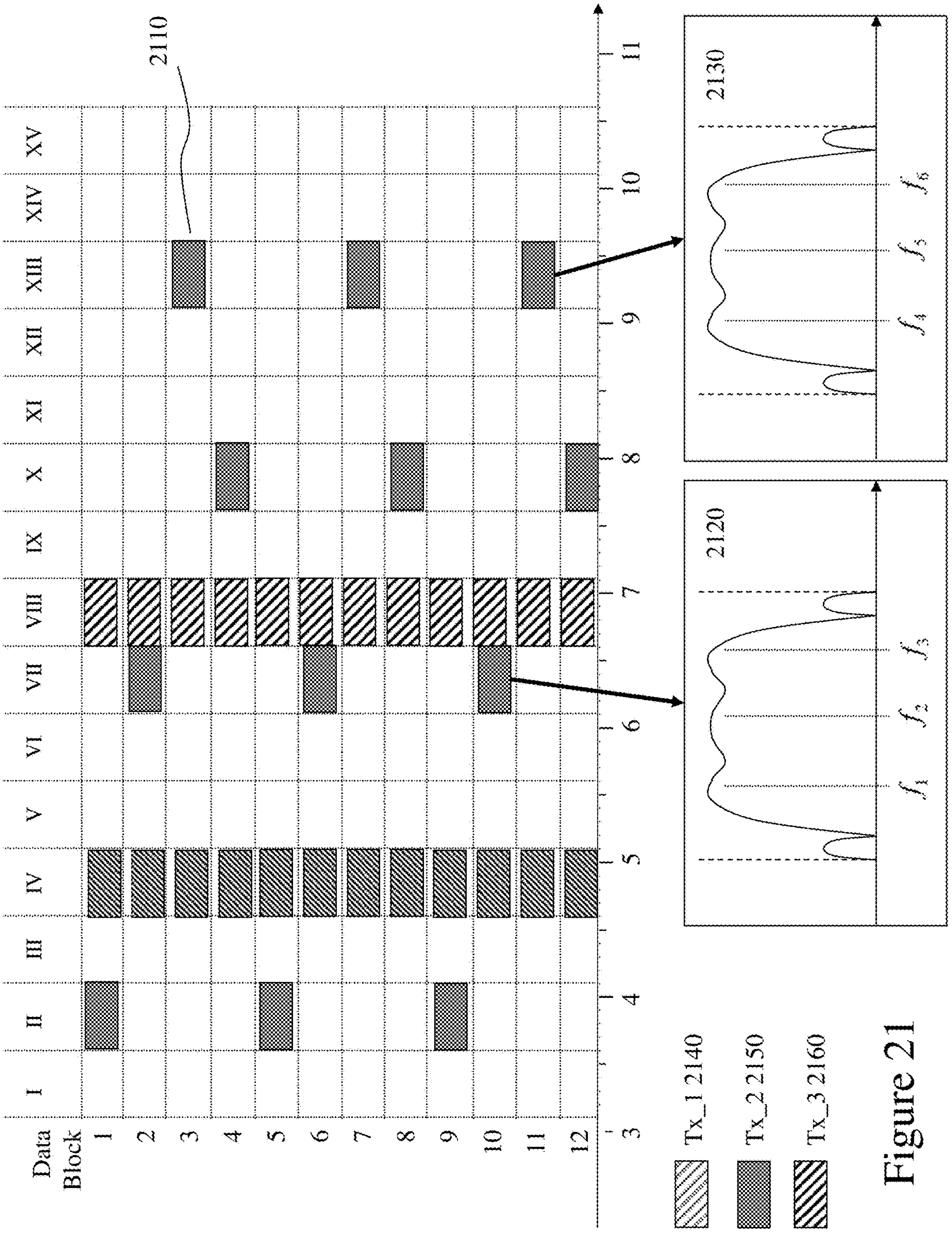
FIG. 21 depicts exemplary allocations of emission bands for UWB transmitters according to embodiments of the invention over time with either constant band allocation or cyclic band allocation.

Accordingly, referring to FIG. 21 a transmitter Tx_1 2140 according to an embodiment of the invention may transmit a pulse bundle or pulse bundles for each data block which provides an emission covering the same band for each sequential data block, in this instance Band IV. Within embodiments of the invention a data block may be a bit, a byte, a packet, or a predetermined portion of data being transmitted. A receiver within another wireless radio may be similarly tuned to Band IV to receive the transmitted pulse bundle(s) from the transmitter Tx_1 2140.

However, another transmitter, Tx_3 2160, may transmit a pulse bundle or pulse bundles for each data block which provides an emission covering the same band for each sequential data block, in this instance Band VIII. Again, a data block may be a bit, a byte, a packet, or a predetermined portion of data being transmitted. Accordingly, a receiver within another wireless radio may be similarly tuned to Band VIII to receive the transmitted pulse bundle(s) from the transmitter Tx_3 2160.

However, within another embodiment of the invention a transmitter Tx_2 2150 may transmit a pulse bundle or pulse bundles for each data block which provides an emission range which varies in the band occupied for each sequential data block within an overall frequency range. As depicted Tx_2 2150 transmits data blocks upon a recurring 4 block sequence of Bands II, VII, XIII and X. Again, a data block may be a bit, a byte, a packet, or a predetermined portion of data being transmitted. However, now in contrast to Tx_1 2140 and Tx_3 2160 this transmitter Tx_2 2150 hops bands per data block. Accordingly, a receiver within another wireless radio may be similarly tuned to Bands II, VII, XII and X in the same sequence as transmitter Tx_2 2150 IV to receive the transmitted pulse bundle(s) from the transmitter Tx_2 2150.

It would be evident to one skilled in the art that the number of bands available within the recurring sequence may vary according to factors such as the manner the frequency band has been subdivided, the total frequency range, the bandwidth of each band etc.

Further, would be evident to one skilled in the art that the number of bands available within the recurring sequence may vary and may be 2, 3, 4, 5, 6, 7, 8, etc. and that in some embodiments of the invention each band within the sequence is unique whereas within other embodiments of the invention a portion of the bands within the sequence may occur multiple times although their sequence of occurring changes such that the overall length of the recurring sequence is large. Within embodiments of the invention the band sequence such as number of steps within the recurring sequence, the number of bands used, the actual sequence of the bands within a repetition, etc. may be determined by the transmitter based upon a configuration setting provided to the transmitter or as described below in respect of FIG. 25 through a spectrum sensing process as part of the configuration process for the transmitter.

As evident from first and second insert images 2120 and 2130 then the pulse bundle for a data block within each of Band VII and Band XII is designed by the transmitter to fill the band. Accordingly, for example Band VII is established through a pulse bundle comprising frequencies $f_1$, $f_2$, $f_3$ whilst Band XII is established through a pulse bundle comprising frequencies $f_4$, $f_5$, $f_6$. The number of frequencies employed for each band may be constant or variable. The number of pulses of each frequency with the group of frequencies employed for a band may be constant or variable. Further, the parameters of each pulse for a given frequency may be constant or as described below in respect of other embodiments of the invention the parameters for each pulse may be varied deterministically or pseudo-randomly, such parameters including, but not limited to, pulse width, pulse power, dithered frequency offset from nominal frequency, dither time offset from nominal pulse position, and phase. Further the sequence of frequencies within a band may be varied deterministically or pseudo-randomly such that for example, in one sub-set of the pulse bundles for Band VII for example, the pulse sequence employs pulses at frequencies $f_3$, $f_1$, $f_2$ whereas another sub-set of pulse bundles may employ pulses at frequencies $f_1$, $f_2$, $f_3$, and yet another sub-set of the pulse bundles may employ $f_2$, $f_1$, $f_3$. It would be evident to one of skill in the art that the more frequencies employed within a pulse bundle the more combinations of frequency sequences can be employed within different pulse bundles even though they are all nominally the same band. It would also be evident that within some embodiments of the invention the pulse sequence for a given band may employ varying number of pulses at each frequency. For example, with a frequency sequence of $f_1$, $f_2$, $f_3$ and a pulse count sequence of 3, 3, 3 (i.e. 3 pulses at $f_1$, 3 pulses at $f_2$, and 3 pulses at $f_3$ that other pulse bundles may be 2, 4, 3; 4, 3, 3; 3; 4; 3; 3, 3, 4; etc. provided that the accumulated power spectrum density (PSD) complies with the regulator requirements. Optionally, the frequency span employable may be defined by the bandwidth of the receiver filter.

Figure 22:
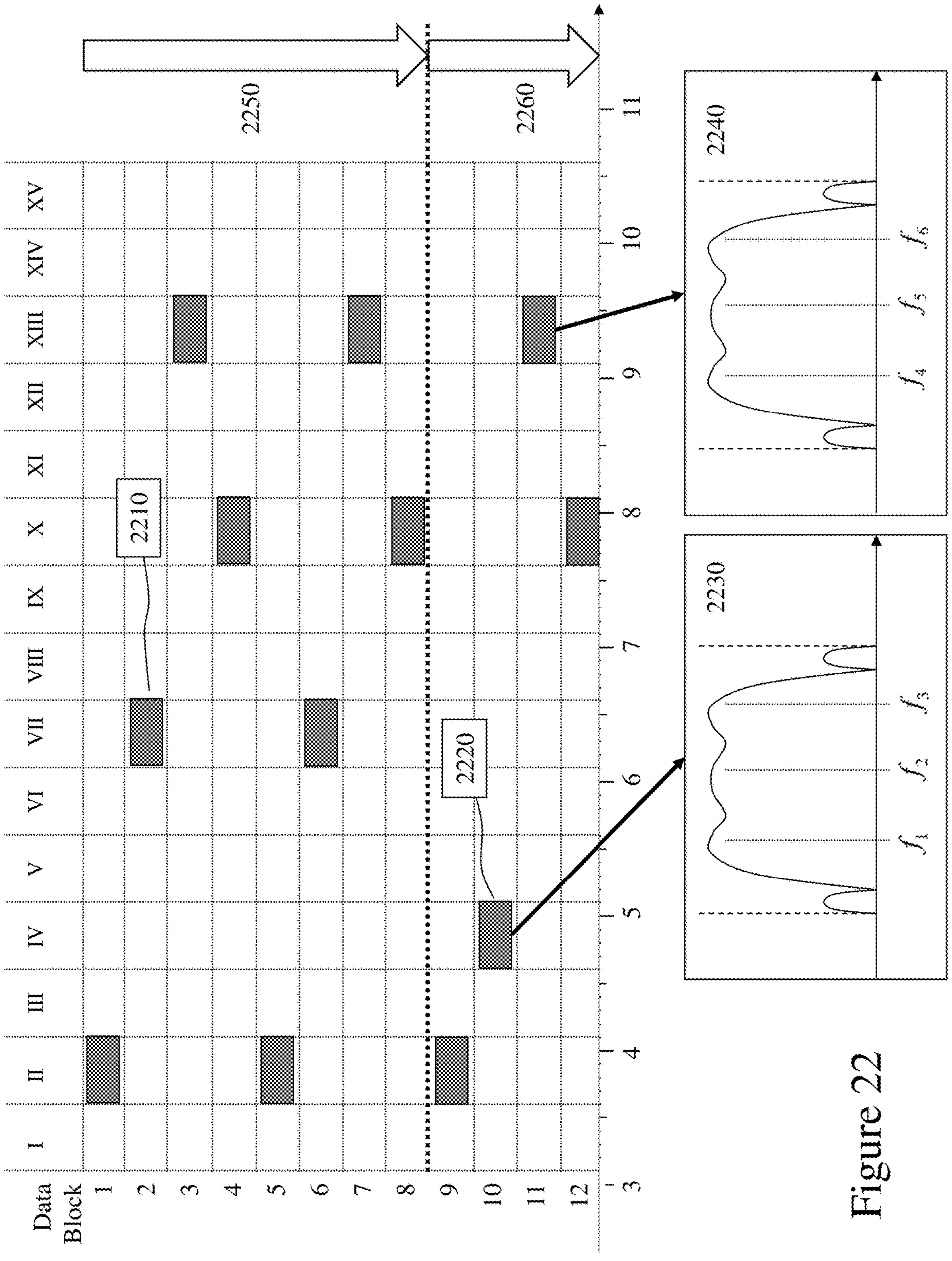
FIG. 22 depicts exemplary allocations of emission bands for UWB transmitters according to embodiments of the invention with cyclic band allocation and subsequent band sequence change.

Now referring to FIG. 22 there is depicted schematically a transmission sequence from a transmitter according to an embodiment of the invention wherein during a first sequence 2250 the transmitter transmits pulse bundles for each sequential data block according to a sequence of Bands II, VII, XII, and X. However, subsequently the transmitter changes to a second sequence 2260 of Bands IV, VII, XII, and X. In a similar manner as described above a receiver within another wireless radio may be similarly tuned to the first sequence 2250 of Bands II, VII, XII, and X to receive the transmitted pulse bundle(s) from the transmitter and then be advised of the change to the second sequence 2260 of Bands IV, VII, XII, and X.

Figure 23:
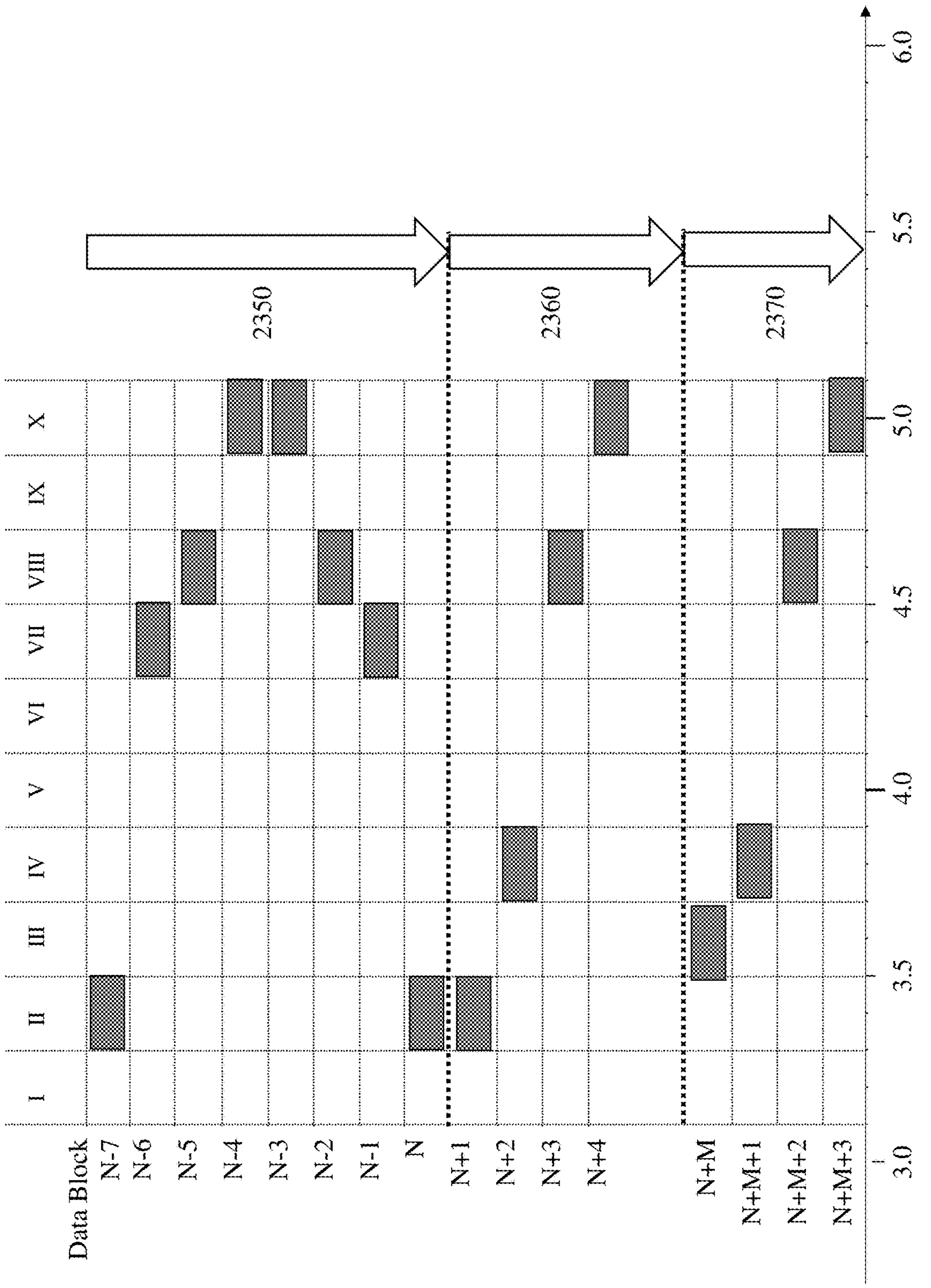
FIG. 23 depicts exemplary allocations of emission bands for UWB transmitters according to embodiments of the invention with cyclic band allocation and subsequent band sequence changes.

A similar scenario is depicted in FIG. 23 wherein during a first sequence 2350 the transmitter transmits pulse bundles for each sequential data block according to a sequence of 4 bands comprising Bands II, VII, VIII, and X but the actual sequence of bands within each 4 band sequence now varies. Accordingly, within the first sequence 2350 for bundles N-7 to N-4 the bands are in sequence II, VII, VIII, and X whereas for bundles N-3 to N they are X, VIII, VII, II. The sequence for each band within the 4 band sequence may be deterministic or pseudo-random. As noted above the number of bands within the sequence and the actual bands may vary in other scenarios. However, subsequently the transmitter changes to a second sequence 2360 of Bands II, IV, VIII, and X based upon a configuration adjustment either communicated to the wireless radio by another wireless radio, network controller, etc. or established by the wireless radio through spectrum sensing or monitoring Quality of Service (QOS), for example. Then subsequently at another point in time the transmitter changes to a third sequence 2370 employing Bands III, IV, VIII and X for bundles N+M, N+M+1, N+M+2, and N+M+3. Accordingly, in a similar manner as described above a receiver within another wireless radio may be similarly tuned to the first sequence 2350 of Bands II, VII, XII, and X to receive the transmitted pulse bundle(s) from the transmitter, then be advised of the change to the second sequence 2360 of Bands II, IV, VIII, and X, and then be advised of the third sequence 2370 employing Bands III, IV, VIII and X.

Figure 24:
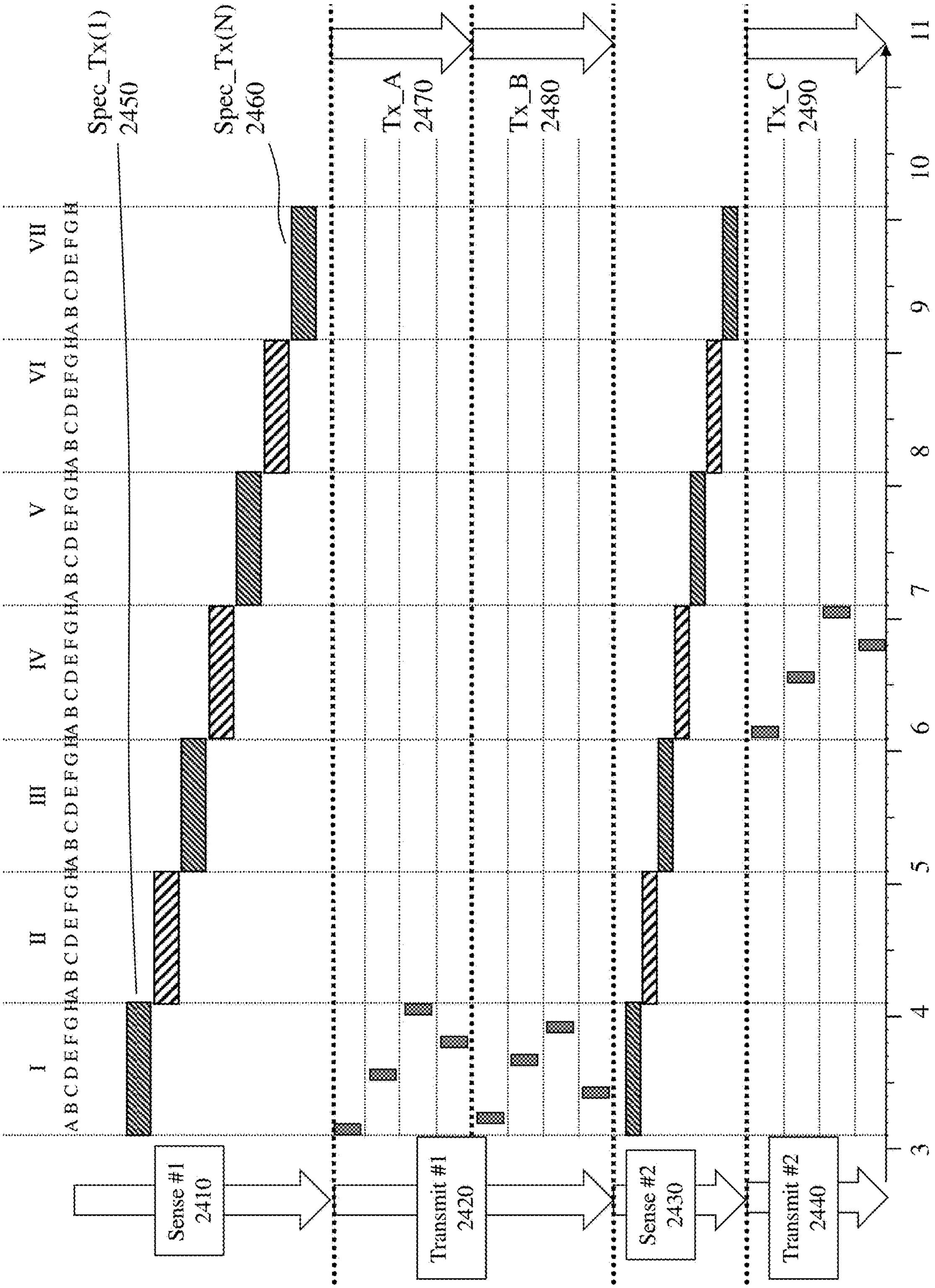
FIGS. 24 to 26 depict exemplary spectral sensing processes and allocations of emission bands for UWB transmitters according to embodiments of the invention with cyclic band allocation and subsequent band sequence changes with further spectral sensing processes.

Now referring to FIG. 24 there is depicted a schematic band transmission sequence according to embodiments of the invention wherein a transmitter prior to transmitting data blocks using pulse bundles initiates a spectrum sensing phase, Sense #1 2410, wherein the transmitter transmits pulse bundles that cover all or a predetermined portion of each Band I through VII using spectral sense pulse bundles Spec_Tx(1) 2450 to Spec_Tx(N) 2460. Accordingly, the transmitter is established to operate in Band I, for example in dependence upon link data provided to the transmitter from another transmitter associated a receiver within another wireless radio receiving the spectral sense pulse bundles Spec_Tx(1) 2450 to Spec_Tx(N) 2460 or through a communications interface from a network control receiving data from one or more receivers (wireless radios) which receive the spectral sense pulse bundles Spec_Tx(1) 2450 to Spec_Tx(N) 2460. Once configured to transmit in Band I the transmitter transmits signals within a sequence Transmit #1 2420 comprising a recurring sequence of Tx_A 2470 and Tx_B 2480 each of which comprises a series of four pulse bundles emitted upon s-bands of Band I, these being Sub-Bands A-H wherein Tx_A 2470 comprises Sub-Bands A, D, F, and H whereas Tx_B 2480 comprises Sub-Bands B, C, E, and G. These may for example as described and depicted in FIGS. 22 and 23 may repeat continuously until at a subsequent point in time a second spectrum sensing phase, Sense #2 2430, wherein the transmitter transmits pulse bundles that cover all or a predetermined portion of each Band I through VII using spectral sense pulse bundles Spec_Tx(1) 2450 to Spec_Tx(N) 2460.

As depicted, this results in the transmitter switching to a second sequence Transmit #2 2440 wherein the pulse bundles are now within Band IV and sequentially pulse bundles are in Sub-Bands A, D, F, and H of this new band. Alternatively, the second spectrum sensing phase, Sense #2 2430, may have resulted in a decision for no change in band or it may have determined a transition to one of the other bands II, III, and V to VII was more appropriate. The subsequent spectrum sensing phases may, for example, be triggered automatically after either a predetermined number of pulse bundles have been transmitted, a predetermined number of packets have been transmitted or a predetermined period of time has elapsed since the last spectrum sensing process was executed. Alternatively, the determination to trigger another spectrum sensing process may be established in dependence upon data provided to the transmitter from a receiver forming part of a link with the transmitter, data received from a network controller, or another receiver.

Optionally, the decision making process within UWB wireless radios according to embodiments of the invention may be dictated by monitoring QoS via techniques such as packet error rate (PER) monitoring or signal-to-noise ratio (SNR) monitoring, for example, either alone or in combination with spectrum sensing etc.

Figure 25:
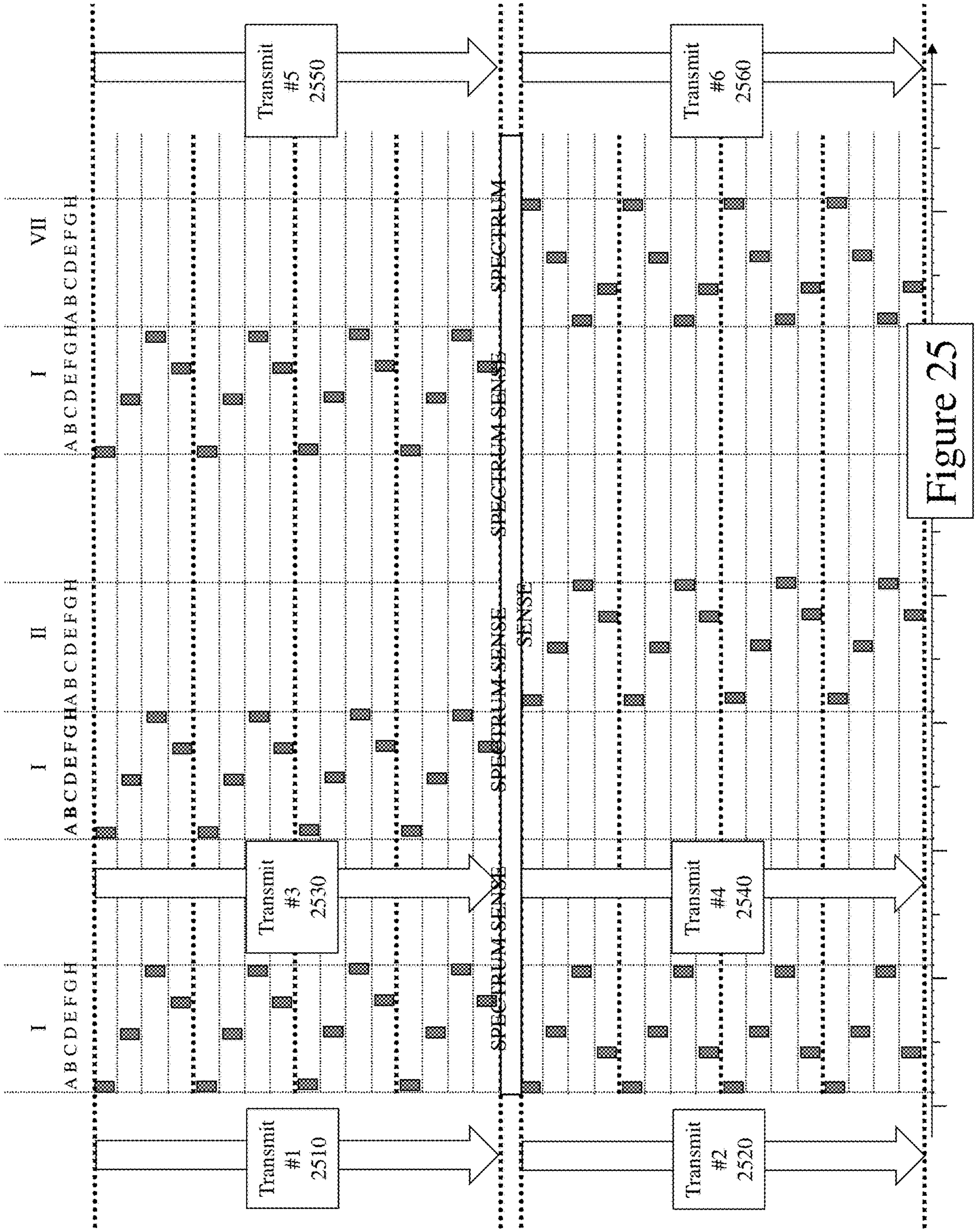

Accordingly, referring to FIG. 25 there are depicted three different exemplary scenarios. Within the first scenario the transmitter transmitting with pattern Transmit #1 2510 determines after a spectrum sense process that no reconfiguration is required and so continues to transmit with Transmit #2 2520 which is the same as Transmit #1 2510. Within the second scenario the transmitter transmitting with pattern Transmit #3 2530 determines after a spectrum sense process that no reconfiguration is required and so shifts to transmit with Transmit #4 2540 which is now in Band II. Within the third scenario the transmitter transmitting with pattern Transmit #5 2550 determines after a spectrum sense process that a reconfiguration is required and so transmits with Transmit #6 2560 which is now in Band VII.

Figure 26:
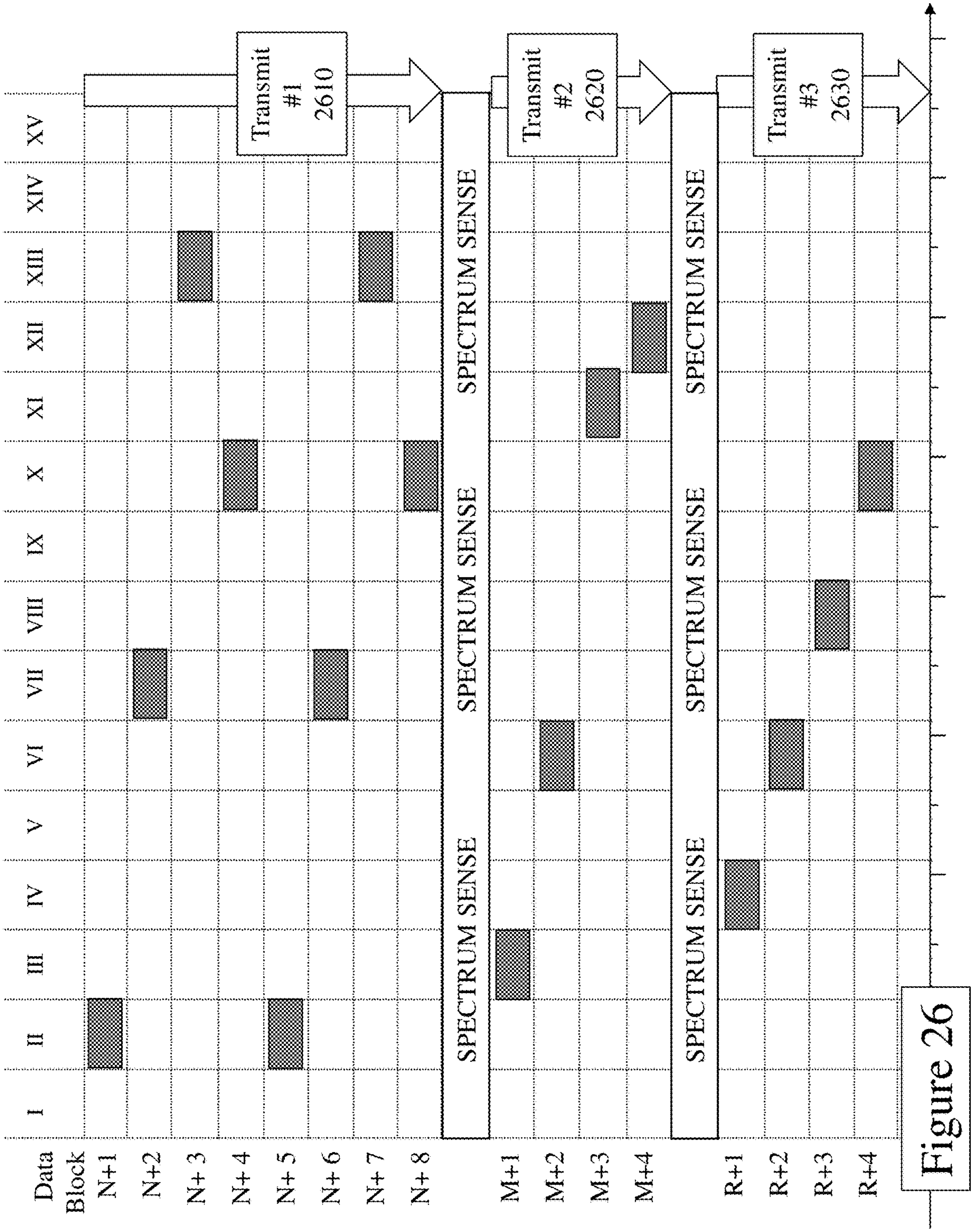

Within FIG. 26 there is depicted another scenario according to embodiment of the invention wherein a transmitter according to an embodiment of the invention wherein the transmitter operates upon Bands I to XV and is initially configured to transmit upon Bands II, VII, X, and XIII with sequence Transmit #1 2610. Subsequently, a spectrum sense process results in the decision to shift to Transmit #2 2620 wherein the sequence comprises Bands III, VI, XI and XII. Then again at another subsequent point in time another spectrum sense process results in the decision to shift to Transmit #3 wherein the sequence comprises Band IV, VI, VII, and X. Accordingly, the scenario depicted in FIG. 26 may relate to a plurality of bands such as described within FIGS. 20-25 respectively or it may relate to a series of sub-bands within a band such as described within FIGS. 20-25 respectively. However, within other embodiments of the invention the spectrum sensing and adjustments may relate to frequencies within a band or sub-band.

Accordingly, a wireless link according to embodiments of the invention may be configured to operate upon a plurality of bands and/or a plurality of sub-bands wherein the transmitter and receiver are configured to operate upon the same bands and/or sub-bands such that the transmitter and receiver are aligned to the same bands and/or sub-bands by one or processes including, but not limited to:

- the transmitter and receiver are synchronized by a network controller;
- the transmitter transmits a sequence identifier for a predetermined sequence stored with a memory of the receiver within a packet header of data transmitted to the receiver by the transmitter;
- the transmitter transmits an identifier for the current band(s) and/or sub-band(s) for the current packet to the receiver; and
- the transmitter transmits identifiers for the current bands and/or sub-bands employed within the current packet to the receiver.

Within embodiments of the invention a transmitter within a first wireless radio and a receiver within a second wireless radio may exploit a discovery protocol at the onset of communications in order to ensure that the transmitter and receiver find each other not only in time but also in respect of which frequency band(s).

8. Multi-Path/Cross-Fading Mitigation Through Multi-Pulse Bundles

Figure 27:
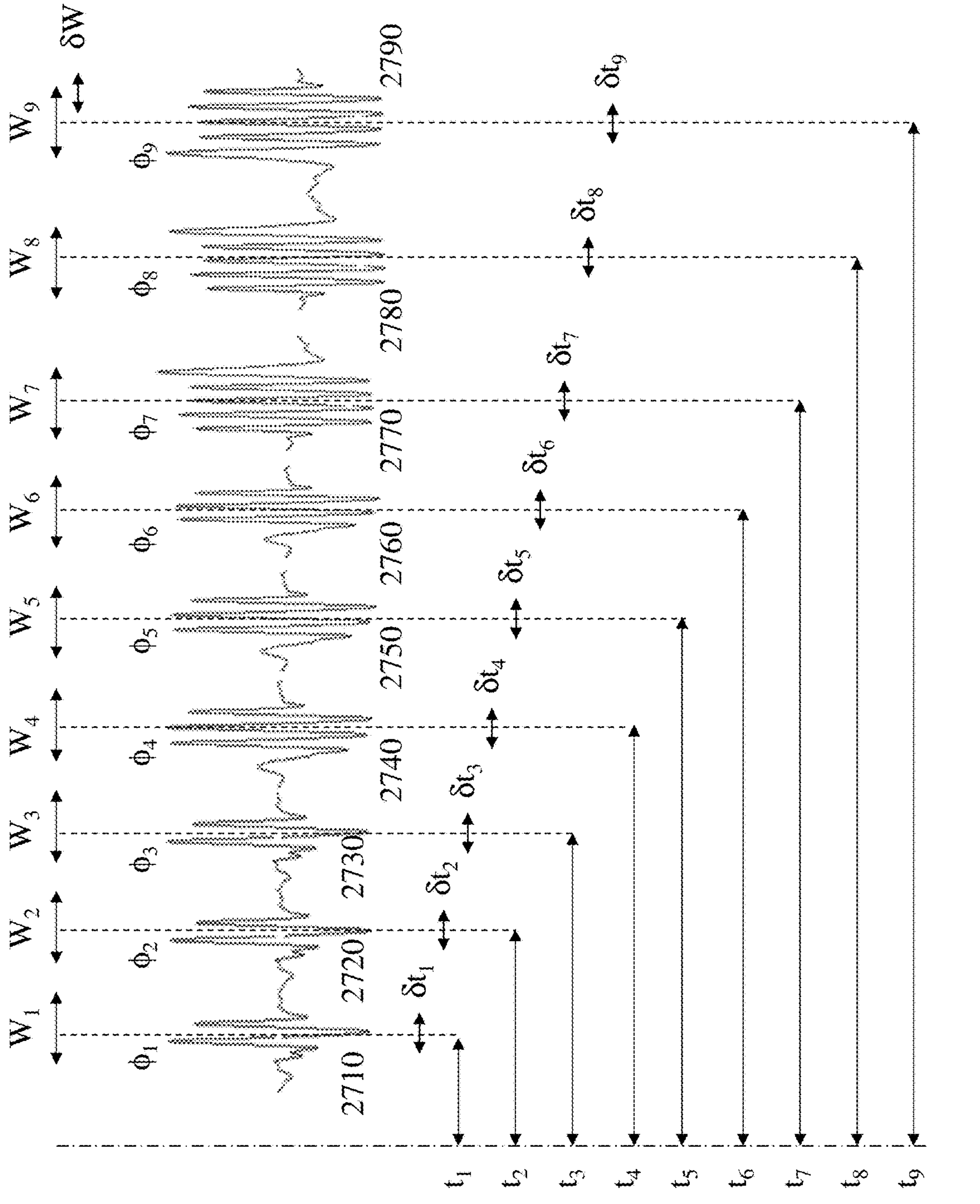
FIG. 27 depicts characteristics of a multi-pulse bundle which can be varied and/or dithered during transmission by UWB transmitters according to embodiments of the invention.

Referring to FIG. 27 there is depicted an exemplary pulse bundle according to an embodiment of the invention comprising first to ninth pulses 2710 to 2790 respectively which are positioned within the pulse bundle as being centered upon times $t_1$, $t_2$, $t_3$, $t_4$, $t_5$, $t_6$, $t_7$, $t_8$, and to respectively. These pulses having widths $W_1$, $W_2$, $W_3$, $W_4$, $W_5$, $W_6$, $W_7$, $W_8$, and $W_9$ respectively. First to third pulses 2710 to 2730 being at a first frequency $f_1$, fourth to sixth pulses 2740 to 2760 being at second frequency $f_2$, and seventh to ninth pulses 2770 to 2790 being at $f_3$. However, within embodiments of the invention in the generalized construction a pulse bundle may comprise:

- a plurality N pulses generated by an RF signal generator wherein each pulse of the N pulses is at a predetermined frequency of a plurality M frequencies, has a predetermined amplitude, and has a predetermined pulse length; wherein
- $N \geq 2$ and $M \geq 2$;
- M and N are integers;
- a pulse repetition rate of the RF signal generator is determined in dependence of a clock frequency applied to the RF signal generator;
- the integer N depends upon a duration of a bit of the data signal and the pulse repetition rate of the RF signal generator; and
- the plurality N pulses are transmitted within the duration of the bit of the data signal and comprise pulses at the plurality M frequencies.

An RF signal generator according to an embodiment of the invention generating such a pulse bundle is as depicted in FIG. 2. Further, each pulse within the pulse bundle may have a phase associated with it $\phi_1$, $\phi_2$, $\phi_3$, $\phi_4$, $\phi_5$, $\phi_6$, $\phi_7$, $\phi_8$, and $\phi_9$. With an RF signal generator as depicted in FIG. 3 then each of the pulses is assigned to either a first phase or a second phase according to the setting of the Switch 360. As described within WO/2015/103,692 the Switch 360 is fed with a pseudo-random signal such that the phases of the pulses within the pulse bundle have a pseudo-randomly assigned phase.

However, within a wireless link between a first wireless radio comprising a transmitter according to an embodiment of the invention and a second wireless radio comprising a receiver according to an embodiment of the invention then amongst the signal degradations that the wireless signals may experience are multipath interference and cross-fading.

Figure 28:
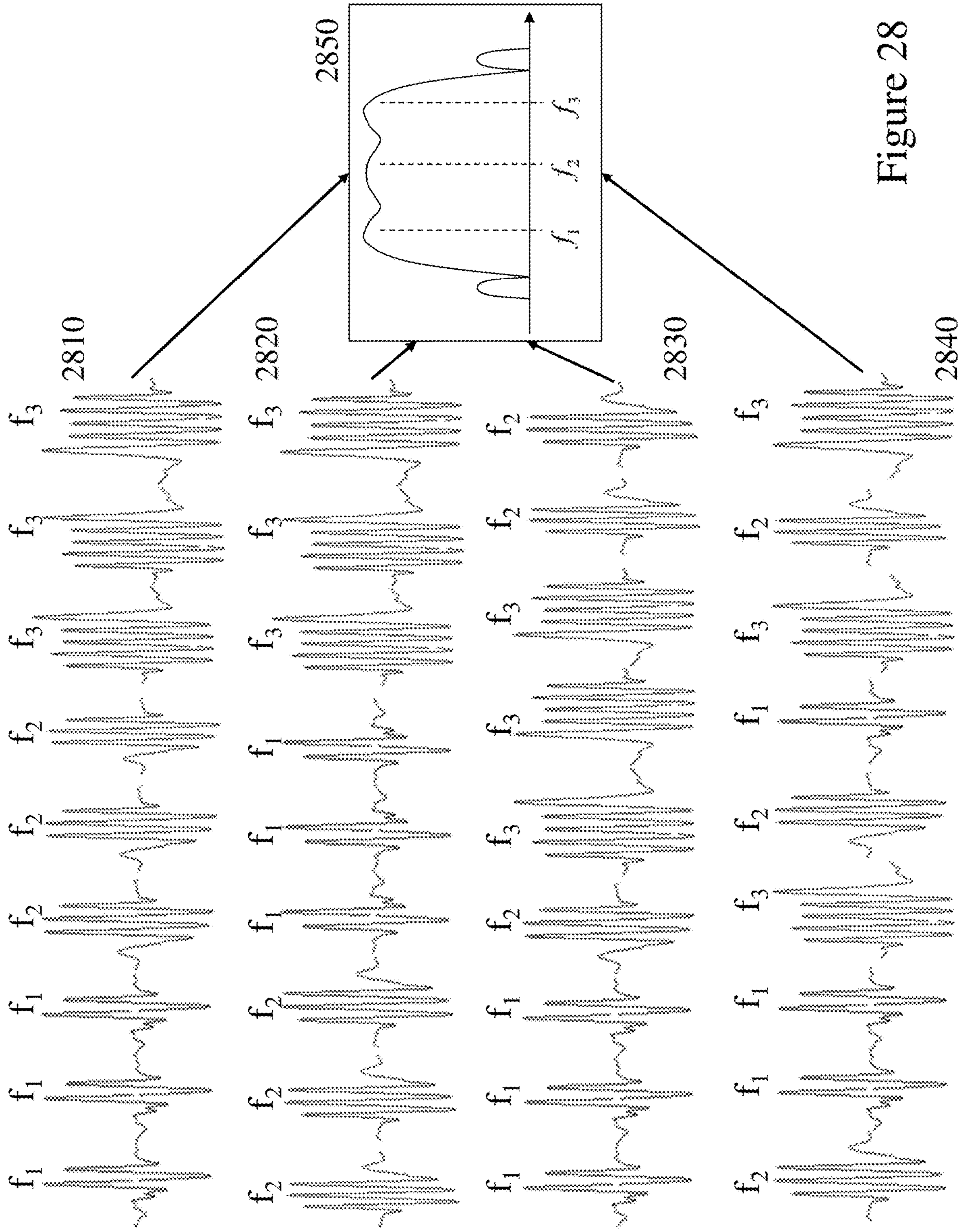
FIG. 28 depicts exemplary variations in the pulse sequence for a multi-pulse bundle for a single symbol with the same output spectral profile according to embodiments of the invention.

Now referring to FIG. 28 there are depicted first to fourth pulse bundles 2810 to 2840 respectively each comprising 3 pulses a first frequency $f_1$, 3 pulses at a second frequency $f_2$, and 3 pulses at a third frequency $f_3$. As first to fourth pulse bundles 2810 to 2840 respectively each comprise the same frequencies and the same number of pulses at each frequency then the emitted power spectrum for each pulse is the same independent of the phase of the pulses provided that the pulses in each of the first to fourth pulse bundles 2810 to 2840 respectively have the same amplitude. However, as evident the actual pulse sequences in each of the first to fourth pulse bundles 2810 to 2840 respectively are different, these being:

- First pulse bundle 2810 comprising a frequency sequence $f_1$, $f_1$, $f_1$, $f_2$, $f_2$, $f_2$, $f_3$, $f_3$, $f_3$;
- Second pulse bundle 2820 comprising a frequency sequence $f_2$, $f_2$, $f_2$, $f_1$, $f_1$, $f_1$, $f_3$, $f_3$, $f_3$;
- Third pulse bundle 2830 comprising a frequency sequence $f_1$, $f_1$, $f_1$, $f_2$, $f_3$, $f_3$, $f_3$, $f_2$, $f_2$; and
- Fourth pulse bundle 2840 comprising a frequency sequence $f_2$, $f_1$, $f_1$, $f_3$, $f_2$, $f_1$, $f_3$, $f_2$, $f_3$.

Figure 29:
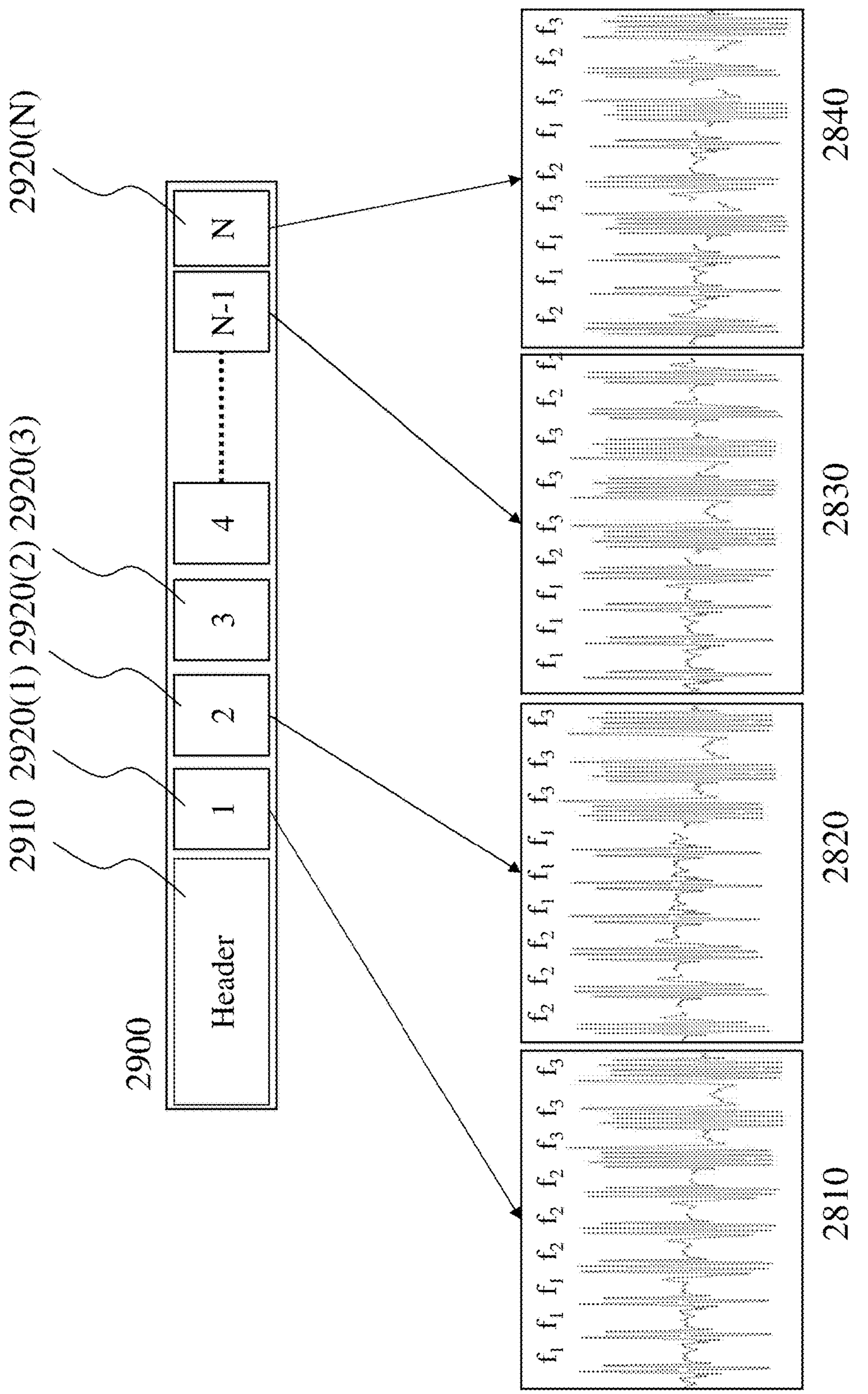
FIG. 29 depicts a packet transmitted by a UWB transmitter according to an embodiment of the invention employing different pulse sequences for different multi-pulse bundles within the packet.

Now referring to FIG. 29 there is depicted a packet 2900 comprising a header 2910 and a plurality of data blocks 2920(1), 2920(2), 2920(3) to 2920(N). As depicted:

- the first data block 2920(1) comprises a pulse sequence as defined by first pulse bundle 2810 in FIG. 28;
- the second data block 2920(1) comprises a pulse sequence as defined by second pulse bundle 2810 in FIG. 28;
- the third data block 2920(1) comprises a pulse sequence as defined by third pulse bundle 2810 in FIG. 28; and
- the fourth data block 2920(1) comprises a pulse sequence as defined by fourth pulse bundle 2810 in FIG. 28.

Figure 30A:
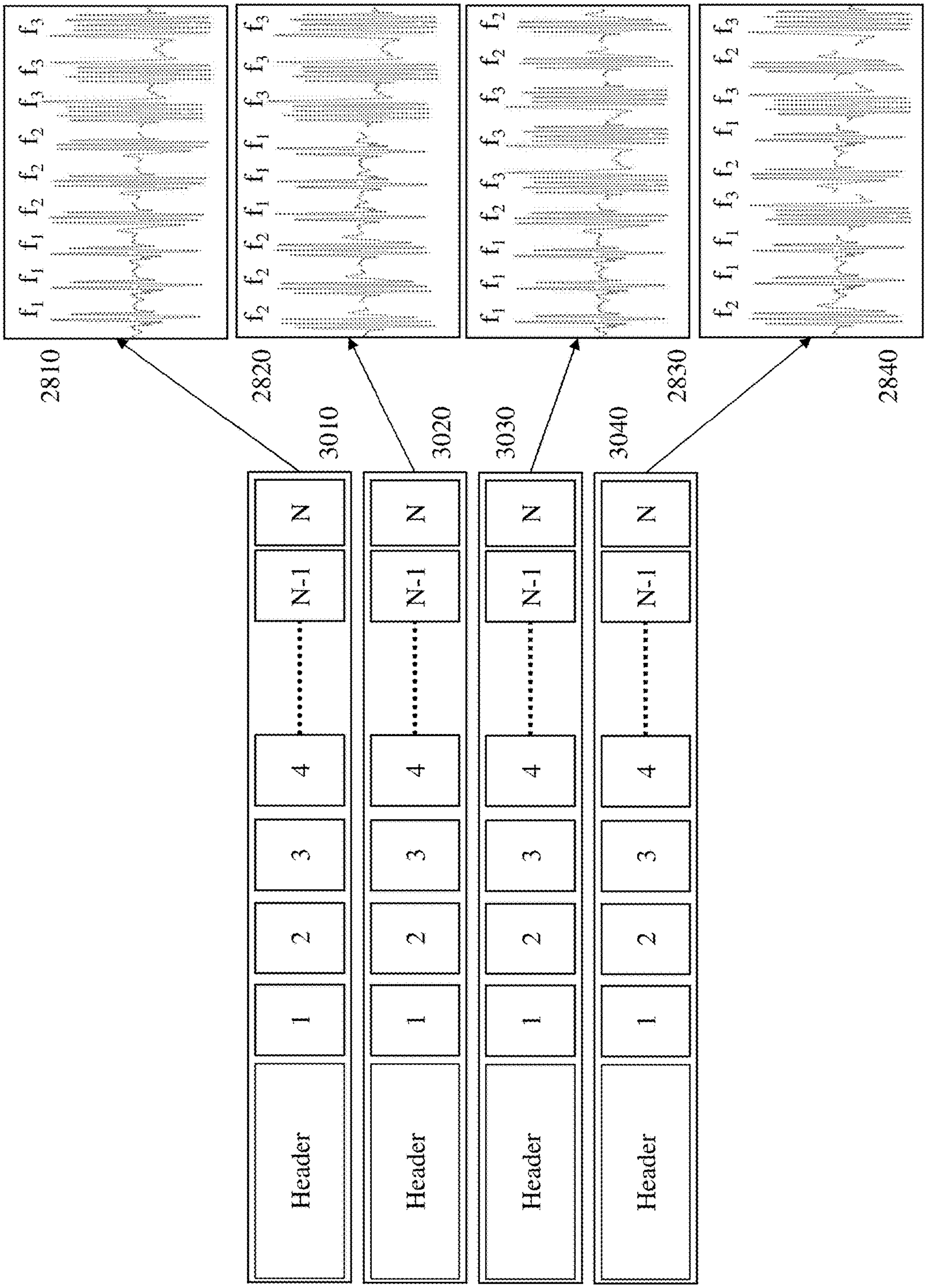
FIGS. 30A and 30B depict exemplary packets transmitted by a UWB transmitter according to an embodiment of the invention employing different pulse sequences for the multi-pulse bundles within each packet.

Referring to FIG. 30A there is depicted a series of packets 3010 to 3040 transmitted by a transmitter according to an embodiment of the invention. Within this embodiment of the invention the frequencies within each of the packets 3010 to 3040 are the same but their sequence varies. Accordingly, as depicted:

- the first packet 3010 comprises a header and a plurality of data blocks using a frequency sequence as defined by first pulse bundle 2810 in FIG. 28;
- the second packet 3020 comprises a header and a plurality of data blocks using a frequency sequence as defined by second pulse bundle 2820 in FIG. 28;
- the third packet 3030 comprises a header and a plurality of data blocks using a frequency sequence as defined by third pulse bundle 2830 in FIG. 28; and
- the fourth packet 3040 comprises a header and a plurality of data blocks using a frequency sequence as defined by fourth pulse bundle 2840 in FIG. 28.

Figure 30B:
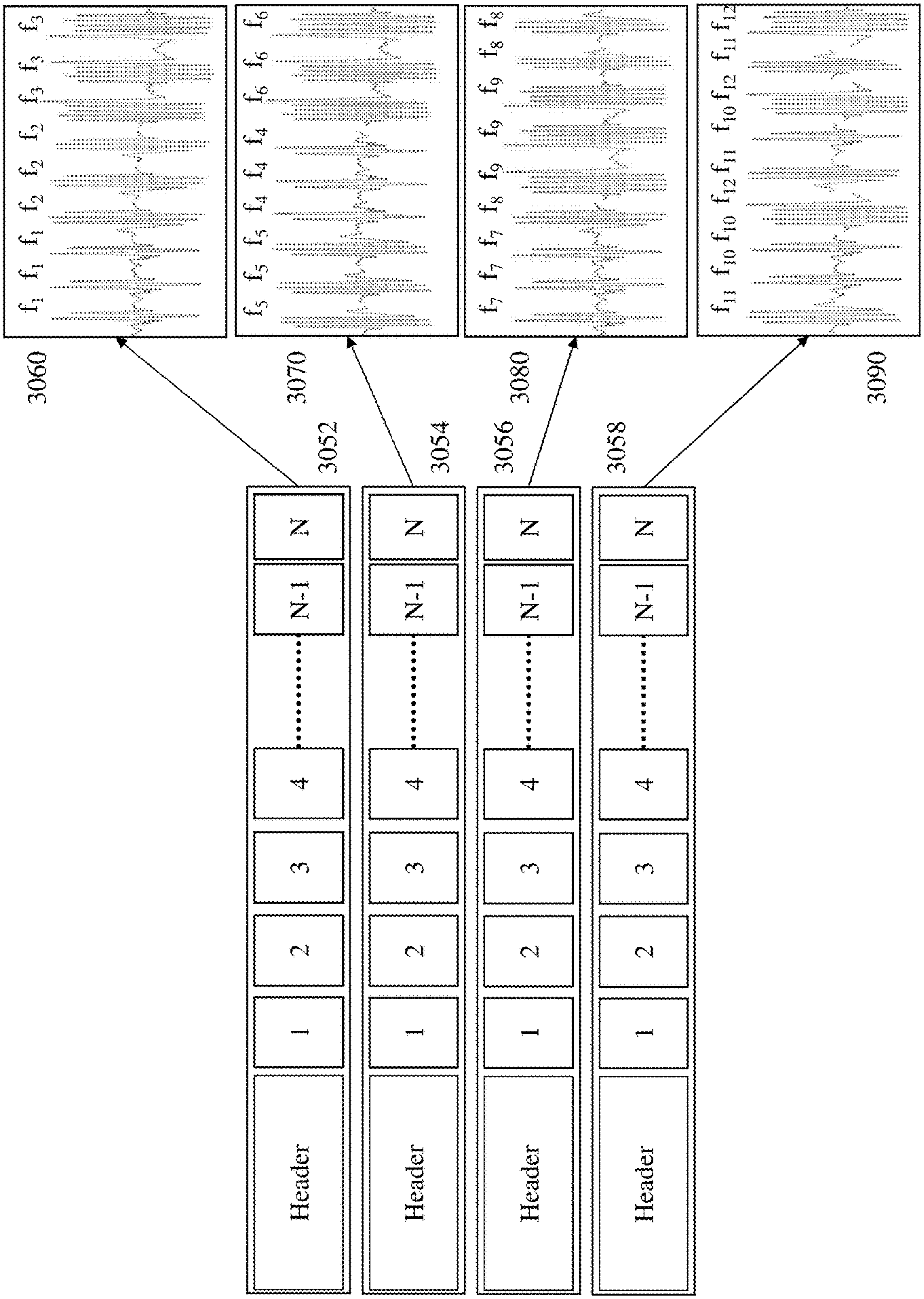

Now referring to FIG. 30B there is depicted a series of packets 3052 to 3058 transmitted by a transmitter according to an embodiment of the invention. Within this embodiment of the invention not only do the sequences of the pulses vary (i.e. it is not a constant sequence with respect to frequencies) but the frequencies themselves vary as each packet is in a different band of the UWB link spectrum accessible according to the constraints defined, for example, by the UWB transmitter and receiver together with regulatory requirements. This, for example, being a repeating sequence of bands, such as described above in respect of FIGS. 21-26 respectively. Accordingly, as depicted:

- the first packet 3052 comprises a header and a plurality of data blocks using a first frequency sequence with frequencies $f_1$, $f_2$, and $f_3$;
- the second packet 3054 comprises a header and a plurality of data blocks using a second frequency sequence with frequencies $f_4$, $f_5$, and $f_6$;
- the third packet 3056 comprises a header and a plurality of data blocks using a third frequency sequence with frequencies $f_7$, $f_8$, and $f_9$; and
- the fourth packet 3058 comprises a header and a plurality of data blocks using a fourth frequency sequence with frequencies $f_{10}$, $f_{11}$, and $f_{12}$.

Further, as described above with respect to FIG. 27 it would be evident that the pulses within each of the first to fourth packets 3010 to 3040 respectively in FIG. 30A or first to fourth packets 3052 to 3058 respectively in FIG. 30B may also have other aspects of the pulses such as inter-pulse spacing, phase, pulse width, etc. can be varied within the sequence either pseudo-randomly or programmatically. Optionally, within other embodiments of the invention a programmable or fixed time guard band between symbols may be employed. Optionally, within other embodiments of the invention the symbol repetition rate may be varied to accommodate locations that have degraded link quality through inter-symbol interference.

8A. Programmatic Versus Pseudo-Random

Within the preceding descriptions with respect to FIGS. 20 to 30 multi-frequency pulse bundles are employed within each bit, within each symbol or within a packet or across multiple bits, multiple symbols, or multiple packets. However, in FIGS. 22-23 and FIGS. 27-30 the multi-frequency bundles may be within a single band until a decision to adjust to another band or to shift a band or bands within a repeating sequence of bands may be made through a method such as spectrum sensing as described within FIGS. 24-26. However, within another embodiment of the invention the decision to shift from one band to another, to shift a band or bands within a repeating sequence of bands, or shift the frequency sequence within a multi-pulse bundle may be made in dependence upon a degradation of the link properties between the transmitter and one or more receivers either fed back to the transmitter from the one or more receivers or through a network controller. Such degradations in the link properties arising from the aforementioned effects such as multi-path interference and cross-fading.

Accordingly, the transmitter may either within a training sequence or during transmission of data adjust the sequence of frequencies within a multi-pulse bundle such as described and depicted in FIGS. 29 and 30 to determine whether an adjust in the frequency sequence of the pulses within the multi-frequency bundle results in mitigation of the signal degradations observed such as through absolute received power at the receiver and/or an effective signal to noise ratio between the pulse bundles for a “1” and the pulse bundles for “0”.

In a similar manner a decision may be made to shift to another band of a plurality of bands to determine whether exploiting a different band similarly yields an improved in received signal quality.

The adjustment from one frequency sequence to another may be programmatically defined by a configuration sequence stored within a memory associated with the transmitter or it may be pseudo-randomly established from a series of configuration sequences stored within the memory. Alternatively, the adjustment from one frequency sequence to another may be determined from spectrum sensing discretely or in combination with one or more link metrics.

8B. Multi-Pulse Bundles Parameter Dithering

As noted in FIG. 27 the pulses within a multi-pulse bundle are defined by their position within the pulse bundle, which may be varied as described above in Section 8A, together with their frequency, pulse width, phase, and amplitude and the pulse repetition rate of the pulses from the RF signal generator within the transmitter.

However, these parameters may be dithered either programmatically or pseudo-randomly in order to adjust the actual content of the multi-frequency pulse bundle. For example, this may be by:

- dithering the pulse width of each pulse within the multi-frequency pulse bundle within a predetermined limit;
- dithering the frequency of each pulse within the multi-frequency pulse bundle within a predetermined limit;
- dithering the amplitude of pulses within the multi-frequency pulse bundle within a predetermined limit;
- dithering the pulse position of each pulse within the multi-frequency pulse bundle within a predetermined limit; and
- adjusting the pulse repetition rate of the RF signal generator to vary the spacing between pulses within multi-frequency bundles.

Accordingly, adjustments in these parameters when programmatically controlled allow the receiver to determine how the link quality of service (QOS) metrics improve or degrade and sequentially adjust them to obtain improved link QoS. Further, adjusting the PRR allows the transmitter to adjust the spacing of pulses within a multi-pulse bundle to similarly determine how the link QoS metrics improve or degrade. Optionally, a transmitter according to embodiments of the invention may dynamically adjust the spacing of symbols dynamically in order to adjust and seek to enhance the QoS, albeit at the cost of maximal data rate sustainable.

8C. Chirped Pulses

Within the descriptions in respect of FIGS. 2 to 30 each pulse within a multi-frequency bundle has been described and depicted as being at a single discrete frequency. However, within other embodiments of the invention the pulses may be chirped such that a predetermined chirp is applied to each pulse. This may be an increase of frequency during the pulse, up-chirp; a decrease of frequency during the pulse, down-chirp; an up-chirp followed by a down-chirp; or a down-chirp followed by an up-chirp. The applied chirp may be linear, wherein the chip varies linearly with time during the pulse or it may be geometric wherein it varies according to a geometric relationship with time during the pulse. For example, a geometric chirp may be sinusoidal or exponential.

Accordingly, a transmitter according to embodiments of the invention may apply varying degrees and form of chirp to the pulses within a multi-pulse bundle over time such that QoS metrics can be measured and the transmitter parameters adjusted for improved QoS and to continuously adjust the different aspects of the pulses to continuously tune for improved QoS.

9. Training Sequences for UWB Link Configuration

Within the preceding descriptions with respect to FIGS. 20 to 30 multi-frequency pulse bundles are employed within each bit, within each symbol or within a packet or across multiple bits, multiple symbols, or multiple packets. However, in FIGS. 22-23 and FIGS. 27-30 the multi-frequency bundles may be within a single band until a decision to adjust to another band or to shift a band or bands within a repeating sequence of bands may be made through a method such as spectrum sensing as described within FIGS. 24-26. However, within another embodiment of the invention the decision to shift from one band to another, to shift a band or bands within a repeating sequence of bands, or shift the frequency sequence within a multi-pulse bundle may be made in dependence upon a degradation of the link properties between the transmitter and one or more receivers either fed back to the transmitter from the one or more receivers or through a network controller. Such degradations in the link properties arising from the aforementioned effects such as multi-path interference and cross-fading.

Alternatively, within other embodiments of the invention a decision may be made at the beginning of establishing a link between the transmitter and receiver wherein an initial training sequence can be employed such that the transmitter cycles through a predetermined sequence of variations in the properties of the multi-frequency pulse bundles such as stepping through the different frequency bands etc. in order for the receiver to determine QoS metrics for each band and establish a configuration which is subsequently employed in the link. Optionally, within embodiments of the invention the initial configuration may be employed until the QoS drops below a predetermined threshold wherein the transmitter may trigger a new training sequence or a spectrum sensing process etc. in order to establish new transmitter configuration settings.

10. Vivaldi Diversity Antennas

Figure 31:
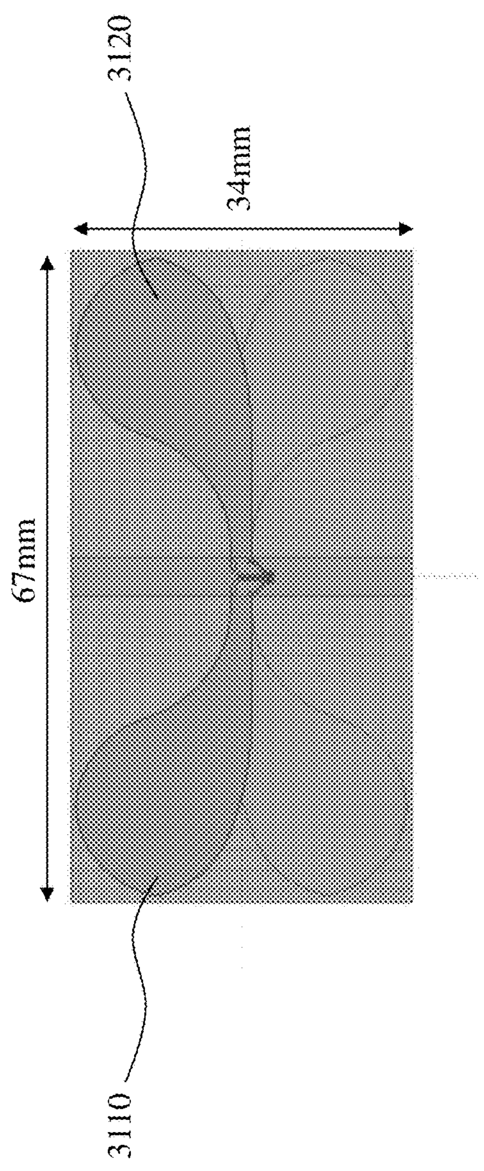
FIG. 31 depicts structure of a double Vivaldi antenna system according to an embodiment of the invention.

As described above in respect of FIG. 4 diversity can provide enhanced link performance in the presence of signal degradations such as those arising from multi-path interference, fading, etc. Accordingly, when implementing UWB transmitters, UWB receivers, and UWB transceivers diversity antennas may be enhanced with directive antennas in order to provide improved spatial filtering. Accordingly, antennas which are referred to as Vivaldi antennas provide not only a directive radiation pattern but also an ultra-wideband performance. Accordingly, the inventors have established diversity antenna structures incorporating two oppositely directed Vivaldi antennas to provide a maximum coverage around the UWB wireless radio. As depicted in FIG. 31 a diversity antenna according to an embodiment of the invention comprises a first Vivaldi antenna 3110 and a second Vivaldi antenna 3120 which are located side by side with respect to each other with each being fed by a co-planar waveguide transmission line. The co-planar waveguides are connected within UWB devices according to embodiments of the invention to an RF switch which will connect either of the antennas to the transmitter and/or receiver circuit with UWB transmitter, UWB receiver, and UWB transceiver etc.

Figure 32:
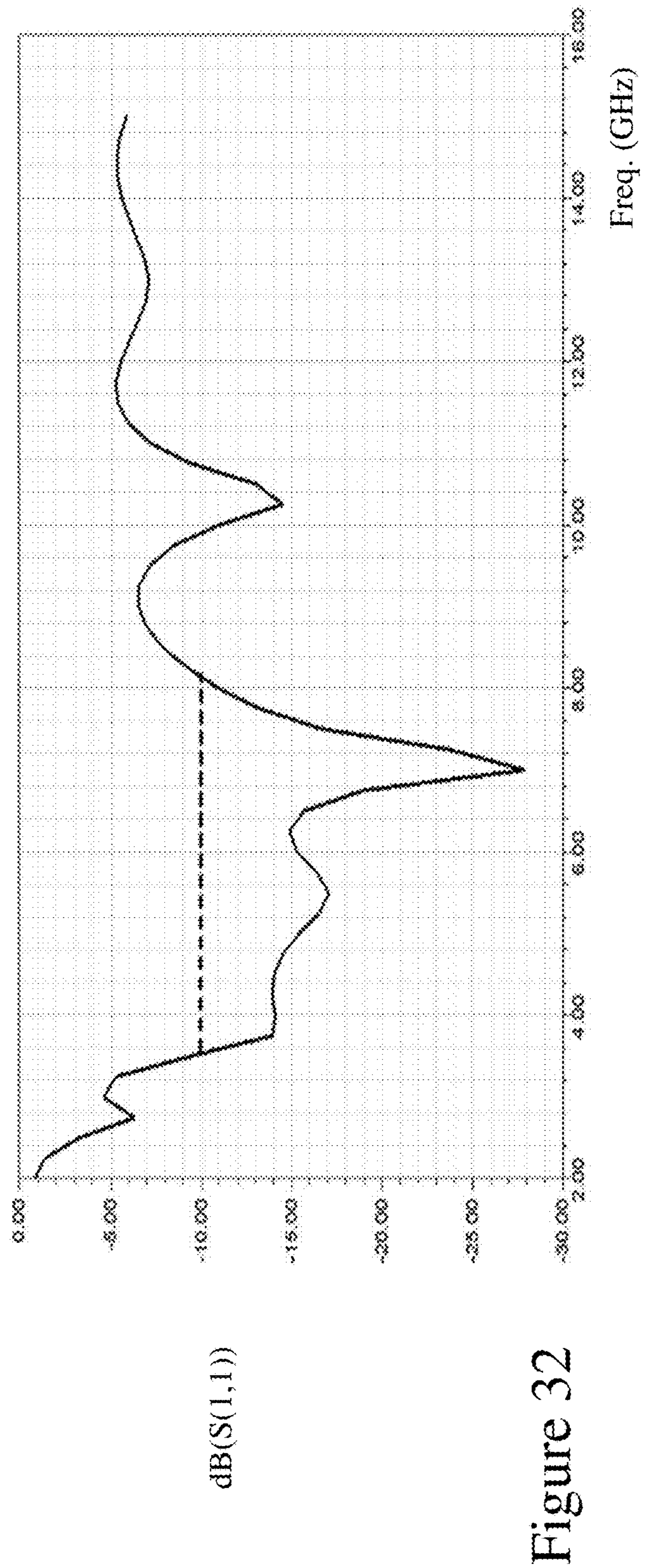
FIG. 32 depicts the simulated S11 (dB) for the double Vivaldi antenna system according to an embodiment of the invention depicted in FIG. 31.
Figure 33:
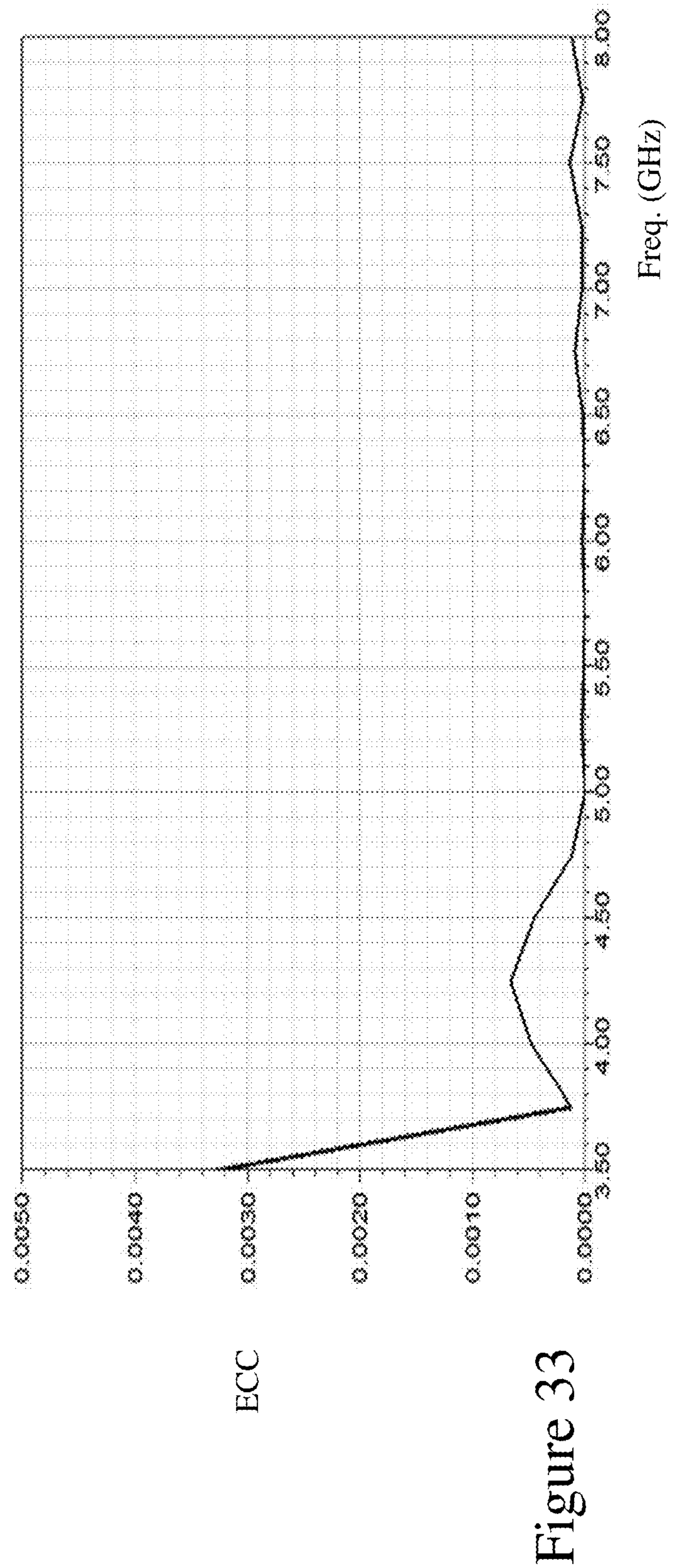
FIG. 33 depicts the ECC for the double Vivaldi antenna system according to an embodiment of the invention depicted in FIG. 31.

The exemplary antenna diversity systems for which results are presented in FIGS. 32 to 35 were designed to fit with the limited dimensions of the PCB hence making it a compact system. The structure is simulated in the FEM based simulation software, Ansys HFSS with the total dimensions of 67 mm×34 mm. The simulated $|S_{11}|$ (dB) is depicted in FIG. 32 which depicts an ultra-wideband impedance matching performance from 3.5 GHZ to 8 GHz ensuring low loss performance of the antennas. The two antennas are well isolated since their radiation pattern is directed in two distinct direction. This ensures a very low ECC hence increasing the diversity gain of the system. The simulated ECC being depicted in FIG. 33.

Figure 34B:
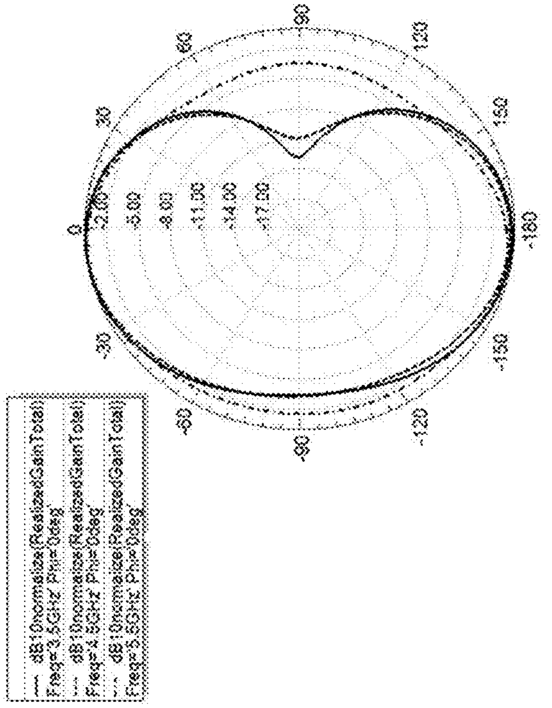
FIGS. 34A to 34C depict antenna radiation patterns over the frequency band of interest for the double Vivaldi antenna system according to an embodiment of the invention depicted in FIG. 31.
Figure 34A:
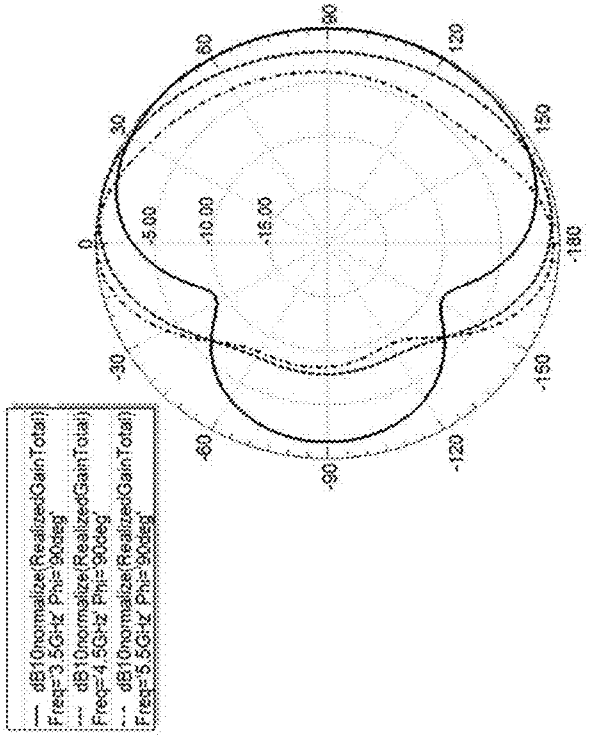
Figure 34C:
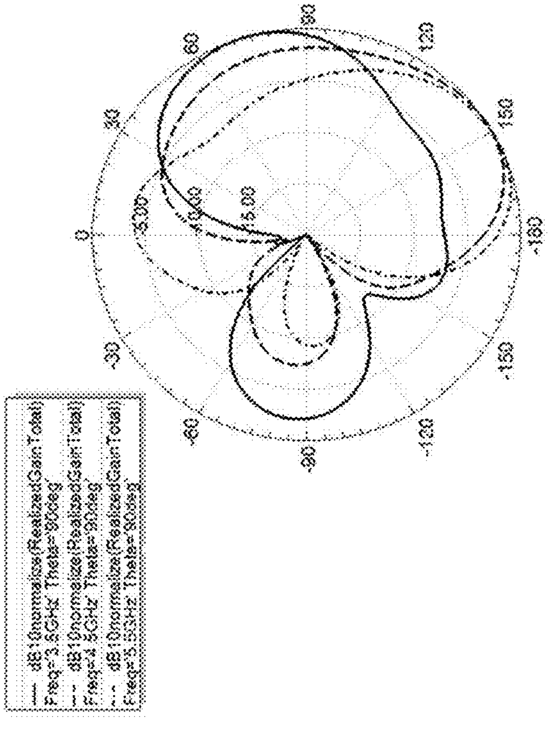
Figure 35A:
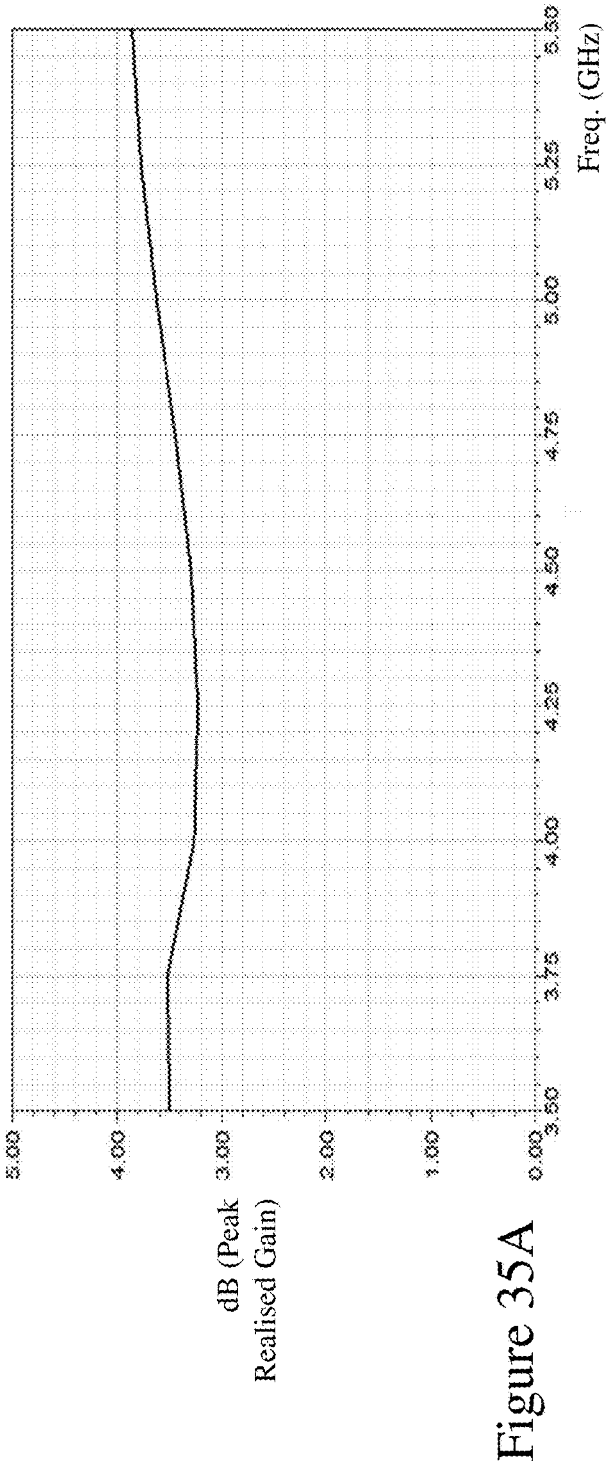
FIGS. 35A and 35B depict the peak realized gain and radiation efficiency of a double Vivaldi antenna system according to an embodiment of the invention.
Figure 35B:
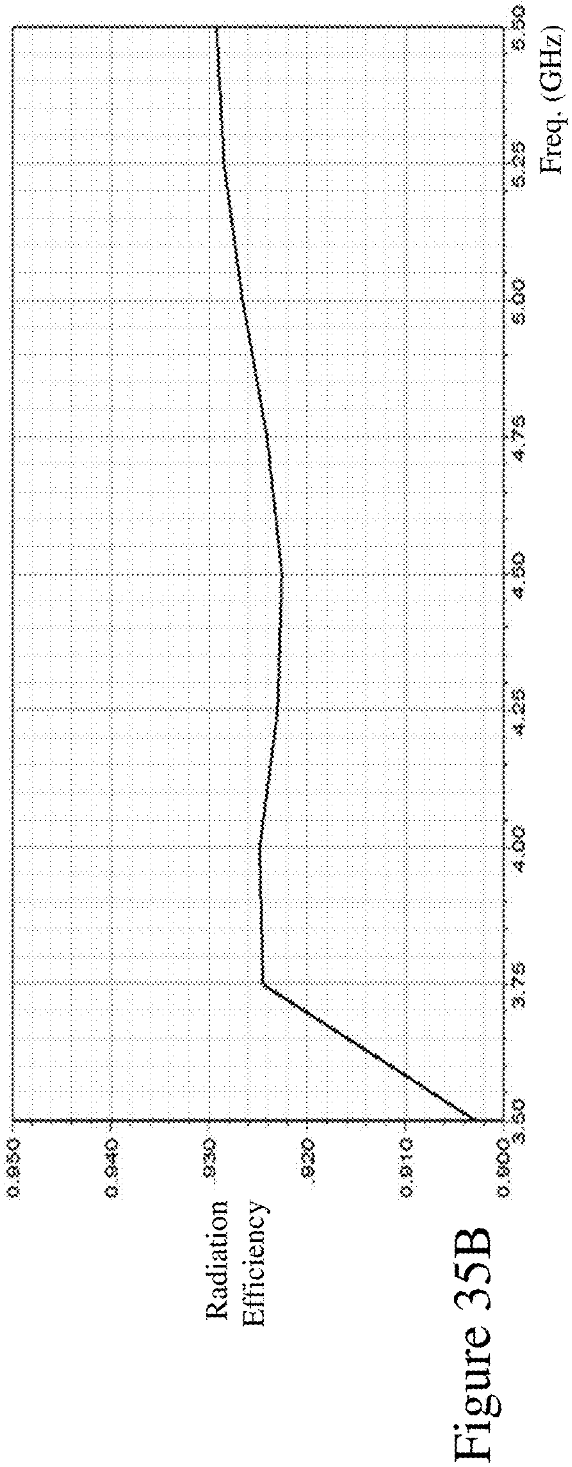

FIGS. 34A to 34C respectively depicted the antenna radiation patterns over the frequency band of interest for a diversity antenna exploiting Vivaldi antennas according to an embodiment of the invention. These being at 3.5 GHZ, 4.5 GHZ, and 5.5 GHz respectively. From these it is evident that the radiation pattern uniformity is maintained over the desired bandwidth whilst the peak realized gain ranges between 3.2 dBi to 3.5 dBi is obtained over the range 3.5 GHZ to 5.5 GHz which a sub-band of the overall operating bandwidth of the diversity antennas which is employed with UWB wireless devices manufactured by Spark Microsystems of Montreal, Canada. FIGS. 35A and 35B depict the peak realized gain and radiation efficiency of the designed antenna.

11. Dynamic Differential Drive Diversity Antenna Selection

Figure 36:
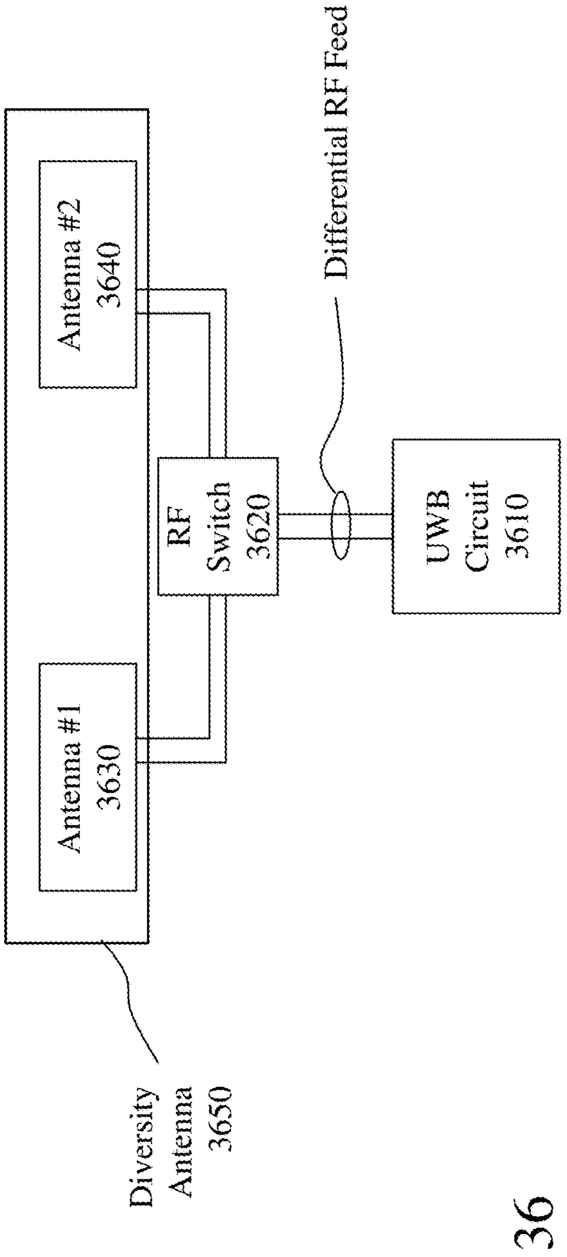
FIG. 36 depicts a configuration for a UWB device exploiting a diverse antenna with dynamic antenna selection.

As noted above in respect of the diversity antennas described according to embodiments of the invention within Section 4 and 10 respectively with the dual antennas a UWB transmitter can be connected to either one of the two antennas within the exemplary diversity antenna structures. However, where the UWB transmitter incorporates a differential structure then the UWB transmitter has a differential output. Accordingly, referring to FIG. 36 for a transmitter according to an embodiment of the invention a UWB Circuit 3610 provides a differential RF output which is coupled to an RF switch 3620 which provides an equivalent functionality as double pole double throw switch wherein in one state the RF Switch 3620 connects the differential RF output of the UWB Circuit 3610 to the first antenna, Antenna #1 3630, and then in the other state the RF Switch 3620 connects the differential RF output of the UWB Circuit 3610 to the second antenna, Antenna #2 3640. Antenna #1 3630 and Antenna #2 3640 being the two antennas within Diversity Antenna 3650. Based upon the switching speed of the RF Switch 3620 the UWB device employing the configuration depicted in FIG. 36 can reconfigure at the per-packet level. Optionally, where a UWB receiver supports an RF front end with differential capabilities then the circuit depicted in FIG. 36 can be employed to connect the dual outputs of an antenna according to an embodiment of the invention to a receiver UWB circuit.

Figure 37:
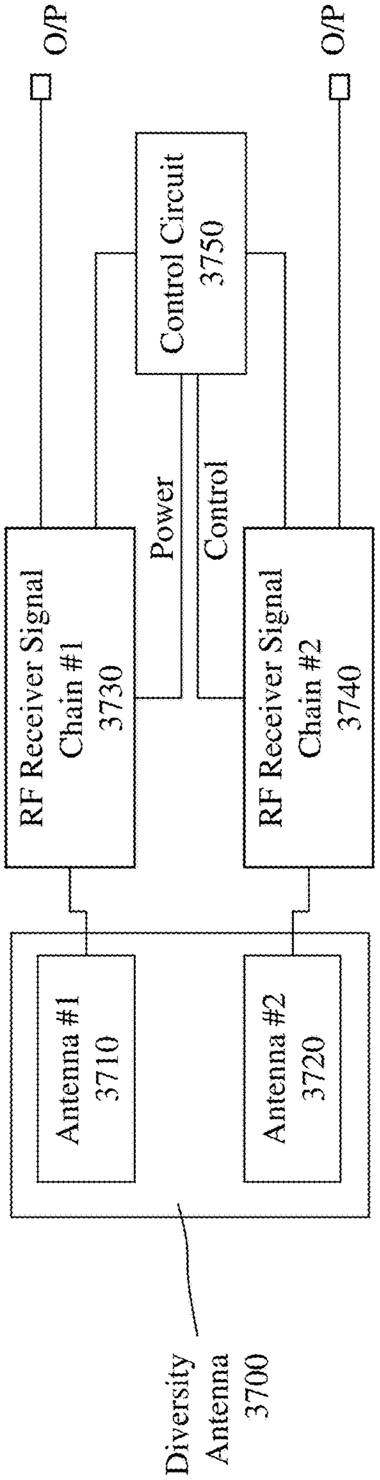
FIG. 37 depicts a configuration for a UWB receiver according to an embodiment of the invention exploiting parallel receiver channels with dynamic diversity antenna selection at per-packet level.

Now considering a UWB receiver then referring to FIG. 37 there is depict a Diversity Antenna 3700 comprising Antenna #1 3710 and Antenna #2 3720. Antenna #1 3710 is connected to a first RF front end, RF Receiver Signal Chain #1 3730, whilst Antenna #2 3720 is connected to a second RF front end, RF Receiver Signal Chain #2 3740. An output from each of RF Receiver Signal Chain #1 3730 and RF Receiver Signal Chain #2 3740 is coupled to a control circuit 3750 which determines which of the Receiver Signal Chain #1 3730 and RF Receiver Signal Chain #2 3740 provides improved signal reception and accordingly powers down the other circuit. Due to the fast power cycling of UWB receivers established by the inventors then UWB receivers according to embodiments of the invention can determine, for example, from a preamble within each packet which antenna to employ, select the appropriate antenna, and power down the other antenna such that the UWB receiver according to embodiments of the invention can establish a configuration per packet. Optionally, the Antenna #1 3710 and Antenna #2 3720 may each provide hemispherical radiation patterns such that the pair form a spherical coverage.

12. Chip Balun Antenna Subsystem

Figure 38:
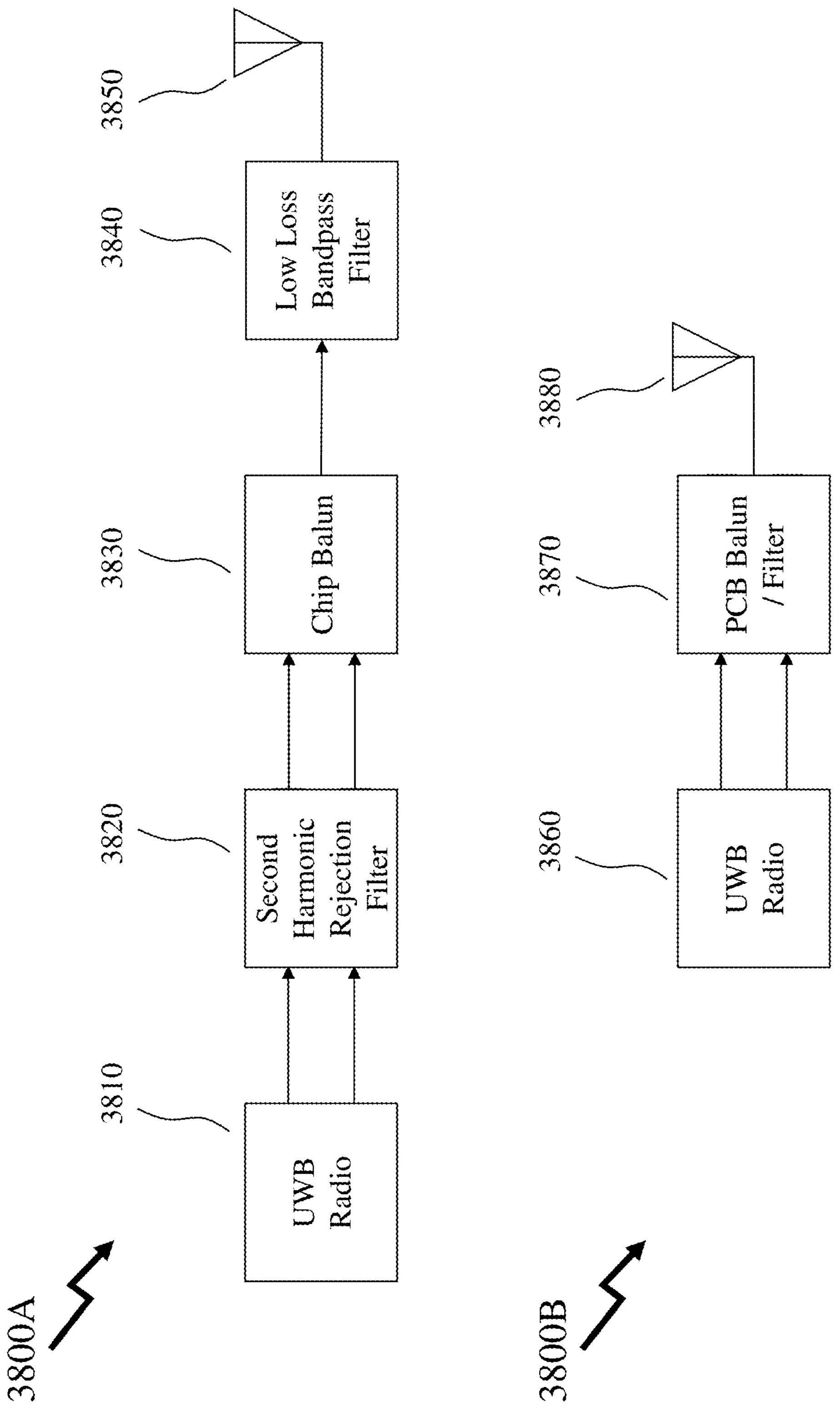
FIG. 38 depicts exemplary block diagrams of two UWB antenna subsystems according to embodiments of the invention.

An antenna subsystem is required to establish a wireless link between a UWB transceiver (radio) and the outside world such as described and depicted in FIG. 7, for example. This subsystem may include several components that are necessary for the performance of the whole system. Moreover, this subsystem should shape the output spectrum of the UWB radio in order to comply with the stringent requirements of a spectrum mask. This spectrum mask may, for example, be associated with a geographical region. Within FIGS. 2 and 3A there are depicted exemplary architectures for IR-UWB transmitters with and without biphasic scrambling according to embodiments of the invention. Within such IR-UWB transmitters may employ a differential output signal therein requiring a Balun to convert the balanced signal to an unbalanced (single-ended) signal. As depicted in FIG. 38 in first and second images 3800A and 3800B respectively depicting exemplary architectures for UWB radio modules which exploit a chip (circuit) balun in first image 3800A or a printed circuit board (PCB) based balun in second image 3800B.

First image 3800A depicts a UWB radio 3810 which provides a differential output signal to a second harmonic rejection filter 3820 which then generates a differential output signal to a chip balun 3830. The chip balun 3830 generates a single-ended signal which is passed to the antenna 3850 via a low loss passband filter 3840. Second image 3800B depicts a UWB radio 3860 which provides a differential output signal to a PCB balun/filter 3870. The output of the PCB balun/filter 3870 is a single-ended signal which is coupled to an antenna 3880.

12A. Chip Balun Antenna Subsystem

Figure 39:
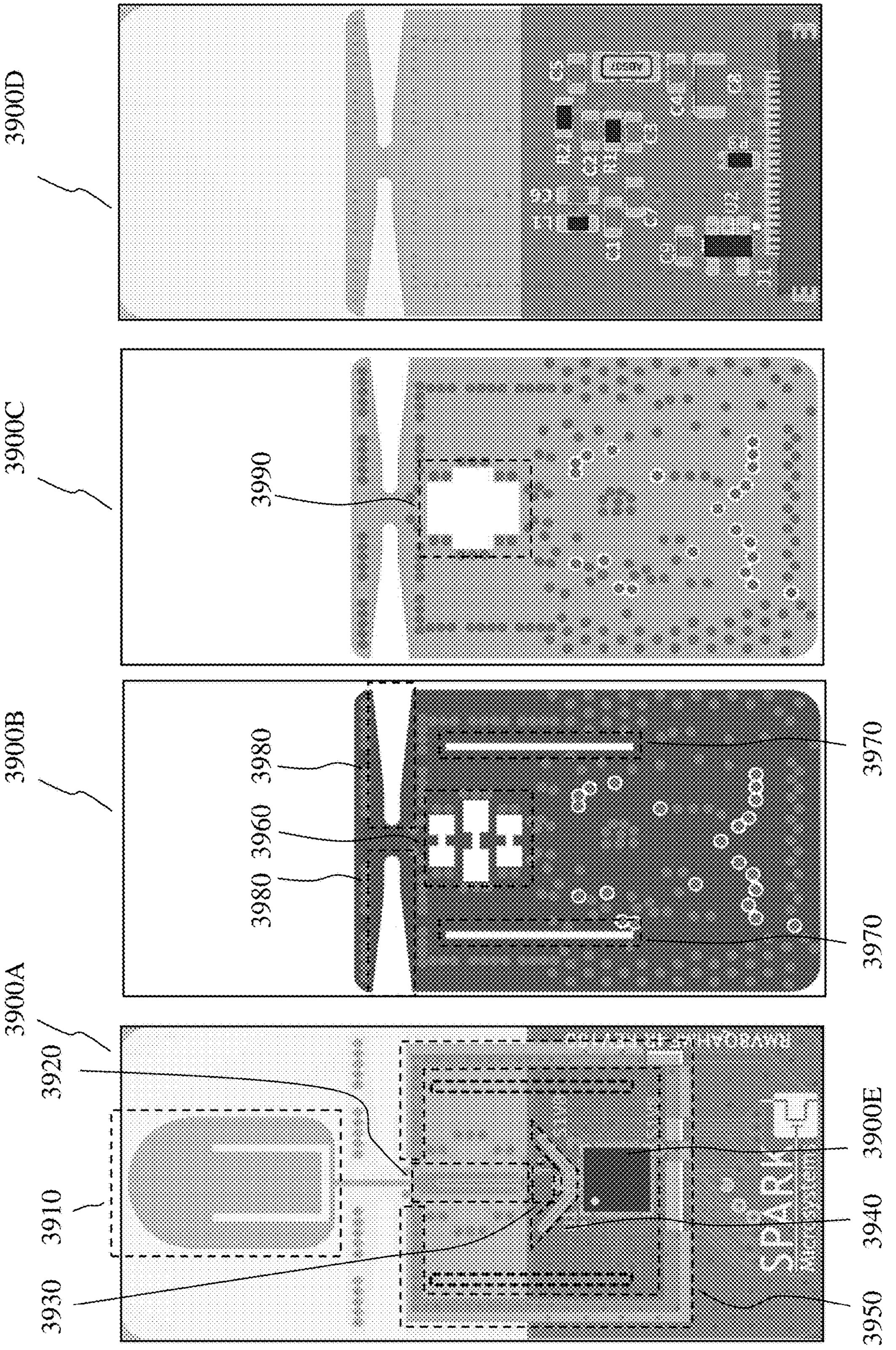
FIG. 39 depicts an exemplary layer stack for a printed circuit board (PCB) implementation of a UWB antenna subsystem employing a chip balun according to an embodiment of the invention.

Referring to FIG. 39 there are depicted first to fourth images 3900A to 3900D respectively for a chip balun antenna sub-system according to an embodiment of the invention wherein each of the first to fourth images 3900A to 3900D represents a different layer of a PCB employing a UWB radio in combination with a chip balun antenna subsystem. Within these first to fourth images 3900A to 3900D respectively there are depicted first to ninth elements 3910 to 3990 respectively. These comprise:

First element 3910, within the PCB top layer depicted in first image 3900A, comprising a monopole antenna with a single frequency notch filter. Within this embodiment a UWB monopole antenna is used which can provide an omni-directional radiation pattern around the antenna whilst the notch slot filter is designed on the antenna patch to reject signals around 5.8 GHz.

Second element 3920, within the PCB top layer depicted in first image 3900A, representing the top layer of a Defected Ground Structure (DGS) bandpass filter which employed in order to reduce the spurious out of band radiations whilst providing a low loss and compact band pass filter. Using a cavity backed defected ground structure the inventors have established a design with an extended rejection region up to 25 GHz whilst providing low loss (0.8 dB typical insertion loss) in a compact footprint of 9.0×2.0 mm (~0.0"×0.0") with low radiation loss. The top layer of the filter consists of an interdigital series capacitance and two stepped impedance resonators for rejecting the low frequency signals.

Third element 3930, within the PCB top layer depicted in first image 3900A, representing the chip balun. This may, for example, be a variant of the design of that depicted in FIGS. 17A and 17B respectively.

Fourth element 3940, within the PCB top layer depicted in first image 3900A, representing a second harmonic open stub filter wherein the feed line consists of two open stubs which are tuned to the center frequency of the second harmonic (e.g. 14 GHZ). Accordingly, this adds increases attenuation in this frequency region. Further, this structure is also tuned to provide a better impedance matching between the UWB radio 3900E and the required subsequent 5052 system.

Fifth element 3950, within the PCB top layer depicted in first image 3900A, e, within the third PCB layer depicted in second image 3900B, comprising a series of dumbbell shaped slots for the DGS filter wherein the series of dumbbell shaped slots in the ground plane provide for a wide stopband feature which is used to suppress spurious signals associated with the second and third harmonics.

Seventh element 3970, within the third PCB layer depicted in second image 3900B, comprising a pair of ground plane slots. An electromagnetic interference metal shield for the UWB radio 3900E can act as a cavity resonator at some frequencies which causes undesired radiation at these frequencies. In order to mitigate this effect a pair of $\lambda/2$ slots are formed within the ground plane such that at the cavity resonant frequencies the excited modes are coupled to the bottom layers of the PCB and the energy is dissipated rather than being radiated.

Eighth element 3980, within the third PCB layer depicted in second image 3900B, comprising a pair of tapered ground plane slots: Due to the large ground plane, radiation nulls can appear in the radiation pattern of the antenna module which can have destructive effects on the performance of the whole system. In order to mitigate those nulls, the two tapered slots represented by eighth element 3980 were designed into each side of the ground plane. By modifying the path of the surface currents, these slots improve the radiation performance of the module and provide a uniform radiation pattern.

Ninth element 3990 comprising a slot within the second PCB layer depicted in third image 3900C which is placed in this second PCB layer in order to couple the wave to the bottom lower. Therefore, the combination of second element 3920, sixth element 3960, and ninth element 3990 which are bounded by vias, form a cavity backed band pass filter using DGS and interdigital series capacitance.

Fourth image 3900D representing the bottom PCB layer. Accordingly, the subsystem presented in FIG. 39 provides a uniform and omni-directional radiation pattern over the whole frequency range of the UWB radio 3900E, an effective and low loss filtering of the second and third harmonics as well as low frequency undesired radiations, a shielded structure with suppressed cavity resonance modes for low electromagnetic interference, and a compact low loss balun.

Figure 40B:
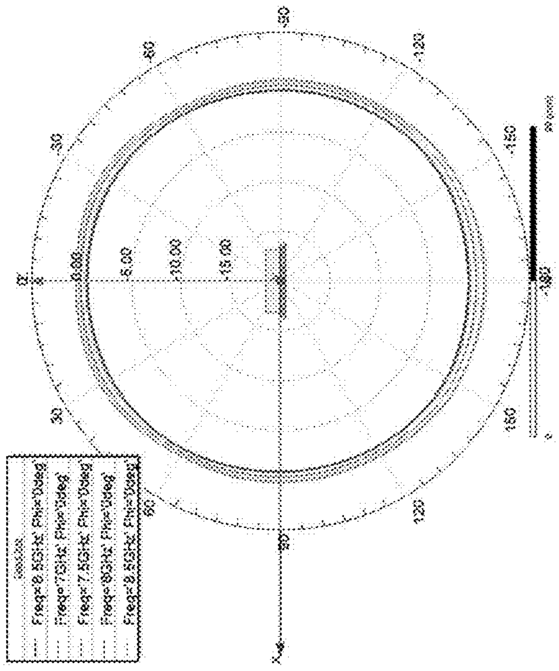
FIGS. 40A to 40C depict antenna radiation patterns over the frequency band of interest for the UWB antenna subsystem according to an embodiment of the invention as depicted in FIG. 39.
Figure 40A:
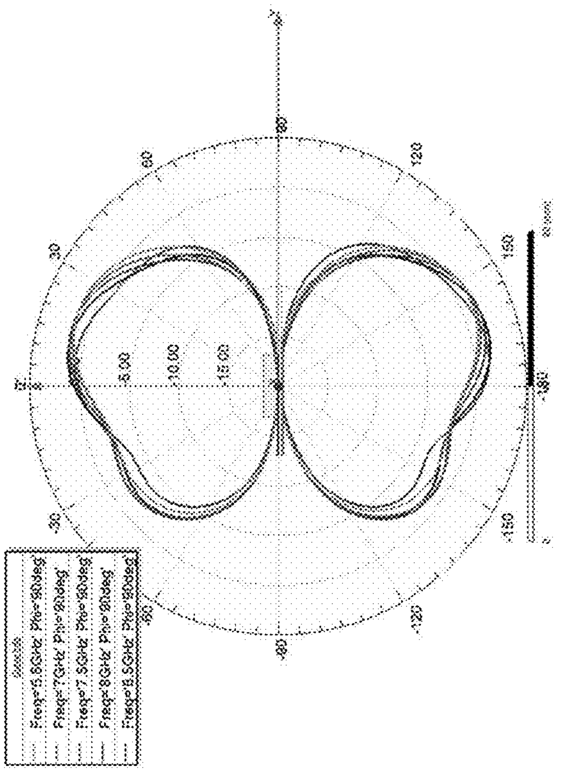
Figure 40C:
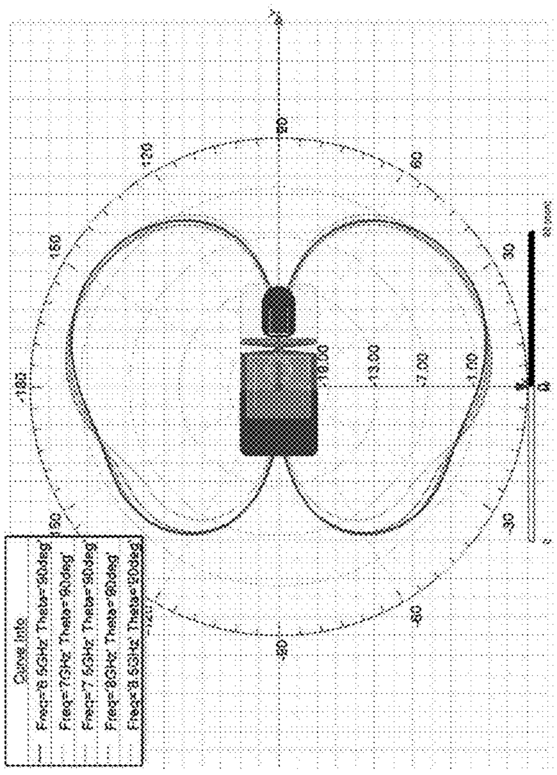
Figure 41A:
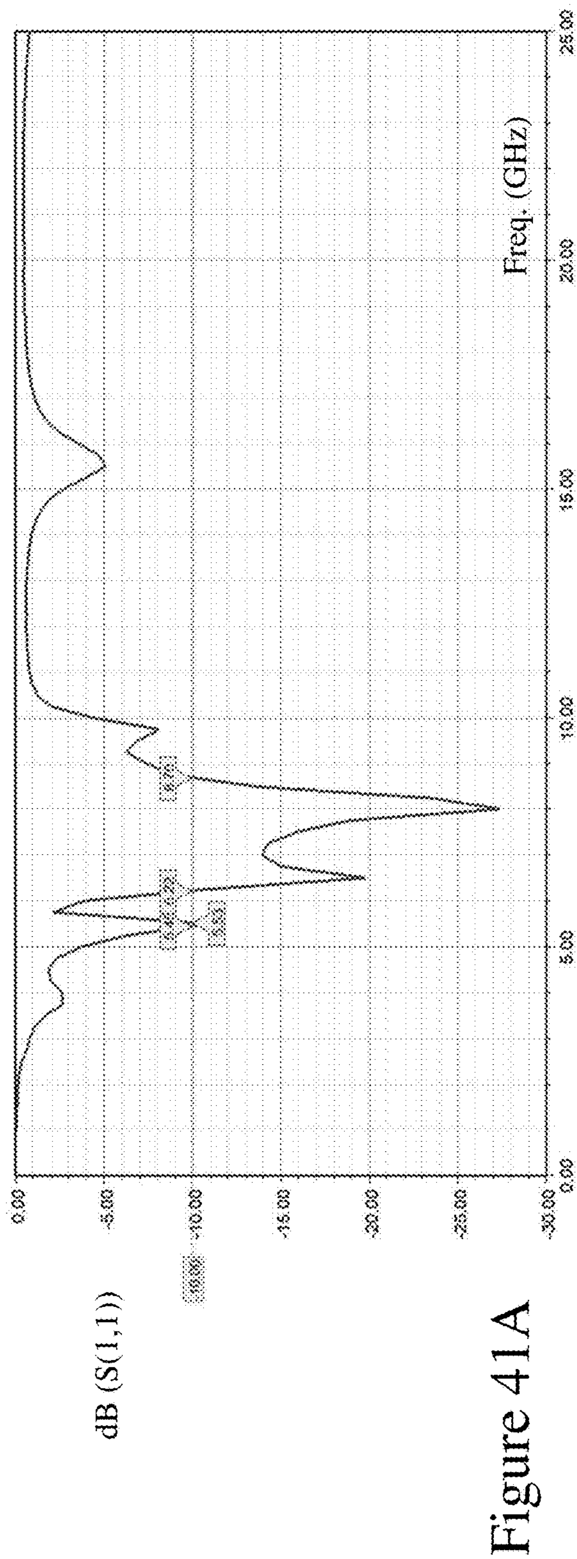
FIGS. 41A and 41B depict the S11 and peak gain for the UWB antenna subsystem according to an embodiment of the invention as depicted in FIG. 39.
Figure 41B:
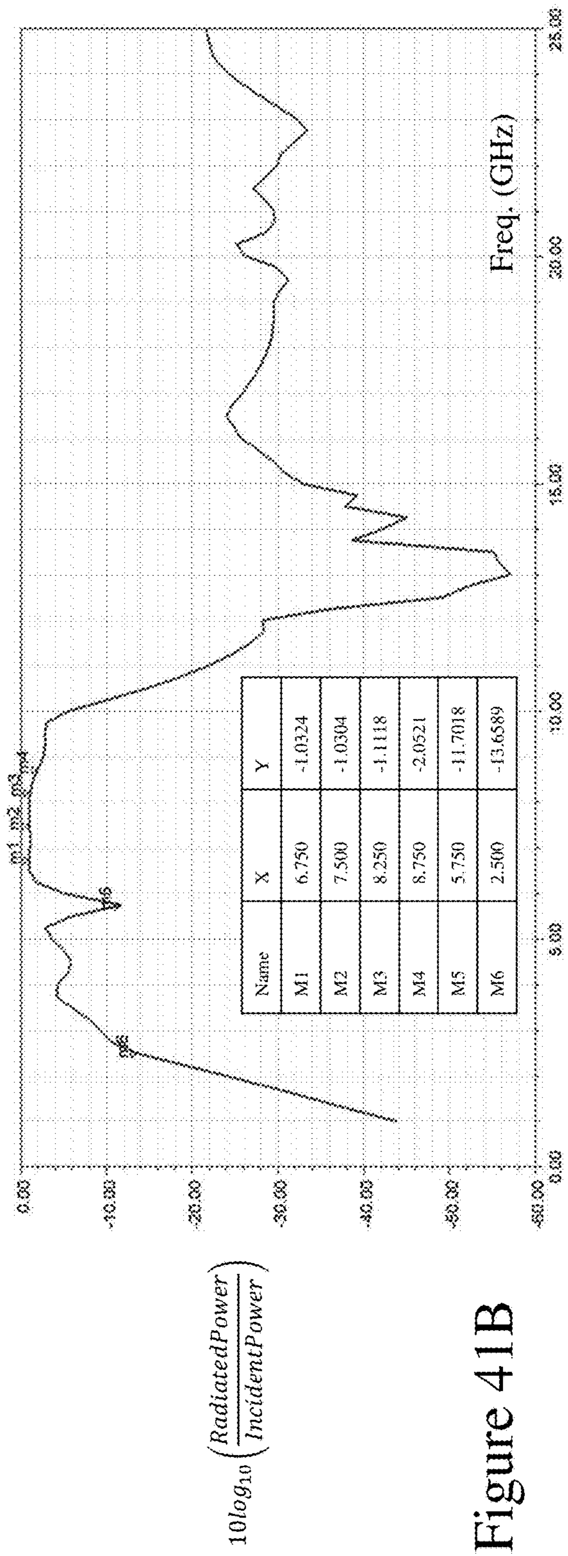

Referring to FIGS. 40A to 40C there are depicted antenna radiation patterns over the frequency band of interest for the UWB antenna subsystem according to an embodiment of the invention as depicted in FIG. 39 over the frequency range 6.5 GHz to 8.5 GHz. FIGS. 41A and 41B depict the S11 and peak gain for the UWB antenna subsystem according to an embodiment of the invention as depicted in FIG. 39.

12B. PCB Balun Antenna Subsystem

Figure 42:
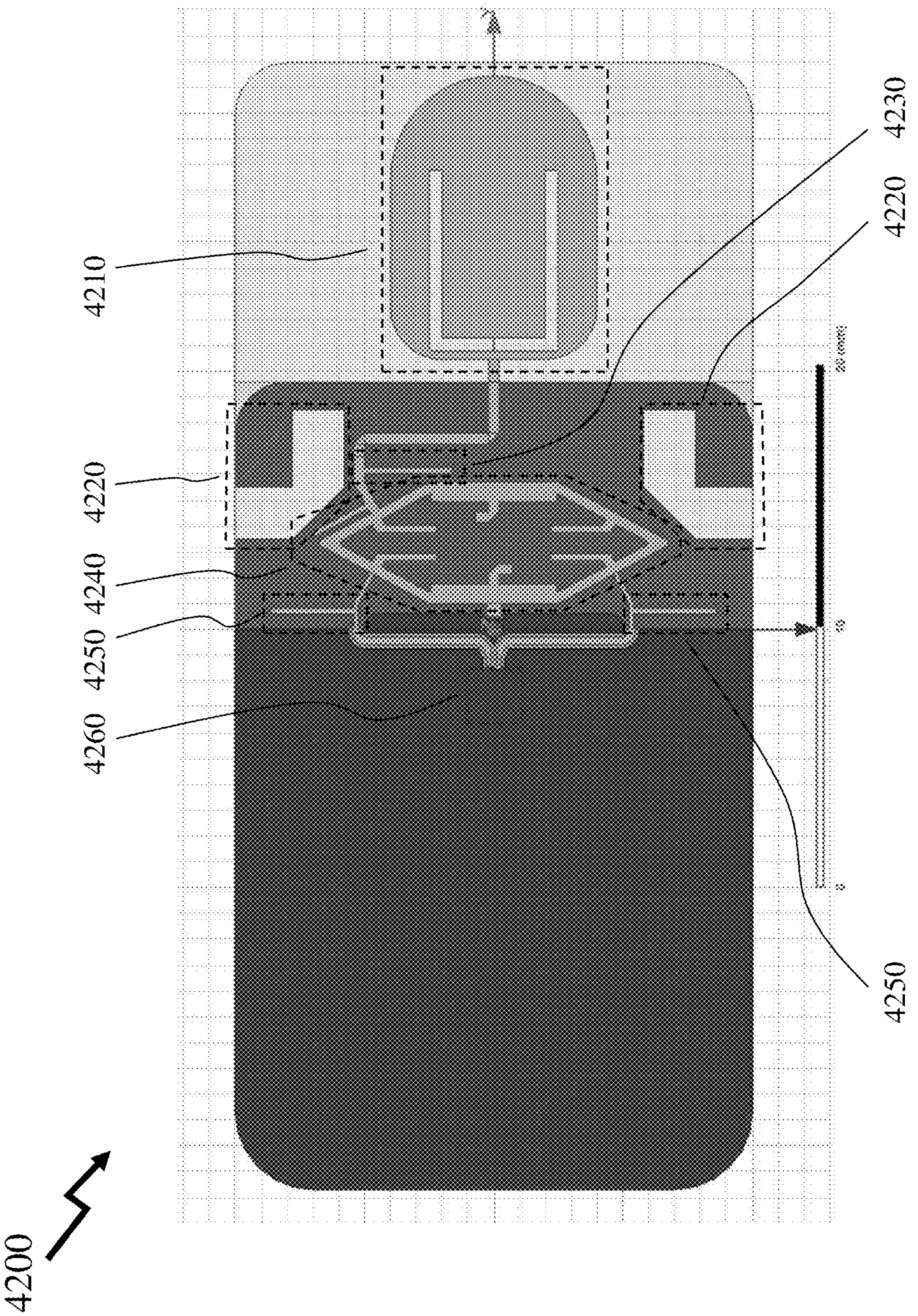
FIG. 42 depicts an exemplary PCB balun according to an embodiment of the invention.

Referring to FIG. 42 there is depicted a PCB balun/filter circuit 4200 for transforming a balanced signal to a single-ended signal such as the PCB Balun/Filter 3870 in second image 3800B in FIG. 38. Within PCB balun/filter 4200 there are depicted first to sixth elements 4210 to 4260 respectively. These comprise:

First element 4210 comprising a monopole antenna with a single frequency notch filter which is employed to provide an omnidirectional radiation pattern around the antenna. The notch slot filter is designed on the antenna patch to reject frequencies around 5.8 GHZ.

Second element 4220 comprising a pair of bent ground plane slots. Due to the large ground plane radiation nulls can appear in the radiation pattern of the antenna module resulting in destructive effects on the performance of the whole system. In order to mitigate those nulls, two bent ground plane slots were designed on each side of the ground plane which, by modifying the path of the surface currents, improve the radiation performance of the module and provide a uniform radiation pattern.

Third element 4230 representing an open stub filter on the output of the PCB balun/filter 4240 prior to the monopole antenna, first element 4210.

Fourth element 4240 comprising the PCB balun/filter which employs a "rat-race" hybrid with the delta output connected to the antenna and the sum port grounded. The balun is loaded with a pair of open stub filters, fifth elements 4250, in order to suppress the undesired signals from the second and third harmonics. Four more open stubs are added before and after the balun to increase the rejection level of the out of band signals (not identified for clarity but evident within the inner portion of the "rat-race" hybrid.

Fifth elements 4250 representing the open stub filters on the inputs to the PCB balun/filter, fourth element 4240, which provide improved rejection of the common mode and differential mode signals before they enter the balun.

Sixth element 4260 being the UWB radio.

Accordingly, the inventors have established a PCB balun/filter circuit 4200 which provides excellent filtering capability of the high frequency spurious harmonics together with integration of filtering and balun function into one PCB structure leading to a compact and low-cost solution. The PCB balun/filter circuit 4200 provides an omni-directional radiation pattern with uniform gain around the antenna module for the whole required frequency band.

Accordingly, the innovations within the PCB balun/filter circuit 4200 include the use of ground plane slots for smoothing the radiation pattern and providing a uniform gain around the antenna for all frequencies in conjunction with a compact PCB balun/filter structure with excellent filtering of the high frequency spurious signals.

Figure 43B:
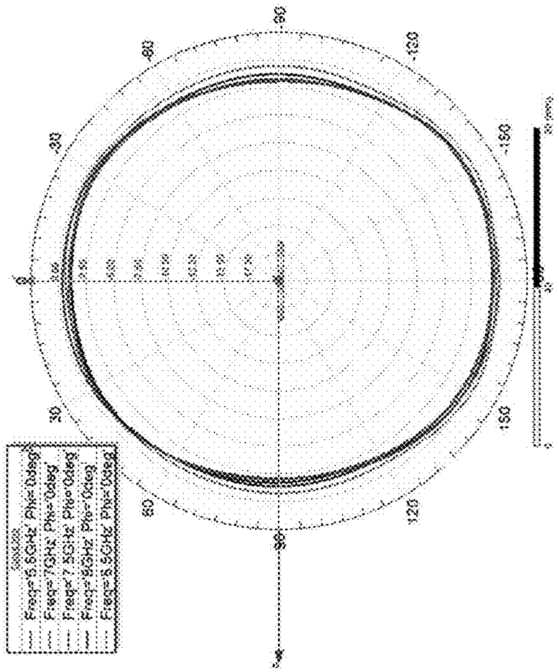
FIGS. 43A to 43C depict antenna radiation patterns over the frequency band of interest for the UWB antenna subsystem according to an embodiment of the invention as depicted in FIG. 42.
Figure 43A:
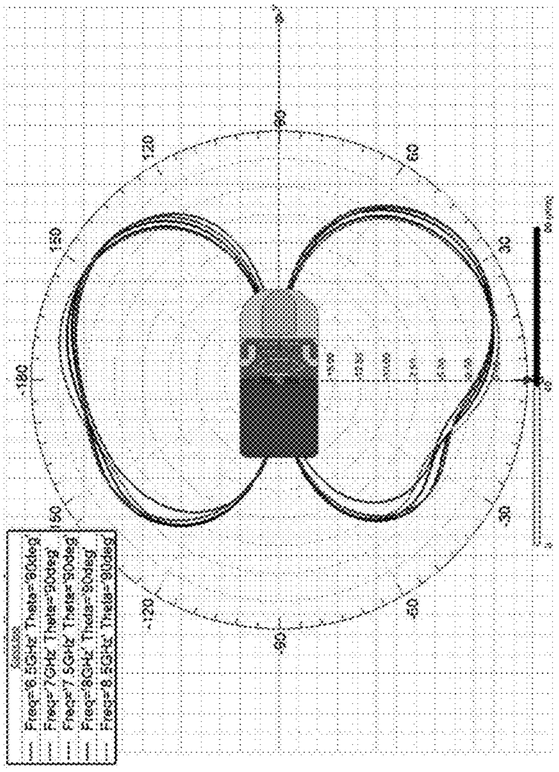
Figure 43C:
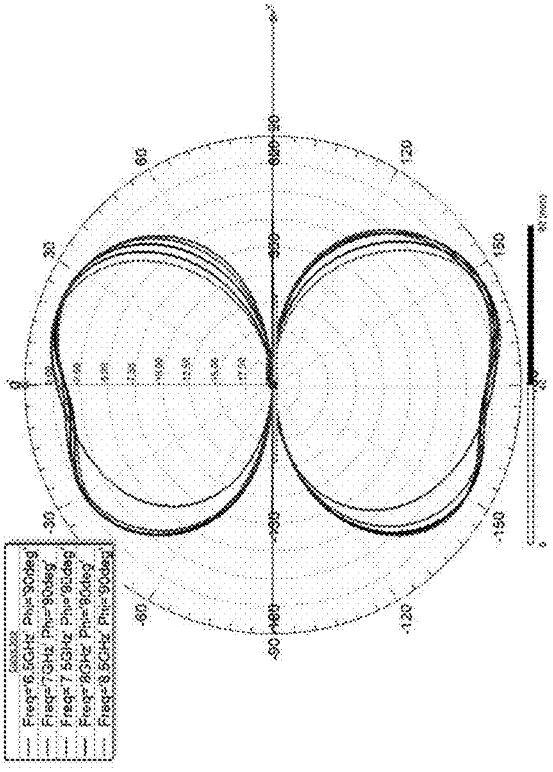
Figure 44A:
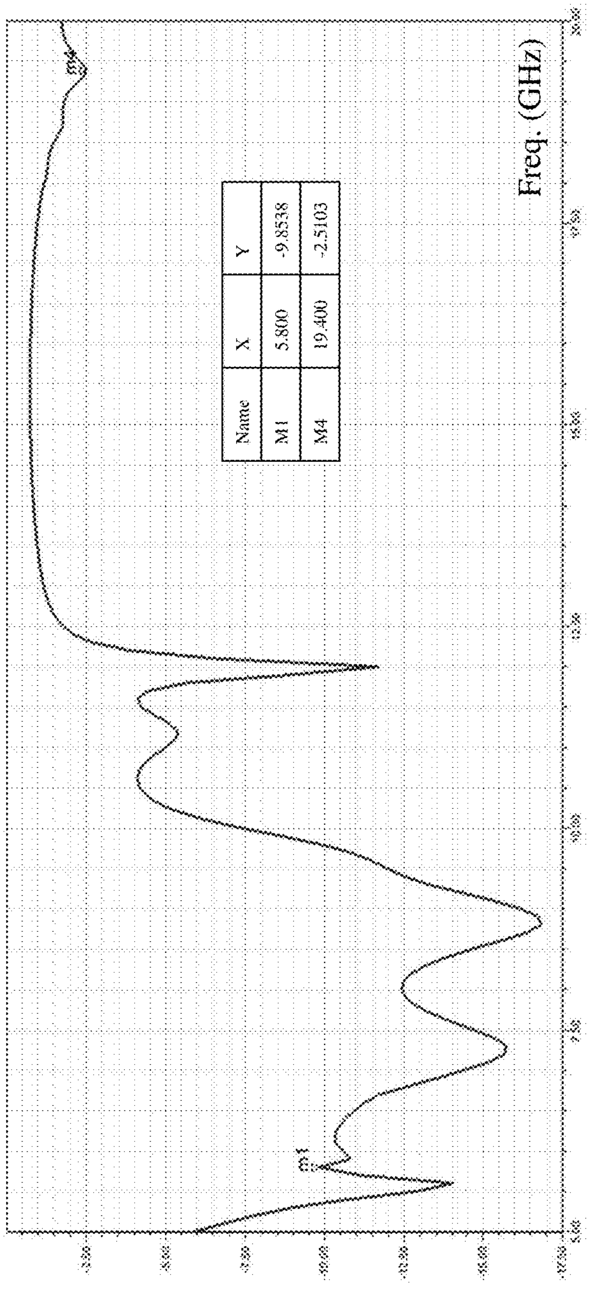
FIGS. 44A and 44B depict the S11 and peak gain for the UWB antenna subsystem according to an embodiment of the invention as depicted in FIG. 42.
Figure 44B:
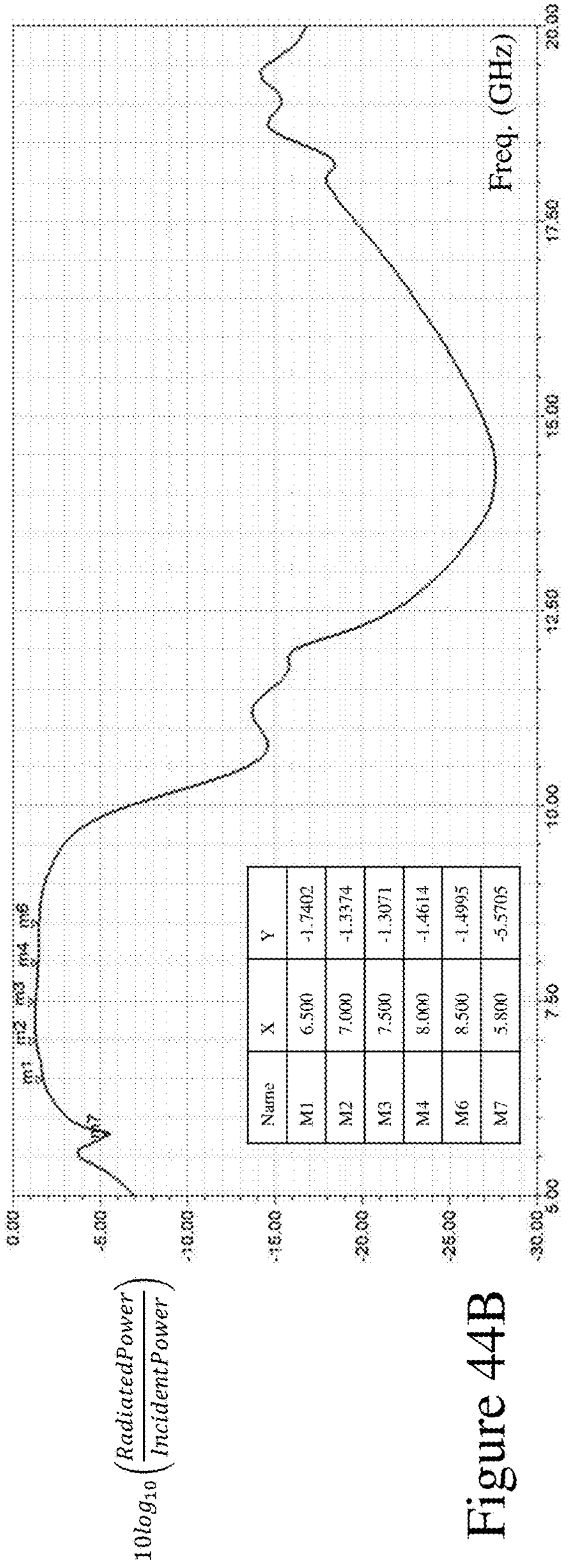

Referring to FIGS. 43A to 43C there are depicted antenna radiation patterns over the frequency band of interest for the UWB antenna subsystem according to an embodiment of the invention as depicted in FIG. 42 over the frequency range 6.5 GHz to 8.5 GHz. FIGS. 44A and 44B depict the S11 and peak gain for the UWB antenna subsystem according to an embodiment of the invention as depicted in FIG. 39.

13. Differential Antenna with Harmonic Rejection

As described above a UWB radio may be directly connected to a differential antenna or indirectly to a single ended antenna using a balun. As described above these single ended antenna modules may have integrated filtering capabilities to reject undesired spurious signals. However, this is possible where the extra cost and insertion loss of a balun can be accepted. However, within some UWB systems these penalties cannot be accepted and accordingly the inventions have established new UWB antenna modules to address employing either a filtered loop antenna methodology as described below in section 13A or a differential antenna module such as described below in section 13B. Within each harmonics rejection is achieved using a differential low pass filter thereby removing the requirement for a balun which in turns reduces the losses and the fabrication costs associated with this additional component.

13A. Filtered Loop Antenna Module

Figure 45:
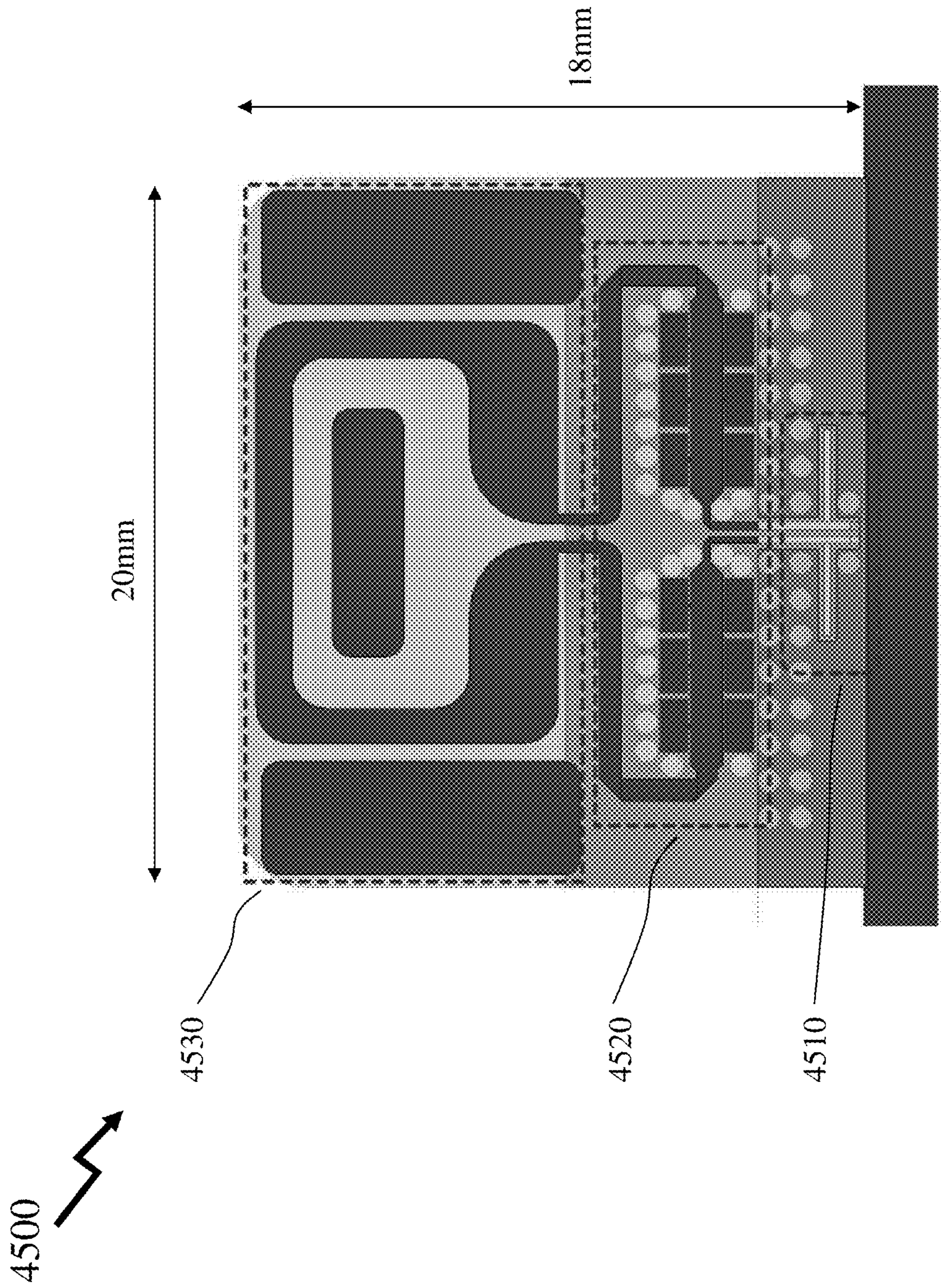
FIG. 45 depicts an exemplary filtered loop antenna module according to an embodiment of the invention.

Referring to FIG. 45 there is depicted an exemplary filtered loop antenna module 4500A according to an embodiment of the invention having overall dimensions of 20 mm (0.8") by 18 mm (0.7"). Within filtered loop antenna module 4500 there are depicted first to third elements 4510 to 4530 respectively. These comprise:

First element 4510 which is a differential feed line which connects the UWB radio to the antenna front-end and includes open stubs attenuation notch filters to attenuate second harmonic signals.

Second element 4520 which is a differential low-pass filter that rejects both the common mode and differential mode spurious signals. The structure of the filter is similar to the previously presented filter above for monopole antenna subsystems. The input differential signal is split between two 50Ω microstrip lines which is then filtered through a Defected Ground Structure (DGS) low pass filter before being fed to the differential antenna, third element 4530, and radiated.

Third element 4530 which is the differential loop antenna loaded with parasitic elements wherein the structure of this antenna is similar to the previously presented loop antenna above.

Beneficially the filtered loop antenna module 4500 provides for a compact and low loss structure for the novel differential low pass filter which provides for a wide rejection region of the second and third harmonics together with a low cost efficient structure not requiring a balun. Further, the high pass nature of the antenna combined with the low pass filter provides a bandpass radiation of the incident wave such as depicted in Figure as it can be observed in FIG. 46B.

Figure 46A:
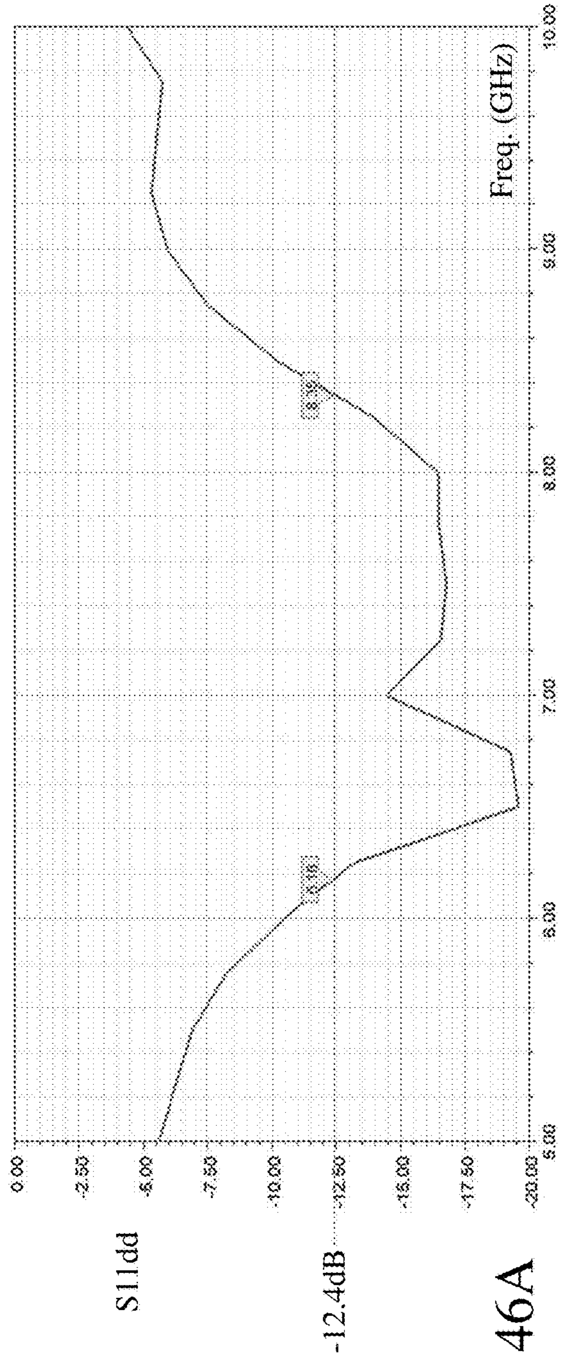
FIGS. 46A and 46B depict the S11 and radiation efficiency for the UWB antenna subsystem according to an embodiment of the invention as depicted in FIG. 45.
Figure 46B:
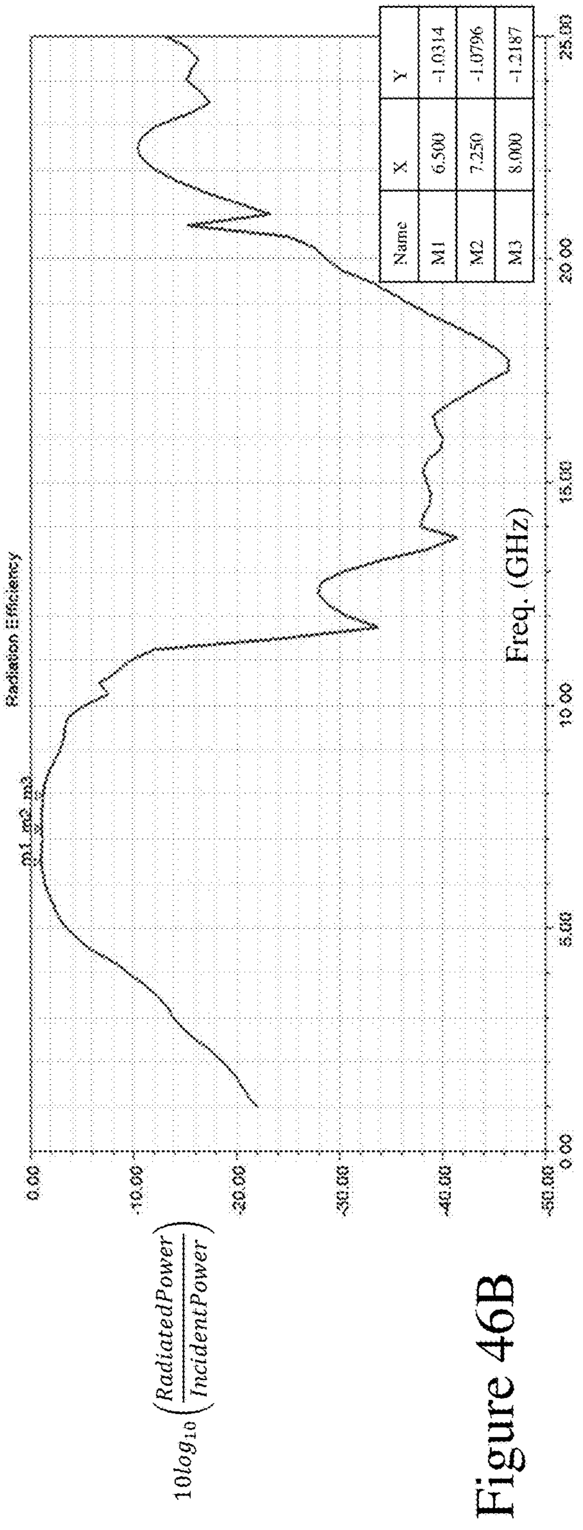
Figure 47B:
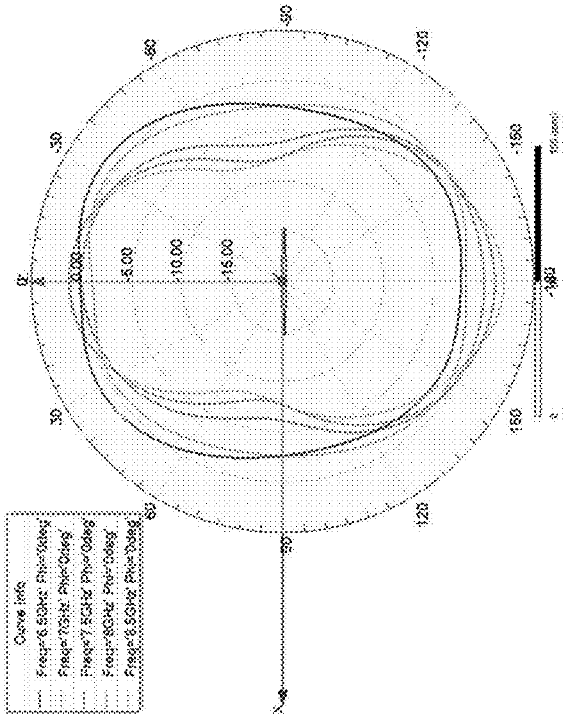
FIGS. 47A to 47C depict antenna radiation patterns over the frequency band of interest for the UWB antenna subsystem according to an embodiment of the invention as depicted in FIG. 45.
Figure 47A:
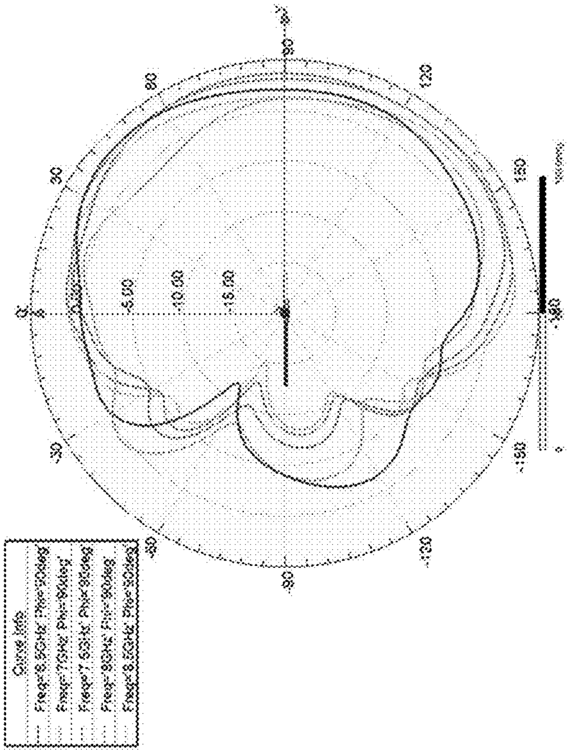
Figure 47C:
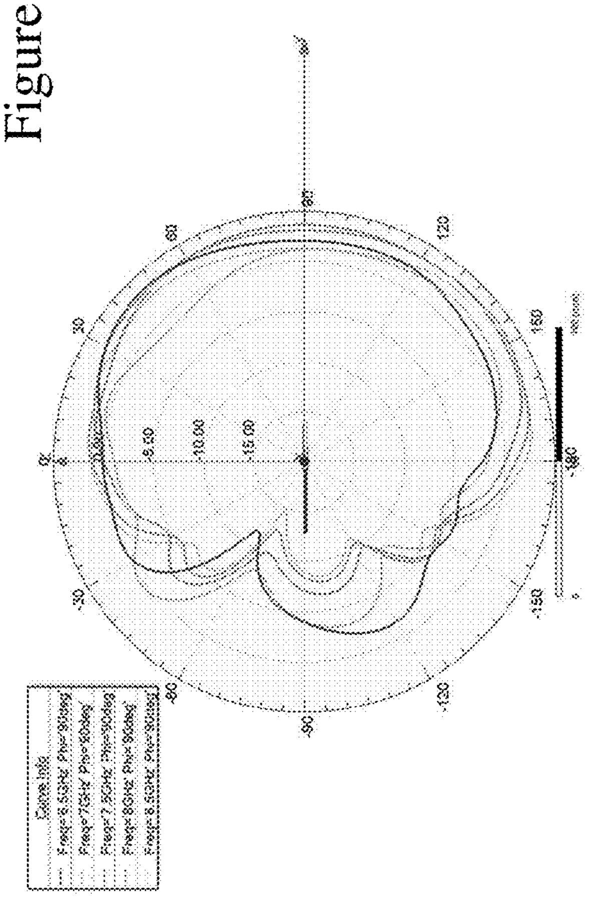

Referring to FIGS. 46A and 46B there are depicted the S11 and radiation efficiency for the UWB antenna subsystem according to an embodiment of the invention as depicted in FIG. 45. Accordingly, it is evident that the filtered loop module 4500 provides for good impedance matching from 6.2 GHz to 8.35 GHz which covers the required frequency bandwidth of an exemplary UWB radio such as that manufactured by Spark Microsystems of Montreal, Quebec, Canada. Moreover, the radiation efficiency plot in FIG. 46B shows the rejection of the high frequency signals at the harmonics as well as low frequency signals. Now referring to FIGS. 47A to 47C depict antenna radiation patterns over the frequency band of interest for the UWB antenna subsystem according to an embodiment of the invention as depicted in FIG. 45.

13B. Differential Patch Antenna Module

Figure 48:
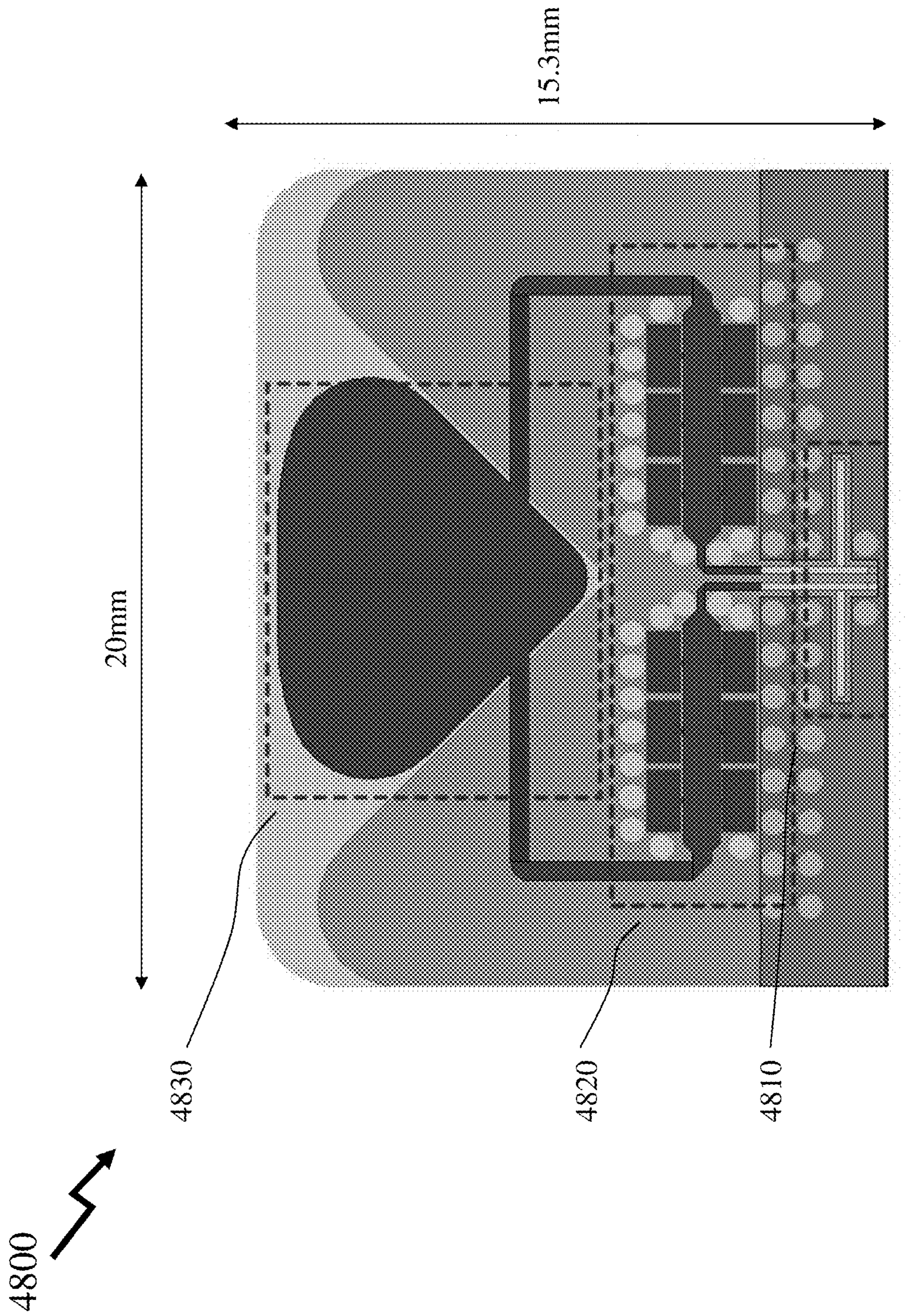
FIG. 48 depicts an exemplary differential patch antenna module according to an embodiment of the invention.

A similar structure of the feedline and filter as described above in respect of FIG. 45 may also be employed with different differential antenna types such as the one depicted in the FIG. 48. Accordingly, FIG. 48 depicts an exemplary differential patch antenna module according to an embodiment of the invention. Within differential patch antenna module 4800 there are depicted first to third elements 4810 to 4830 respectively. These comprise:

First element 4810 which is a differential feed line which connects the UWB radio to the antenna front-end and includes open stubs attenuation notch filters to attenuate second harmonic signals.

Second element 4820 which is a differential low-pass filter that rejects both the common mode and differential mode spurious signals. The structure of the filter is similar to the previously presented filter above for monopole antenna subsystems. The input differential signal is split between two 50Ω microstrip lines which is then filtered through a Defected Ground Structure (DGS) low pass filter before being fed to the differential antenna, third element 4530, and radiated.

Third element 4830 which is the differential loop antenna loaded with parasitic elements wherein the structure of this antenna is similar to the previously presented loop antenna above.

Figure 49B:
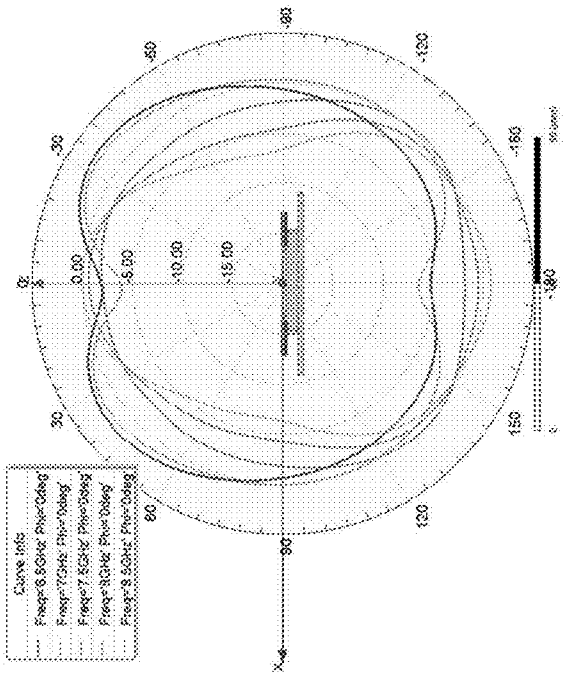
FIGS. 49A to 49C depict antenna radiation patterns over the frequency band of interest for the UWB antenna subsystem according to an embodiment of the invention as depicted in FIG. 48.
Figure 49A:
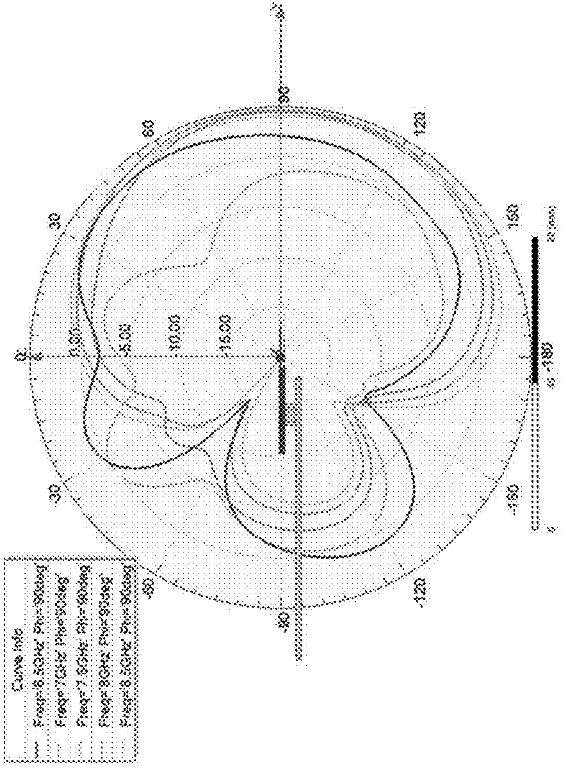
Figure 49C:
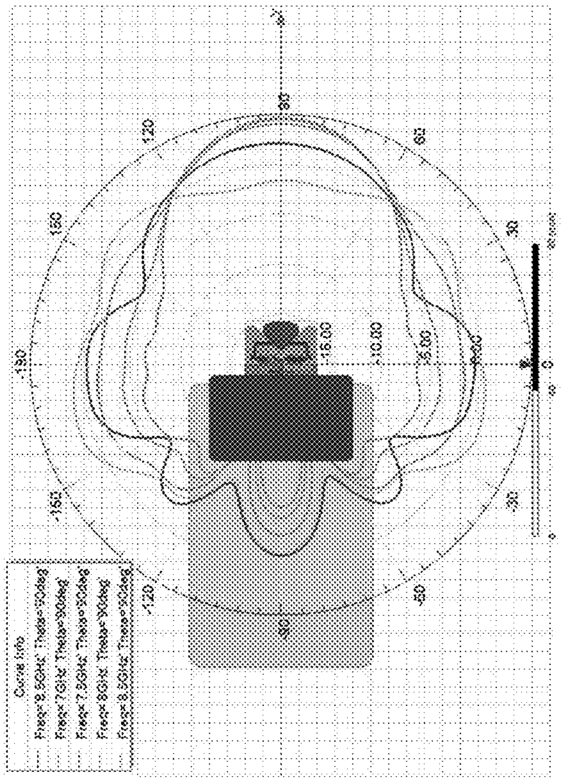

As evident from FIG. 48 this antenna provides a more compact module with smaller overall dimensions whilst offering, as may be observed from the radiation pattern plots in FIGS. 49A to 49C respectively, the antenna gain on the sides (Phi=0°, Theta=90°) is higher than compared to the loop antenna. This results in improved coverage within indoor environments for example.

Figure 50A:
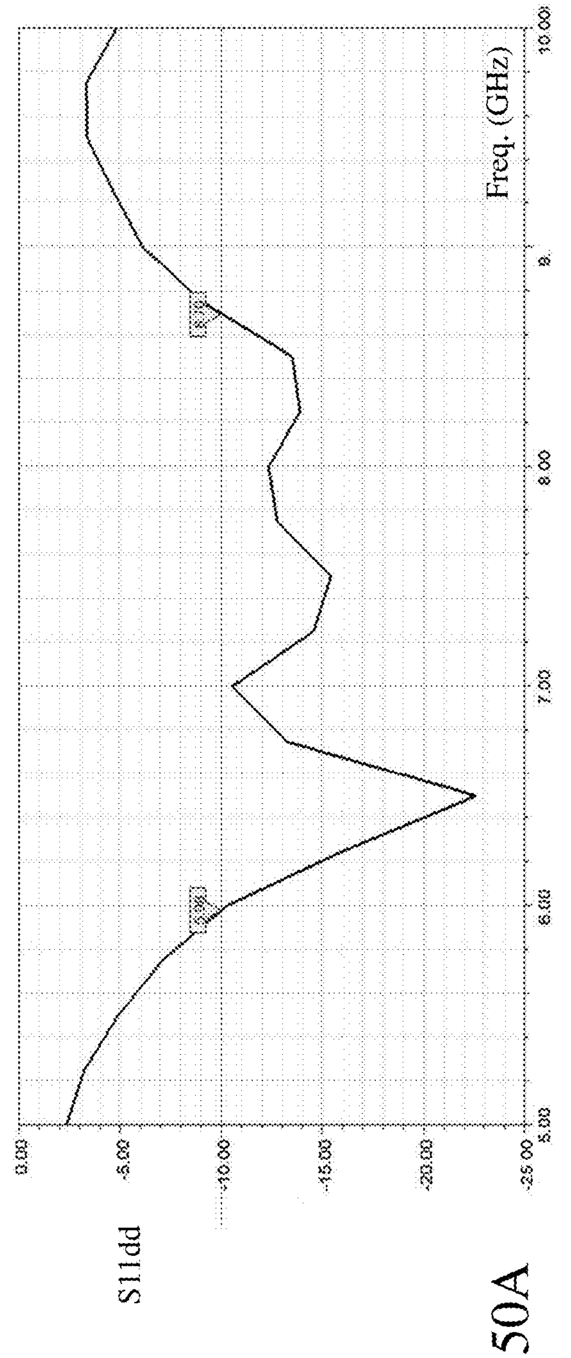
FIGS. 50A and 50B depict the S11 and radiation efficiency for the UWB antenna subsystem according to an embodiment of the invention as depicted in FIG. 48.
Figure 50B:
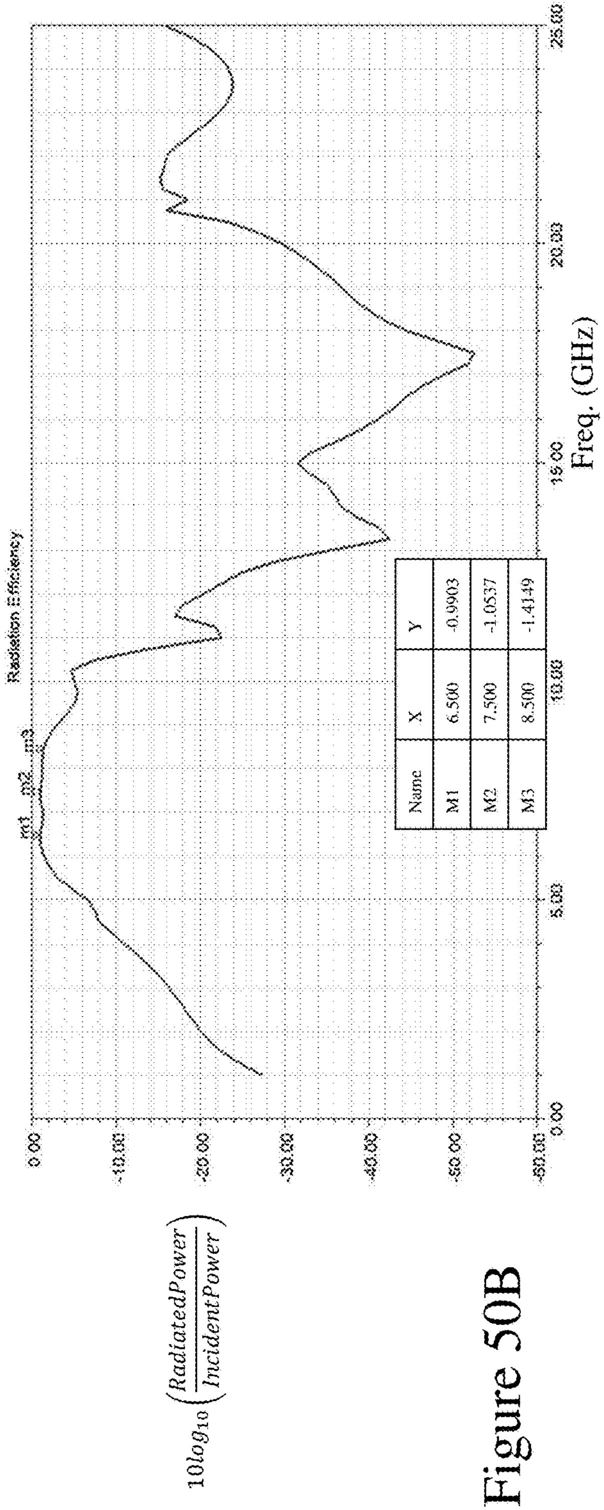

Referring to FIGS. 49A to 49C depict antenna radiation patterns over the frequency band of interest for the UWB antenna subsystem according to an embodiment of the invention as depicted in FIG. 48. Now referring to FIGS. 50A and 50B there are depicted the S11 and radiation efficiency for the UWB antenna subsystem according to an embodiment of the invention as depicted in FIG. 48. Accordingly, it is evident that the antenna shows good impedance matching over the frequency range of interest, 6.0 GHz to 8.7 GHZ, and that the radiation efficiency shows the bandpass nature of the overall structure which results in efficient rejection of undesired signals.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

providing an ultra-wideband (UWB) circuit comprising at least one of a transmitter circuit for encoding data as signals within a predetermined frequency range and a receiver circuit for decoding other data from other signals within the predetermined frequency range and a controller coupled to the at least one of the transmitter circuit and the receiver circuit; and an antenna sub-system coupled to the at least one of the transmitter circuit and the receiver circuit; wherein when the UWB circuit comprises the transmitter circuit the transmitter circuit comprises a radio frequency (RF)

signal generator receiving the data to be transmitted and a clock signal characterised by a clock frequency;

the controller controls the generation of the signals encoding the data such that each bit within the data being transmitted is comprised of a plurality N pulses generated by the RF signal generator wherein each pulse of the N pulses is at a predetermined frequency of a plurality M frequencies, has a predetermined amplitude, and has a predetermined pulse length;

N≥2 and M≥2; and

M and N are integers.

2. The method according to claim 1, wherein the predetermined frequency band is a sub-band of a plurality of sub-bands of the predetermined frequency range.

3. The method according to claim 1, wherein the predetermined frequency band is a sub-band of a plurality of sub-bands of the predetermined frequency range established in dependence upon a spectrum sensing process executed by the controller; and either:

the spectrum sensing process employs quality of service data established by a receiver receiving the encoded data from the UWB circuit; or the spectrum sensing process employs quality of service data established by a network controller in dependence upon at least one of a first receiver forming part of the network controller and a second receiver in communication with the network controller receiving the encoded data from the transmitter circuit.

4. The method according to claim 1, wherein the predetermined frequency band is a sub-band of a plurality of sub-bands of the predetermined frequency range of the transmitter circuit; and the controller controls the transmitter circuit to cycle through a number of sub-bands of the plurality of sub-bands in a predetermined order.

5. The method according to claim 1, wherein the predetermined frequency band is a sub-band of a plurality of sub-bands of the predetermined frequency range of the transmitter circuit;

the controller controls the transmitter circuit to cycle through a first subset of the plurality of sub-bands in a predetermined order for a number of cycles; and the controller then controls the transmitter circuit to cycle through a second subset of the plurality of sub-bands in a predetermined order for a number of cycles; wherein the controller changes from the first subset of the plurality of sub-bands to the second subset of the plurality of sub-bands in dependence upon quality of service data received by the controller from at least one of a first receiver and a network controller comprising a second receiver; and the at least one of the first receiver and the second receiver receive the data from the transmitter circuit.

6. The method according to claim 1, wherein the controller controls the transmitter circuit to first transmit the plurality N pulses each having the predetermined frequency of the plurality M frequencies in a first sequence;

the controller controls the transmitter circuit to then transmit the plurality N pulses each having the predetermined frequency of the plurality M frequencies in a second sequence; wherein the controller changes from the first sequence to the second sequence in dependence upon quality of service data received by the transmitter from at least one of first receiver and a network controller comprising a second receiver; and the at least one of the first receiver and the second receiver receive the transmitted data from the transmitter circuit.

7. The method according to claim 1, wherein the controller controls the RF signal generator to generate the plurality N pulses at a pulse repetition rate;

the controller controls the RF signal generator to generate a second plurality P pulses at a different pulse repetition rate;

the plurality N pulses are transmitted within the duration of the bit of the data signal having a first duration; and the second plurality P pulses are transmitted within the duration of another bit of the data signal having a second duration.

8. The method according to claim 1, wherein the controller applies a dither to each pulse of the plurality N pulses.

9. The method according to claim 8, wherein the dither is at least one of:

a dither in the pulse position of the pulse of the plurality N pulses;

a dither in the width of the pulse of the plurality N pulses; and a dither in the frequency of the pulse of the plurality N pulses.

10. The method according to claim 1, wherein the controller applies a chirp to the pulse of the plurality N pulses.

11. The method according to claim 8, wherein the chirp is one of down in frequency, up in frequency, or a predetermined profile incorporating a first portion down in frequency and a second portion up in frequency.

12. A method comprising:

providing an ultra-wideband (UWB) circuit comprising at least one of a transmitter circuit for encoding data as signals within a predetermined frequency range and a receiver circuit for decoding other data from other signals within the predetermined frequency range and a controller coupled to the at least one of the transmitter circuit and the receiver circuit; and an antenna sub-system coupled to the at least one of the transmitter circuit and the receiver circuit; wherein the other data received and decoded by the receiver circuit comprises packets of other data;

the antenna sub-system comprises:

a first receiver signal chain coupled to a first antenna;

a second receiver signal chain coupled to a second antenna; and a switch selectively coupling the UWB circuit to one of the first receiver signal chain and the second receiver signal chain; and the controller determines whether to power down one of the first receiver signal chain and the second receiver signal chain in dependence upon a preamble of each packet of other data.

13. A method comprising:

providing an ultra-wideband (UWB) circuit comprising at least one of a transmitter circuit for encoding data as signals within a predetermined frequency range and a receiver circuit for decoding other data from other signals within the predetermined frequency range and a controller coupled to the at least one of the transmitter circuit and the receiver circuit; and an antenna sub-system coupled to the at least one of the transmitter circuit and the receiver circuit; wherein the other data received and decoded by the receiver circuit comprises packets of other data;

the antenna sub-system comprises:

a first receiver signal chain coupled to a first antenna;

a second receiver signal chain coupled to a second antenna; and a switch selectively coupling the UWB circuit to one of the first receiver signal chain and the second receiver signal chain;

the controller determines whether to power down one of the first receiver signal chain and the second receiver signal chain in dependence upon a preamble of each packet of other data; and at least one of:

the first antenna and second antenna have spatially diverse directive radiation patterns; and the first antenna and second antenna are orientated orthogonally to each other to provide polarization diversity.

14. A method comprising:

providing an ultra-wideband (UWB) circuit comprising at least one of a transmitter circuit for encoding data as signals within a predetermined frequency range and a receiver circuit for decoding other data from other signals within the predetermined frequency range and a controller coupled to the at least one of the transmitter circuit and the receiver circuit; and an antenna sub-system coupled to the at least one of the transmitter circuit and the receiver circuit; wherein the antenna sub-system comprises:

an open stub filter coupled to a port of the UWB circuit comprising a pair of open stubs tuned to a center frequency of a second harmonic of a frequency within the predetermined frequency range;

a defected ground structure (DGS) bandpass filter;

a balun disposed between the open stub filter and the DGS bandpass filter; and a monopole antenna incorporating a single frequency notch filter to reject signals within another predetermined frequency range.

15. The method according to claim 14, wherein at least one of:

the DGS bandpass filter comprises an interdigital series capacitance and a pair of stepped impedance resonators for rejecting signals below a defined frequency;

a series of slots of defined geometry surrounding the DGS bandpass filter providing a stopband suppressing signals associated with second harmonics and third harmonics of signals within the predetermined frequency range passed by the DGS bandpass filter; and a pair of ground plane slots of length a half-wavelength of a defined cavity resonant frequency where the cavity is formed by a ground plane on a side of a printed circuit board (PCB) of the antenna sub-system and an electromagnetic interference shield disposed above a distal side of the PCB.

16. A method comprising:

providing an ultra-wideband (UWB) circuit comprising at least one of a transmitter circuit for encoding data as signals within a predetermined frequency range and a receiver circuit for decoding other data from other signals within the predetermined frequency range and a controller coupled to the at least one of the transmitter circuit and the receiver circuit; and an antenna sub-system coupled to the at least one of the transmitter circuit and the receiver circuit;

wherein when the UWB circuit comprises the transmitter circuit the transmitter circuit comprises a radio frequency (RF) signal generator receiving the data to be transmitted and a clock signal characterised by a clock frequency;

the controller controls the generation of the signals encoding the data such that each bit within the data being transmitted is comprised of a plurality N pulses generated by the RF signal generator wherein each pulse of the N pulses is at a predetermined frequency of a plurality M frequencies, has a predetermined amplitude, and has a predetermined pulse length; wherein $N \geq 2$ and $M \geq 2$;

M and N are integers;

a pulse repetition rate of the RF signal generator is determined in dependence of the clock frequency;

the integer N depends upon a duration of a bit of the data signal and the pulse repetition rate of the RF signal generator;

the plurality N pulses are transmitted within the duration of the bit of the data signal and comprise pulses at the plurality M frequencies; and the plurality N pulses are within a predetermined frequency band.

* * * * *